(12) United States Patent
Robins

(10) Patent No.: US 10,966,888 B2
(45) Date of Patent: Apr. 6, 2021

(54) TOOTH CLUTCH TRANSMISSION FOR WHEELCHAIRS

(71) Applicant: Douglas G. Robins, Hermosa Beach, CA (US)

(72) Inventor: Douglas G. Robins, Hermosa Beach, CA (US)

( * ) Notice: Subject to any disclaimer, the term of this patent is extended or adjusted under 35 U.S.C. 154(b) by 187 days.

(21) Appl. No.: 15/973,223

(22) Filed: May 7, 2018

(65) Prior Publication Data

US 2018/0318156 A1    Nov. 8, 2018

Related U.S. Application Data

(60) Provisional application No. 62/502,539, filed on May 5, 2017.

(51) Int. Cl.

| A61G 5/02 | (2006.01) |
| F16H 31/00 | (2006.01) |
| F16H 37/02 | (2006.01) |
| A61G 5/12 | (2006.01) |
| A61G 5/06 | (2006.01) |
| A61G 5/08 | (2006.01) |

(52) U.S. Cl.
CPC ............. *A61G 5/021* (2013.01); *A61G 5/023* (2013.01); *A61G 5/025* (2013.01); *A61G 5/06* (2013.01); *A61G 5/0816* (2016.11); *A61G 5/121* (2016.11); *A61G 5/122* (2016.11); *A61G 5/128* (2016.11); *F16H 31/001* (2013.01); *F16H 37/02* (2013.01)

(58) Field of Classification Search
CPC ......... A61G 5/021; A61G 5/023; A61G 5/025
See application file for complete search history.

(56) References Cited

U.S. PATENT DOCUMENTS

| 1,058,123 | A | * | 4/1913 | Whitaker | ................. B62M 1/36 |
| | | | | | 280/237 |
| 2,924,287 | A | | 2/1960 | Bramley | |
| 6,017,046 | A | * | 1/2000 | Markovic | .............. A61G 5/023 |
| | | | | | 192/215 |
| 8,540,266 | B2 | | 9/2013 | Baker | |
| 9,486,327 | B2 | | 11/2016 | Martynova et al. | |
| 9,486,372 | B2 | * | 11/2016 | Robins | ................... A61G 5/021 |
| 9,770,376 | B2 | * | 9/2017 | Robins | ................... A61G 5/125 |

(Continued)

FOREIGN PATENT DOCUMENTS

| GB | 134890 | 4/2004 |
| JP | 2004-097605 A | 4/2004 |

OTHER PUBLICATIONS

WIPO, U.S. International Search Authority, International Search Report and Written Opinion dated Jul. 26, 2018 in International Patent Application No. PCT/US2018/031427, 8 pages.

(Continued)

*Primary Examiner* — Tony H Winner
*Assistant Examiner* — Conan D Duda
(74) *Attorney, Agent, or Firm* — Inskeep IP Group, Inc.

(57) ABSTRACT

A conveyance to carry humans, such as a wheelchair, is described having levers on each side of the wheelchair that are manually moved forward and backward to propel the conveyance. The levers are connected to a tooth clutch mechanism that allow the user to shift into forward, reverse or neutral, brake, and change mechanical advantage (gear ratio), all this without removing the user's hands from the drive levers.

20 Claims, 49 Drawing Sheets

(56) References Cited

U.S. PATENT DOCUMENTS

| | | | |
|---|---|---|---|
| 10,376,431 B2* | 8/2019 | Robins | A61G 5/021 |
| 2003/0071435 A1* | 4/2003 | Schaeffer | A61G 5/023 |
| | | | 280/248 |
| 2004/0104554 A1* | 6/2004 | Watwood | A61G 5/023 |
| | | | 280/250.1 |
| 2005/0167942 A1 | 8/2005 | Watwood et al. | |
| 2007/0052196 A1* | 3/2007 | Taylor | A61G 5/023 |
| | | | 280/250.1 |
| 2014/0096631 A1 | 4/2014 | Storch | |
| 2014/0232085 A1 | 8/2014 | Hsiao-Wecksler et al. | |
| 2015/0190292 A1* | 7/2015 | Robins | A61G 5/025 |
| | | | 180/366 |
| 2017/0065470 A1* | 3/2017 | Robins | A61G 5/02 |
| 2018/0021192 A1* | 1/2018 | Robins | A61G 5/048 |
| | | | 180/336 |
| 2018/0318156 A1* | 11/2018 | Robins | A61G 5/021 |
| 2019/0374413 A1* | 12/2019 | Robins | A61G 5/021 |

OTHER PUBLICATIONS

European Patent Office, Extended European Search Report dated Nov. 23, 2020 in European Patent Application No. 18794954.0, 9 pages.

* cited by examiner

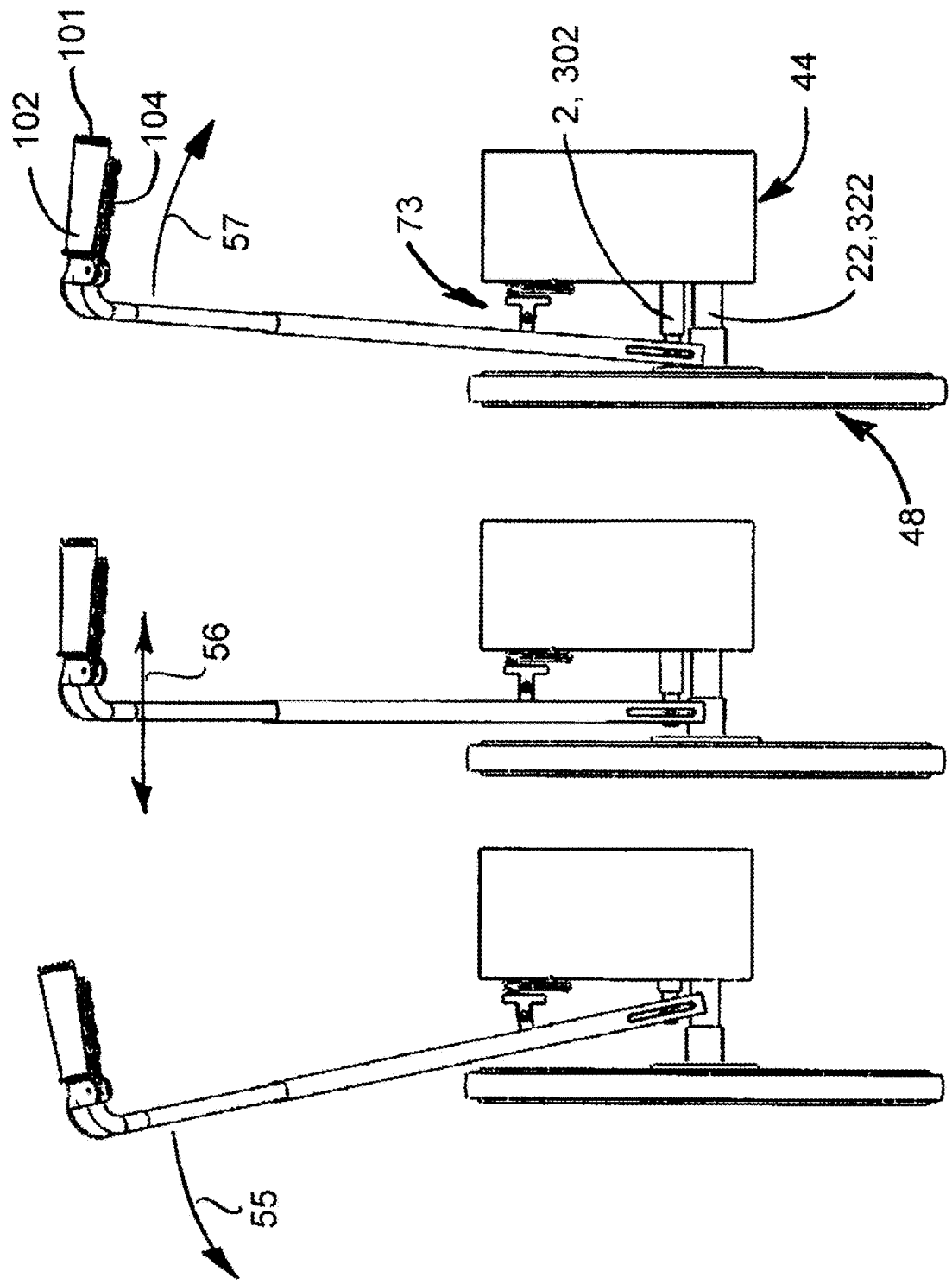

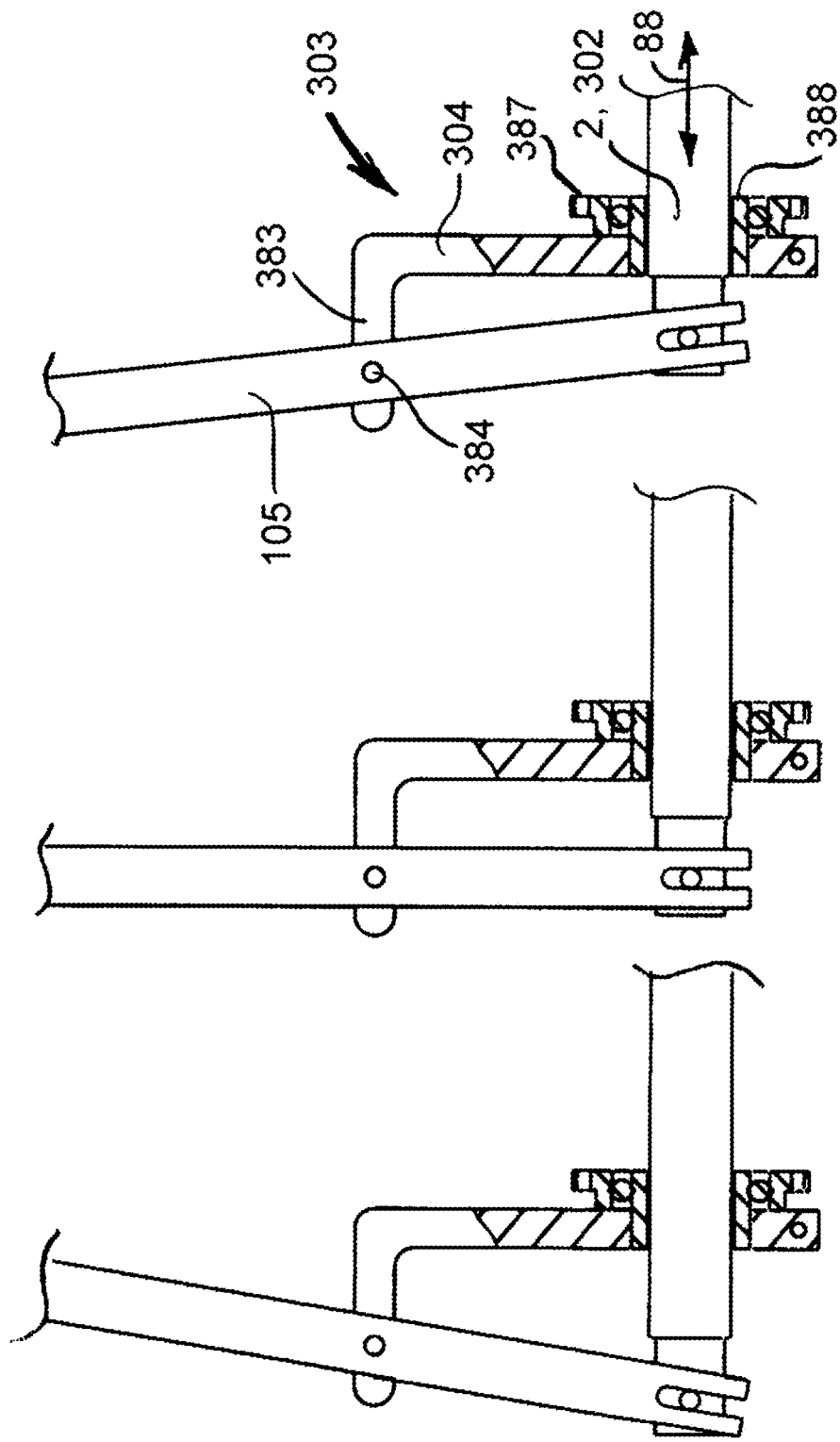

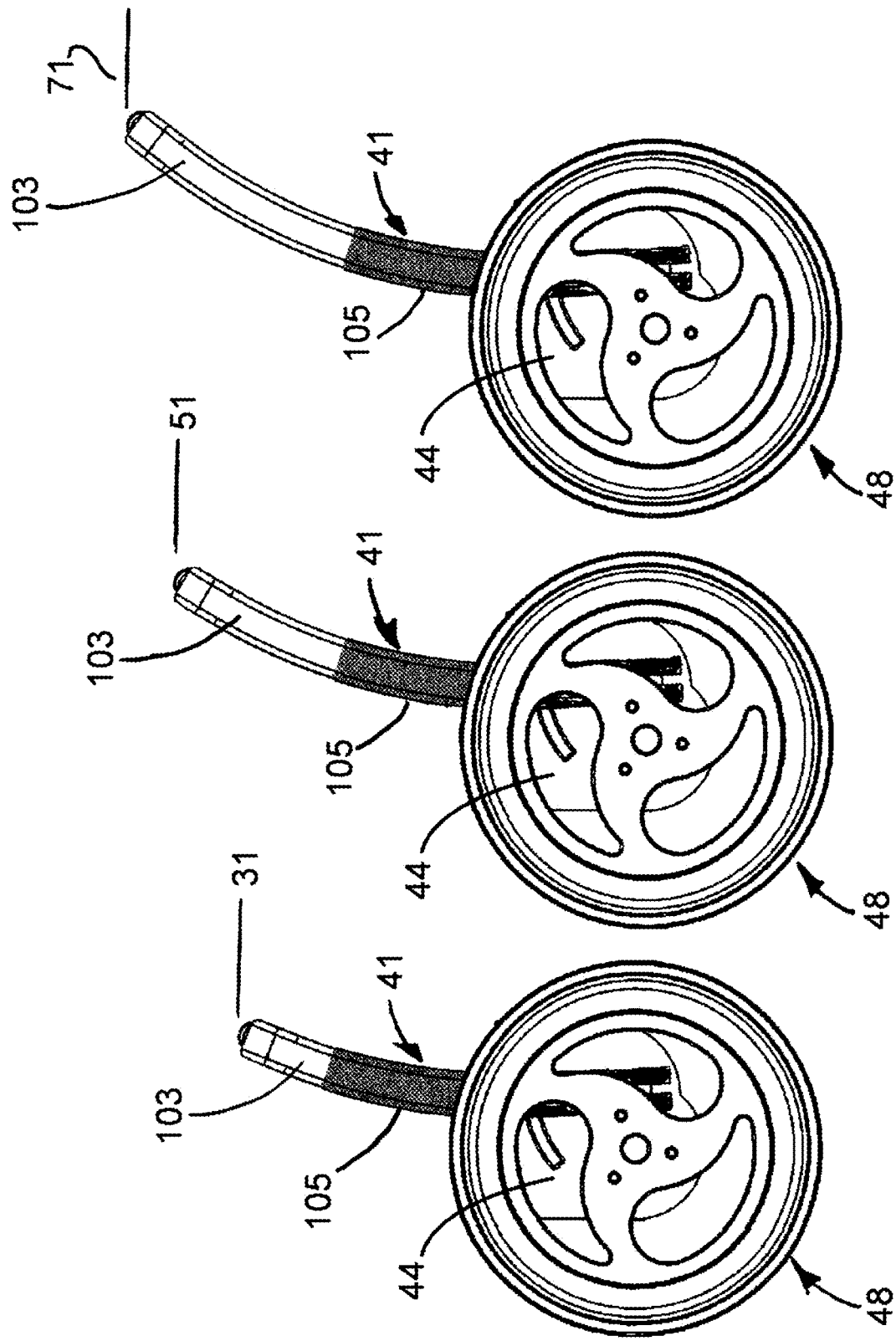

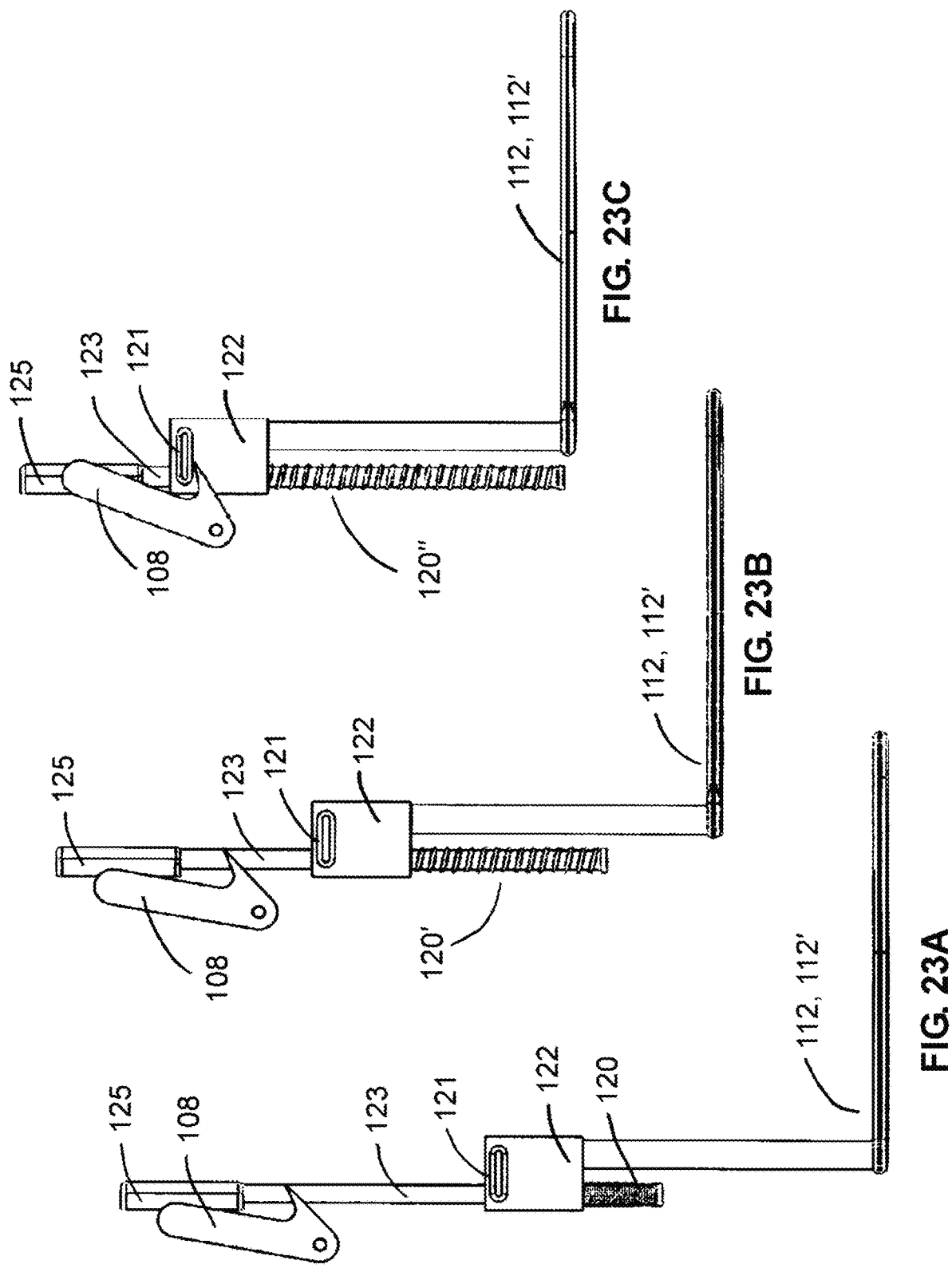

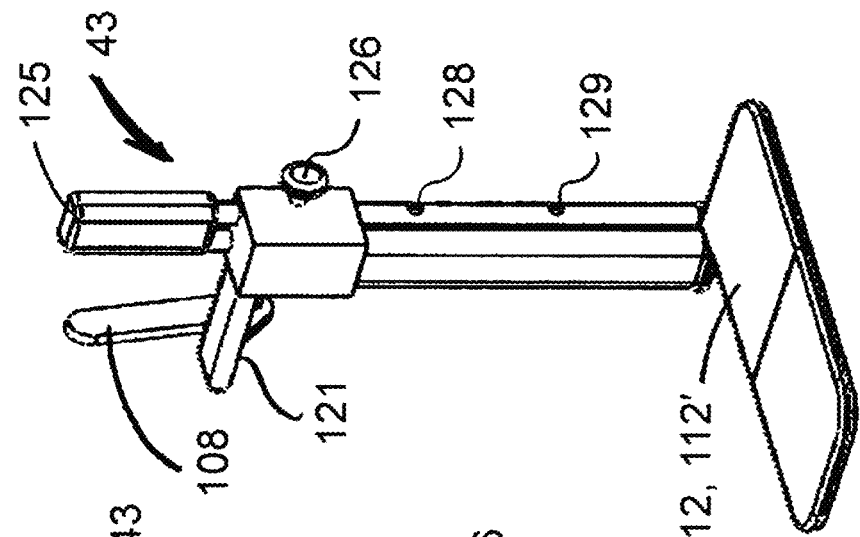
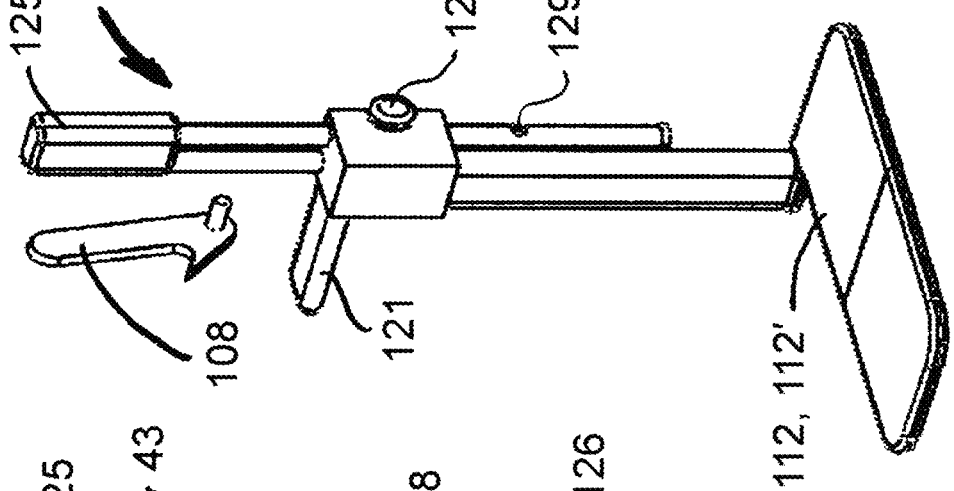
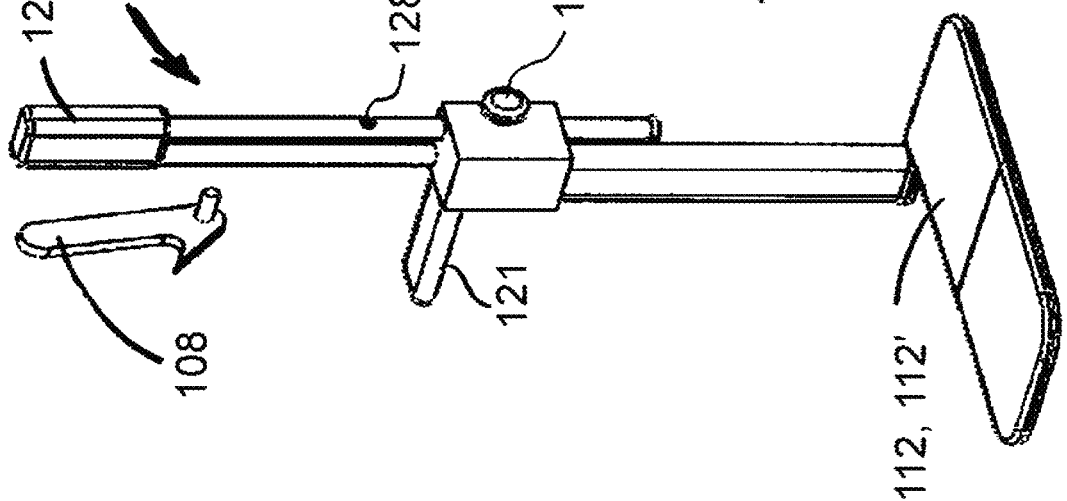

TOOTH CLUTCH TRANSMISSION FOR WHEELCHAIRS

RELATED APPLICATIONS

This application claims priority to U.S. Provisional Application Ser. No. 62/502,539 filed May 5, 2017 entitled Lever-Drive Transmission For Human Propelled Conveyances Including Wheelchairs, which is hereby incorporated herein by reference in its entirety.

BACKGROUND OF THE INVENTION

Wheelchairs and similar conveyances remain a critical part to allowing mobility for individuals with injuries or medical conditions that otherwise prevent them from walking or make walking more difficult. While many standard wheelchair designs perform adequately, they typically have a number of drawbacks for the user. For example, exerting force manually on the wheelchair wheels is often not the most efficient use of force for a user. In another example, small front wheels and fixed footrests make it difficult for the user to roll over raised objects, such as street curbs. In a final example, many wheelchairs lack any type of upper back and head support for the user. In some or all of the above respects, refinements to commonly used wheelchair designs could greatly improve the user's experience and enjoyment.

SUMMARY OF THE INVENTION

The present invention is generally directed to a conveyance to carry humans (i.e., a human mobility device), which is an integration of various embodiments of sub-assemblies into embodiments of conveyances. These embodiments of conveyances include a wheelchair with various configurations and various attachments, where levers on each side of the wheelchair are manually moved forward and backward to propel the wheelchair. In one embodiment the user is able to shift into forward, reverse or neutral, brake, and change mechanical advantage (gear ratio), all this without removing the user's hands from the drive levers. In one embodiment, said levers and drive system are the sole mechanism for propelling the wheelchair, thus the term "Dedicated" is used in conjunction with the lever propulsion wheelchair as being a "Dedicated Lever Drive Wheelchair". However, it should be understood that the levers and drive system can also be used in conjunction with traditional wheelchair propulsion mechanisms (e.g., circular hand rails fixed to the wheels).

In one embodiment of the invention the drive wheels may be mounted toward the back of the wheelchair (e.g., similar to a "conventional wheelchair").

In another embodiment, the drive wheels may be mounted toward the front of the wheelchair in a "chariot mode", with a smaller wheel or wheels on casters located at the back of the wheelchair so as to steady the wheelchair and provide support.

In another embodiment, "canes" are included which support a back rest and which can be configured to tilt backward.

In another embodiment, a mechanism and methodology is described to secure the frame in a rigid rectangular condition.

Another embodiment includes a transmission on both sides of the wheelchair, attached to the left and right sides of the wheelchair frame or may comprise or partially comprise the frame itself. The transmission provides for Forward, Neutral and Reverse gears via left and right hand drive levers which are moved back and forth to propel the wheelchair drive wheels.

Another embodiment includes footrests which are able to move up and down and can be locked at various heights and folded so as to allow riding over obstacles and are of utility when used in conjunction with an embodiment of a wheelchair type conveyance.

In another embodiment, a fender is included over the drive wheels to limit the user's exposure to contact with the drive wheels.

Another embodiment includes support feet on both sides of the frame which can be lowered to help steady the conveyance for entry and exit.

Yet another embodiment includes a collapsible back and headrest, movable arm rests, and the ability to position the arms, levers and footrests so that there is little impediment to the user when entering or exiting the wheelchair conveyance.

In another embodiment, when the conveyance is in either forward or reverse gear, the conveyance moves in the direction of the chosen gear regardless of the direction of the movement of the drive lever.

An embodiment of the conveyance including for a wheelchair can be configured with a battery and an electric motor to assist in propelling the wheelchair. A sensing instrument attached directly to the drive lever(s) or to a component within the transmission, provides input to a controller which determines the amount of power needed by the electric motor, which would be attached to an extension of the output drive wheel output shaft through the transmission housing, toward the middle of the conveyance, to augment the user's manual force on the lever(s) or can be inputted to the drive train in another manner.

Embodiments of attachments to the wheelchair to augment its functionality include but are not limited to an embodiment of a device described herein which allows the user's foot or feet to augment the push and/or pull of the levers. This functionality can be used for purposes including stroke rehabilitation and other conditions where either the user needs to augment arm forces with the user's leg forces or augment the user's leg forces with arm forces.

In another embodiment, a footrest can ride up a track so that it can be moved out of the way to facilitate curb climbing.

Further, embodiments and features of the sub-assemblies of the invention can be incorporated into various other inventions and devices such as other conveyances including wheelchairs other than described herein. This would include, but is not limited to sub-assembly embodiments described herein including the collapsible back and head rest, the movable footrests, and the support foot.

In one embodiment, the dedicated lever drive wheelchair operates by moving levers, which are attached to a transmission, forward and back in order to propel the drive wheels. The transmission can come in various embodiments. One configuration may be termed a push or pull only mode. In this mode, when the wheelchair is in the forward gear, pushing the lever forward propels the wheelchair forward, however there is no propulsion when the lever is returned backward. When the lever is moved to the reverse gear, reverse propulsion occurs only when the lever is pulled backwards. Or, if desired, the transmission can be configured such that when the lever is in the reverse gear, pushing the lever forward causes the drive wheel to turn backwards. Further, a neutral gear can be included in which movement of the lever produces no movement of the wheelchair.

Regardless, in this push only mode, for either forward or reverse, propulsion occurs on either a forward or reverse stroke but not both.

In another configuration, a "push-pull mode" is included. When the lever is set for forward gear, movement of the lever both forward and backward causes forward rotation of the drive wheel. A "push-pull mode" configuration can also be set up in the transmission for reverse gear whereby both pushing and pulling the lever causes the drive wheel to rotate backwards.

In an embodiment of the conveyance as a wheelchair, the wheelchair user is able to shift to forward, reverse, or neutral, brake, and change mechanical advantage by sliding the telescopic lever up or down, all this without removing the user's hands from the drive levers.

In one embodiment, a hand brake is incorporated into each handle of the levers. Each brake handle is connected to a disc brake or band or similar mechanism, by way of a flexible shaft. The brake can be located either outboard of the wheelchair frame, within the transmission housing or on a shaft which extends out from the transmission toward the interior of the wheelchair. For purposes of illustration, the setup can be envisioned to be similar to having a bicycle style hand brake on the lever handle with a bicycle style flexible shaft down to a bicycle style disc brake or band brake, etc.

A "parking brake" attribute can be accomplished by using a hand brake lever which can be locked in the braking mode.

In one embodiment, the height of the levers can be adjusted "on-the-fly" without the user having to remove their hands from the levers. While the entire lever is able to rotate forward and backwards, the bottom part of the lever does not move up and down. The top part of the lever is able to "telescope" or otherwise slide up and down relative to the bottom part of the lever.

Altering the length of the levers changes in the mechanical advantage and thus changes that force the user has to apply to propel the wheelchair. This allows, for instance for the mechanical advantage to be changed from less than 1:1 to greater than 1:1 with the exact range dictated by the "gear ratios" within the transmission. In essence, this gives the user an "infinitely adjustable gear ratio" from the low end to the high-end as the lever is slid up and down. In one embodiment, the upper lever adjustment allows the lever to be moved in discrete increments such as by using detents or locking mechanisms similar to those used on telescoping devices such as the telescoping handles on "rollies" i.e. rolling suitcases and briefcases etc., in which case the upper lever would be released with a button or other device at the end of the lever's handle activated by the user's thumb or fingers.

In one embodiment, the levers are curved forward. This allows the user to keep the handle of the levers above the level of a desk, table etc. while allowing the user to get closer to the desk table etc. than if the levers were straight.

Numerous types of removable attachments can be affixed to the wheelchair frame. Some of these attachments are described herein in detail. Other attachments which are not specifically detailed include, but are not limited to, a snow plow attachment, a sweeping attachment, various types of baskets, work table attachments, etc. Also, the frame can be configured with a towing attachment on the back of the frame. More "conventional" type attachments include armrests which either fold up or move up and down.

An embodiment of the dedicated lever drive wheelchair is the ability to alter the effective size of the wheelchair for different users and so that the wheelchair can "grow" with a child as he/she grows or be altered for different users. This minimizes the requirements to purchase/acquire a new wheelchair for different users and/or as a child grows.

One might consider the basic design of this dedicated lever drive wheelchair, excluding the seat back, as being comprised of a left and right side, each containing the lever, transmission, drive wheels and caster wheels. Each side is then held in a rigid rectangle. Depending on the embodiment of the folding method, it may be some sort of "seat bottom plate" which can be either an entire "plate" or merely a frame which sits down between the four sides of the wheelchair's frame and secures it as a rigid rectangle. Another embodiment is to have horizontal linkages in the front and back of the wheelchair which may be used alone to hold the wheelchair in a rigid rectangular position or may be used in conjunction with a seat bottom plate or frame.

Both of these embodiments allow the width of the wheelchair to be changed without the user having to purchase/acquire an entirely new wheelchair.

In one embodiment for folding the conveyance, the width of the wheelchair can be changed by swapping out the hinged panels of the frame which sit in both the front and rear of the wheelchair, with a different width, and then either replacing or adjusting the seat bottom plate or frame which maintains the wheelchair frame in a rigid rectangular condition.

For another embodiment of a folding method, the width of the wheelchair can be changed by swapping out the front and rear linkage mechanisms for ones with a different width and, depending on the configuration, swapping out or adjusting the seat bottom plate and/or the frame which can be used to help maintain the wheelchair in a rigid rectangular condition.

In one wheelchair embodiment, a footrest is attached to the front of the frame. It is adjustable forward and back and up and down.

In one embodiment of the dedicated lever drive wheelchair in the "chariot configuration", the footrests is a skid, mounted to a "track" by way of a linear bearing. This is for use in curb climbing and off-road use to get over obstacles. In this configuration the front of the skid contacts the curb or obstacle and is able to ride up the curb or obstacle lifting the user's feet and legs with it. The front drive wheel, in this chariot mode then contacts the curb or obstacle and drives over it.

In another embodiment for the "chariot" configuration of wheelchair, the footrest is also mounted to a vertical track or other device to allow movement up and down. In one embodiment it is by way of a linear bearing. The footrest is spring-loaded by either a mechanical or gas type spring so that as the user manually lifts his/her legs, the footrest moves up as well and can be locked in a raised position. This allows the footrest and the user's feet to clear a curb or an obstacle and the front drive wheel to contact the curb or obstacle and ride up over it. One embodiment has a latch mechanism has a release which allows the weight of the user's legs and feet to lower the footrest down to its original position. An aspect of this type of embodiment of a footrest in this chariot wheelchair configuration, is that it obviates the need for the user to do "wheelies" to get over curbs and other obstacles.

In an embodiment the drive wheels and the caster wheels are able to be readily removed and adjusted. Adjustments include forward and backwards per the user's requirements for such things as adjusting center of gravity.

In the "chariot mode", caster type wheels are used in the back of the wheelchair. They can be adjusted more inward or outward for reasons including to gain more or less stability or change the location of the center of gravity of the user. The caster type wheels can be adjusted such that they remain inboard of the frame of the wheelchair or can extend outboard of the frame of the wheelchair.

If desired, the wheelchair in "chariot" configuration can be configured with a single caster type wheel in the middle of the width of the wheelchair, which also can be adjusted forward and backward and up-and-down.

In either the "conventional" configuration or the "chariot" configuration, depending on the embodiment, the drive wheel can be small enough in diameter so that the top of it does not obstruct entry and exit of the wheelchair, that is, does not obstruct "transitioning" in and out of the wheelchair.

Also, the wheelchair can be configured with fenders over the drive wheels to eliminate the spray of water and other materials getting on the user as they are thrown up by the rotating drive wheels.

One embodiment of the drive wheels allows them to be cambered through use of a device such as a flexible coupling or universal joint or by angling the entire drive transmission.

A custom shaped, disposable sleeve can be placed over the lever handle and brake lever so that material, particularly infectious material, is not transferred from the hands of the user to another user. In other words each wheelchair user gets clean sleeves placed on the lever handles and lever as an infection control mechanism. This sleeve can be made out of plastic or other material impermeable to bacteria and other infectious organisms. It can be is shaped to accommodate the lever handle and brake lever. Protective sleeves can also be used on other parts of the conveyance including the backrest/headrest, footrests, armrests and handle of the support foot.

There are various methods for folding conveyances described herein. Embodiments include both conventional and "chariot" style conveyances, such that the frame can be folded with or without the wheels attached.

In one embodiment the frame consists of two side portions (or the transmissions themselves) which are separated in the front and in the back by portions which have the same width. These front and back portions are attached to the two "U shaped" portions (or the transmissions themselves) by vertical hinges. Specifically, two hinges in the front and two hinges in the rear.

The frame is held rigidly as a rectangle, in one embodiment by a rigid seat bottom plate or by a rectangular frame, which sits down inside the four portions of the frame or by a similar means of holding the frame in a rigid rectangle. There can be other embodiments for holding the frame as a rigid rectangle or into other desired shape.

Although the bottom plate could be a separate item and not attached to the wheelchair's frame, the seat bottom plate or rectangular holding frame, can be attached to one side of the wheelchair's frame and rotated up and down. That is, when it is in the down position, it locks the wheelchair's frame and when the seat bottom plate or other device such as a rectangular frame, is rotated up the wheelchair's frame becomes unlocked and able to fold.

In another embodiment, not shown in any of the figures, the seat bottom plate or rectangular holding frame is made in two or more sections where each section could be affixed to the wheelchair frame. When each of the sections is lowered to where they would all meet this would have the effect of making the wheelchair frame held in a rigid rectangular or other desired position.

For one folding method, after the conveyance's frame is "unlocked" the wheelchair is folded by allowing one side of the wheelchair's frame to swing forward of the other. In essence, the smallest that the wheelchair frame can be folded to would be approximately the width of the two transmissions plus the drive wheels if the drive wheels remain attached. However another embodiment of folding allows the transmissions to be stowed one in back of the other.

In another folding method where there is in essence a left and right hand transmission housing with each side having a drive wheel and where these two halves of the wheelchair are connected side to side (left and right) by way of a linkage in the front and back. This linkage allows one side of the wheelchair to be lifted up and over the top of the other side of the wheelchair. Conceptually one side of the wheelchair ends up being stacked on top of the other side of the wheelchair. When in this position, a support foot or bicycle kick stand type support is lowered so that the stacked wheelchair does not fall over. When the wheelchair sides are fully deployed in the down position the linkage locks the two halves in place by means of pins or other locking devices.

For propelling the conveyance, the drive lever is attached to a transmission. The transmission takes the forward and back motion of the lever(s) i.e. the forward and back rotation of the lever drive shaft, and converts it into rotary motion of the drive wheel drive shafts which are attached to the drive wheels. Thus, moving the levers forward and back rotates the wheelchair's drive wheels and propels the wheelchair. Depending on the user's requirements, the gear ratios of the transmission(s) can be custom set by using different diameter sprockets and/or pulleys and/or gears. If the conveyance has two drive levers and two transmissions attached to them. The gear ratio of one transmission on one side does not have to be the same as the gear ratio for the transmission on the other side. For instance, this would be used to accommodate a user that has different strengths in each arm.

There are embodiments where the transmission housing aids in stiffening the U-shaped or L-shaped portion of the frame and, depending on the embodiment, the transmission can be used as part of the frame itself.

The conveyance has embodiments where the transmission can be configured with a battery and an electric motor to assist in propelling the wheelchair. A sensing instrument attached directly to the drive levers or to a component within the transmission, provides input to a controller which determines the amount of power needed by the electric motor, which would be attached to the drive wheel drive shaft or other location, to augment the user's manual force on the levers.

The transmission is shifted into forward, neutral and reverse when the input drive shaft is moved left or right, i.e. in or out of the transmission and specifically in and out of the "one-way clutch bearings".

The lever which propels the conveyance is attached to it by means of a rotating fulcrum. This rotating fulcrum allows the lever to not only rotate forward and back on the Lever driveshaft but also allows the Lever driveshaft to be pushed and pulled in and out of the transmission housing and the one-way clutch bearings contained therein.

Depending on the embodiment, as the lever is pushed outward, the bottom part of the lever below the fulcrum moves inward. As the lever is moved inward the bottom portion of the lever driveshaft is pulled outward. Thus the lever driveshaft effectuates shifting between forward neutral and reverse as it is moved in and out by moving the lever in and out. There can be other embodiments where the rotating fulcrum is located at other angles to the lever and can be located such that another part of the lever is attached to the rotating fulcrum.

The transmission can be configured for various types of functionality. For instance, it can be configured to have just the ability for forward and reverse with or without a neutral. It can also be configured so that there is propulsion of the drive wheels when the lever is moved both forward and back i.e. in "push-pull mode".

The transmission can also be configured with a "No-Back" which can be set on or off as the user desires. This "No-Back" functions to keep the wheelchair from rolling backwards.

Embodiments of the transmission can be configured as a "modular design" such that it can be readily removed and replaced without dismantling other parts of the wheelchair.

Embodiments of the transmission design provide for a shaft from the transmission to be used as a "Power Takeoff". This allows optional rotating devices such as a generator, hydraulic pump, or air pump/compressor to be rotated when the wheelchair is in motion.

A generator can be used for instance in conjunction with safety lighting on the wheelchair and or a searchlight and or for the user's electronic gear in conjunction with a battery which would be recharged by the generator.

An air pump/compressor can be used in conjunction with a pneumatic circuit for pumping air underneath and into the user's seat bottom and/or seat back to help keep skin dry and to help avoid ulcerations.

An embodiment of the conveyances described herein can utilize commercially available seat backs and seat bottom cushions.

An embodiment of the wheelchair can utilize adapters to allow seatbacks from various manufacturers to be attached to the canes and will allow the seat back to be adjusted forward and aft as well as up and down.

There is utility in embodiments of the conveyances to have the ability to alter the effective size of the width for different users so that the conveyance can "grow" with a child as he/she grows or for different users. This minimizes the requirements to purchase/acquire a new wheelchair for different users and/or as a child grows.

Custom seat back adapters can allow significant forward and aft adjustment of the seat back so as to effectively change the depth of the seat for different size users and to allow the wheelchair to "grow" with a child's growth so that a new wheelchair does not have to be purchased/acquired.

In an embodiment of the canes or pole members of the seat back can be configured to be tilted forward and back for adjustment purposes. Further, depending on the embodiment of the conveyance, the seat canes and thus the seat back can be tilted as far back as horizontal to allow the user to use the conveyance as a "recliner" or as a "lounger" for the purposes of resting and/or sleeping.

For the seat back to be able to be reclined for these purposes may require either a seat back which extends to the head or, as described herein a backrest/headrest which can be extended upward and be lowered back down.

In one embodiment, a clutch mechanism with clutch faces is described. The clutch mechanism can be a tooth clutch configured such that axial movement of an input drive shaft to a first position operatively couples the input drive shaft to an output drive shaft, and axial movement of the input drive shaft to a second position operatively uncouples the input drive shaft to the output drive shaft.

In one embodiment, the tooth clutch comprises a first sprocket having a first plurality of teeth extending in a first axial direction and a second sprocket having a second plurality of teeth extending in a second axial direction. The first sprocket and the second sprocket each have a bearing moveable in two directions and positioned axially over the input drive shaft so that the input drive shaft can rotate freely relative to the first sprocket and second sprocket, as well as move axially through each of the bearings.

In one embodiment, an input drive shaft has a tooth clutch mechanism and that connects to an output drive shaft, as well as a reduced diameter region of the output drive shaft that can be moved into and out of a one-way bearing.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which

FIGS. 6D, 6E and 6F depict details of the elements in FIGS. 6A, 6B and 6C.

FIGS. 8A, 8B, and 8C depict a front view of one side of the drive train showing how the levers are positioned for this embodiment for three gears, Forward, Neutral and Reverse and some details of the yoke and bearing relationships.

FIGS. 10A, 10B, and 10C illustrates a side view of the upper part of the drive levers that moves up and down to change the mechanical advantage from the user's arm.

FIGS. 23A, 23B and 23C depict an embodiment of a spring loaded/balanced footrest in its full lowered position for entry and exit of the wheelchair conveyance, in a partially raised and locked position for riding, and in a fully raised and locked position for clearing obstacles.

FIGS. 24A, 24B and 24C depict an embodiment of a spring loaded/balanced footrest also depicted in FIGS. 23A, 23B and 23C showing position locking mechanisms.

DESCRIPTION OF EMBODIMENTS

Figure 1A:
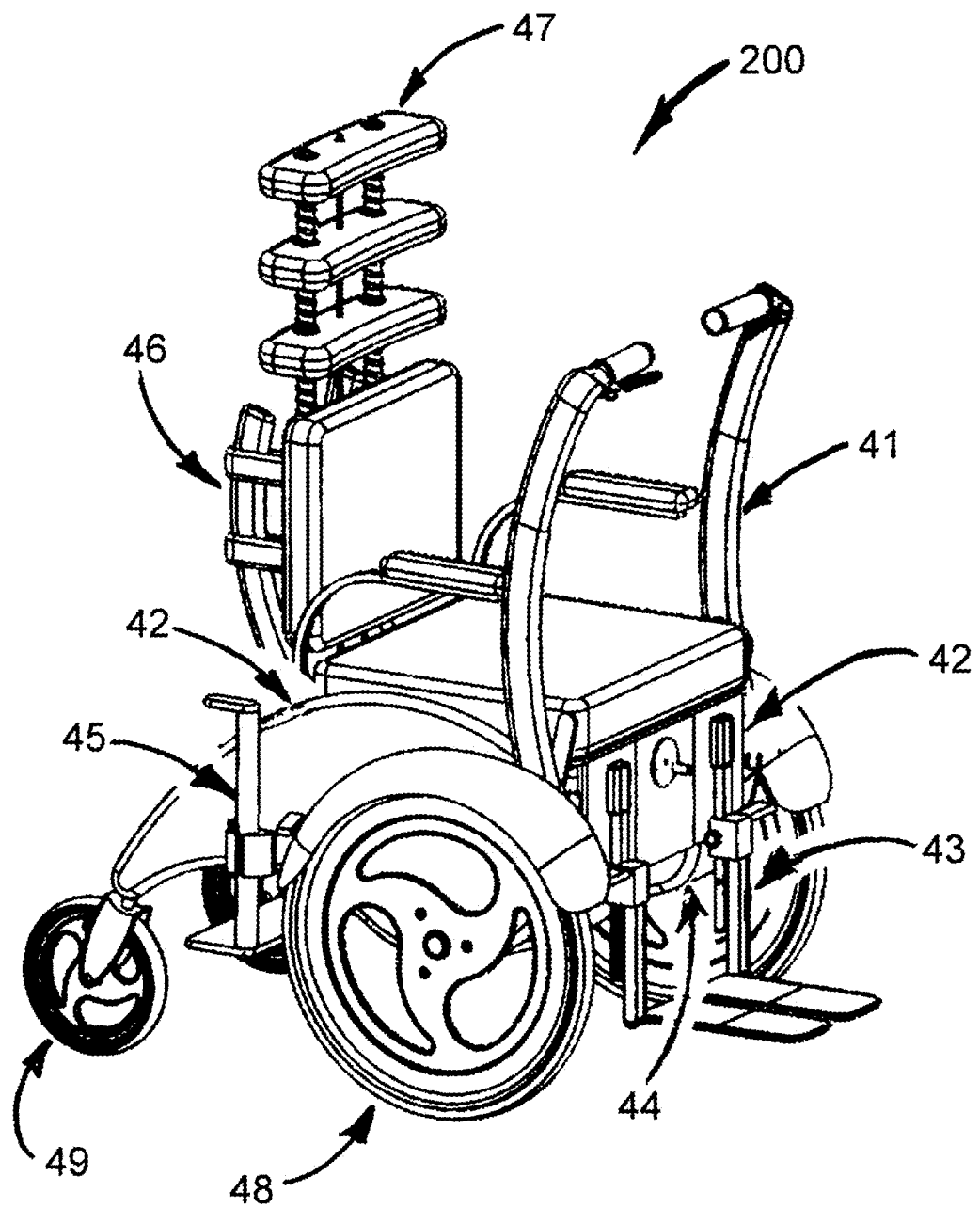
FIGS. 1A and 1B depict a perspective view of one embodiment of a dedicated front wheel drive, manual, lever propelled wheelchair.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Further, embodiments of the different embodiments and sub-assemblies of the invention can be incorporated into various other inventions and devices such as other conveyances including wheelchairs other than described herein in. This would include, but is not limited to, sub-assembly embodiments of the collapsible back and head rest, the movable footrests, and the support foot.

The term conveyance and wheeled transports are used within this specification and generally refers to a personal, wheeled mechanism for transporting or conveying an individual. While the specification and drawings primarily describe conveyances in terms of various wheelchair embodiments, other, similar devices are also contemplated for use with the various components and assemblies described herein. One example is a mobility scooter, such as that shown in U.S. Pub. No. 2013/0307234, the contents of which are hereby incorporated by reference.

Generally, the left side of the wheeled transports depicted have the same configuration and components on each side. Therefore, in some instances only one side will be depicted but defines the components on the other side in a "mirror image" as well.

Throughout this text the term pulley can be interchanged with sprocket or gear. Also, the term belt can be interchanged with chain or similar devices. The reason is that embodiments of the transmission have the same functionality whether pulleys and belts or sprockets and chain or gears are utilized.

In the embodiments depicted herein of the drive train, including the transmission, the convention used is that when a drive lever is moved inward, (which pushes or shifts the rotating input drive shaft outward) it represents Forward Gear. When the drive lever is moved outward, (which pushes or shifts the rotating input drive shaft inward) it represents Reverse Gear. When the drive lever is moved to the center, (which moves or shifts the rotating input drive shaft to a center position) it represents Neutral Gear. However, this is only one of many embodiments of shifting. Depending on the "drive logic" within the transmission other embodiments are possible, including having more than just Forward, Reverse and Neutral gears as other mechanical advantages (Gear Ratios) are possible within the transmission. In another example, the Forward Gear and Reverse Gear positions could be reversed from that described above.

The "transmission drive logic" drawings, are simplified in the sense that bearings are depicted but not depicted are the pulleys, sprockets and/or gears into which they would be placed (pushed into) and rigidly affixed, in one embodiment, with an adhesive type material. However, belts which transfer rotary motion from one shaft to another are depicted, but are depicted, for simplicity, as going around the outer race of the bearings not the actual pulleys, sprockets and/or gears which would be utilized.

The term "one-way clutch bearing" as used herein throughout, is used to describe various possible embodiments of clutch bearings which include needle clutch bearings, roller clutch bearings, sprag type clutch bearings, and those with similar properties. These one-way clutch bearings are configured to allow rotation in one direction, but prevent rotation in the opposite direction.

In some configurations of the transmission, if the output drive shaft to the drive wheel of the conveyance is extended inward through the side of the transmission, this extension can be used as a rotating power takeoff to provide rotation to such devices as an electric generator, air compressor or pump or hydraulic pump etc. Further, this extension can be used as an input shaft for an electric motor assist. There are also other embodiments of design for inputting electric motor assist or for taking rotational motion out of the transmission, including at other locations and/or on other shafts.

The term "ground down" portion of the input shaft" and similar terminology with reference to the term "ground down" is found within the text. It refers to the diameter of the shaft being discussed has had its outside diameter reduced to such a degree that the one-way clutch bearings described herein cannot grip the shaft when said one-way clutch bearing is turned in either direction and conversely the shaft within the one-way clutch bearing at that location, cannot grip and turn the one-way clutch bearing in either direction. While grinding down the shaft is one way to achieve the reduced diameter, other techniques are also possible, such as joining different diameter shafts together.

Figure 1B:
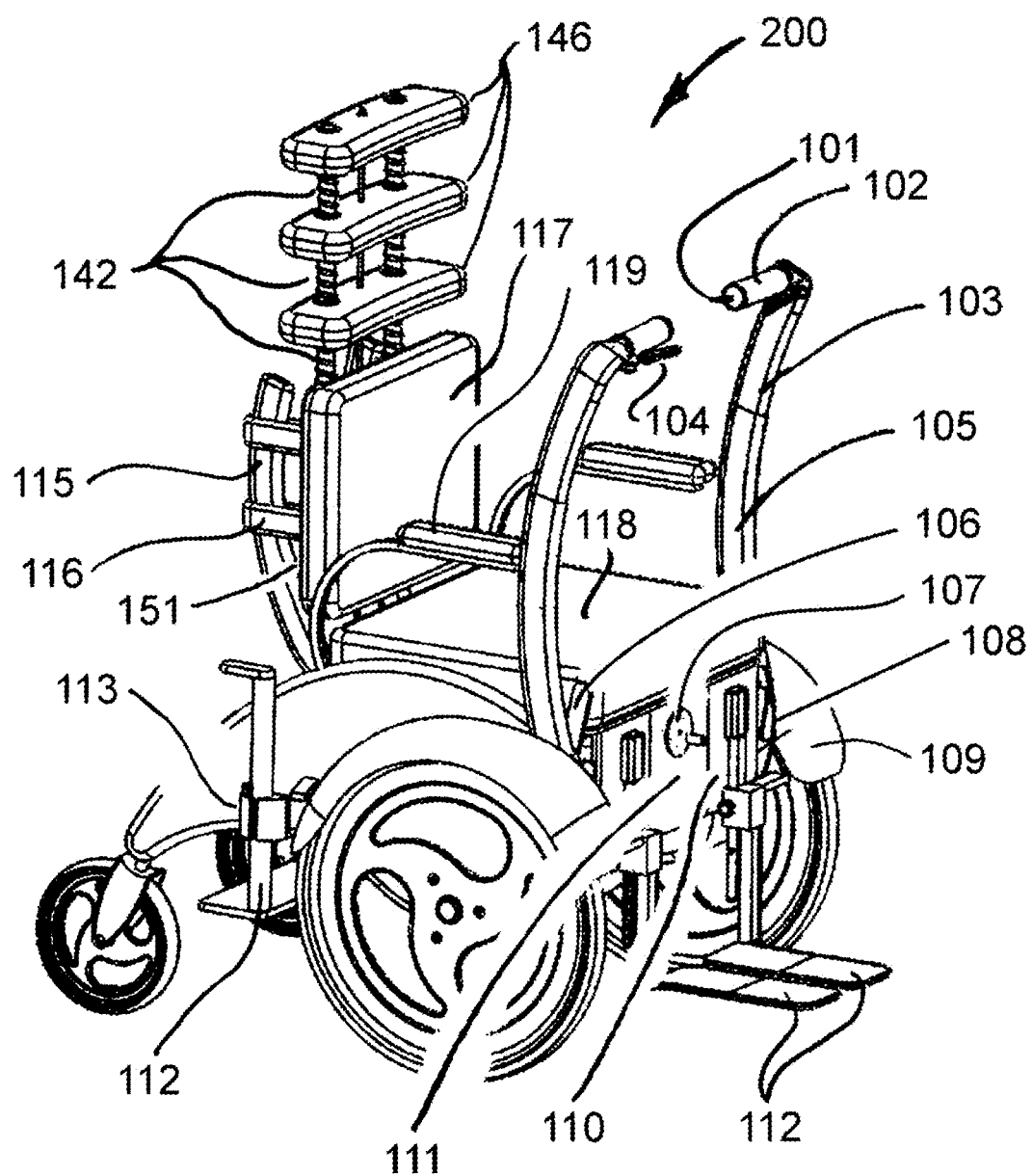

FIGS. 1A and 1B depict one embodiment of a dedicated front wheel drive, manual, lever propelled wheelchair 200. Generally, this wheelchair 200 includes adjustable height levers 41, a braking system 104, a transmission 44, a collapsible back and headrest 47, a backwards-tilting backrest 151, fenders 109, seat back adjustments 116, raisable foot rests 43, support feet 45, and a foldable yet ridged and an adjustable frame 42.

Generally, this wheelchair 200 has a "dedicated" lever propelled drive, where the design of propulsion system is incorporated into the original design of the wheelchair frame and not added on to an existing conventional wheelchair frame. However, it is contemplated that this transmission 44 and levers 41 could be adapted to be installed on pre-existing wheelchair models.

Figure 2C:
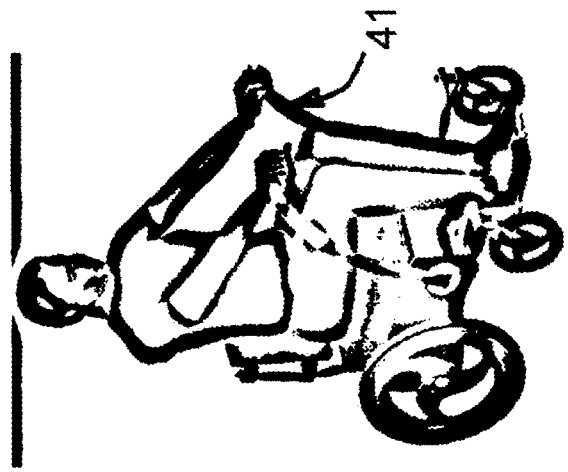
FIGS. 2A, 2B and 2C depict perspective views of the forward and backward (aft) movement of the levers which propel the wheelchair in the embodiment of FIG. 1A.
Figure 2B:
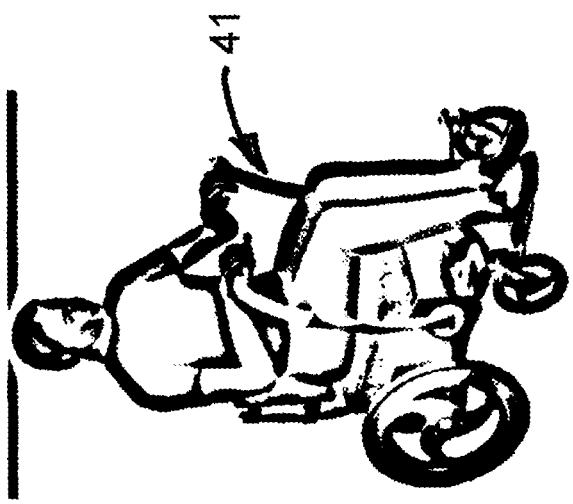
Figure 2A:
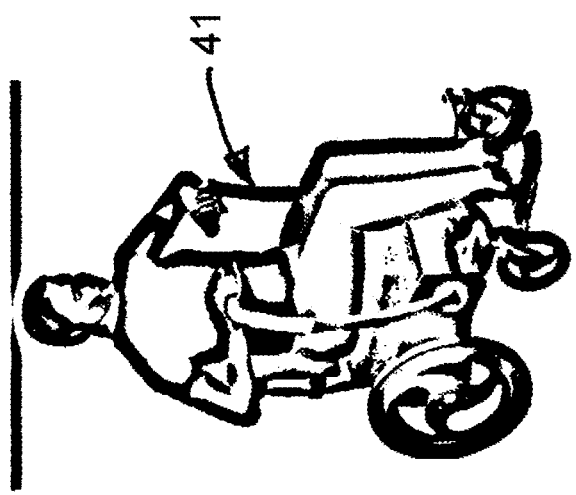

FIGS. 2A, 2B and 2C depict the basic movement of the drive levers 41 forward and backwards. They also show how linear the movement of the hands and arms are due to placement of the levers 41 significantly forward of the chest along with an optimum length (height) of the levers 41 as part of the overall "ergonomic" design.

Further, the embodiment of the levers 41 shown, including in FIGS. 1A and 1B depicts an embodiment as curved (i.e., the levers 41 curved towards a back of the wheelchair 200), though they could also be straight. The curved lever design may allow one to get closer to a desk or table with the top of the lever even if the hand grip 102 is at or above said desk or table. Further, the ability to lower the level of the handgrip 102 down to one's legs has additional utility in that it allows the user to get their torso very close to a desk or table with the handgrip being below the desk or table.

Figure 3B:
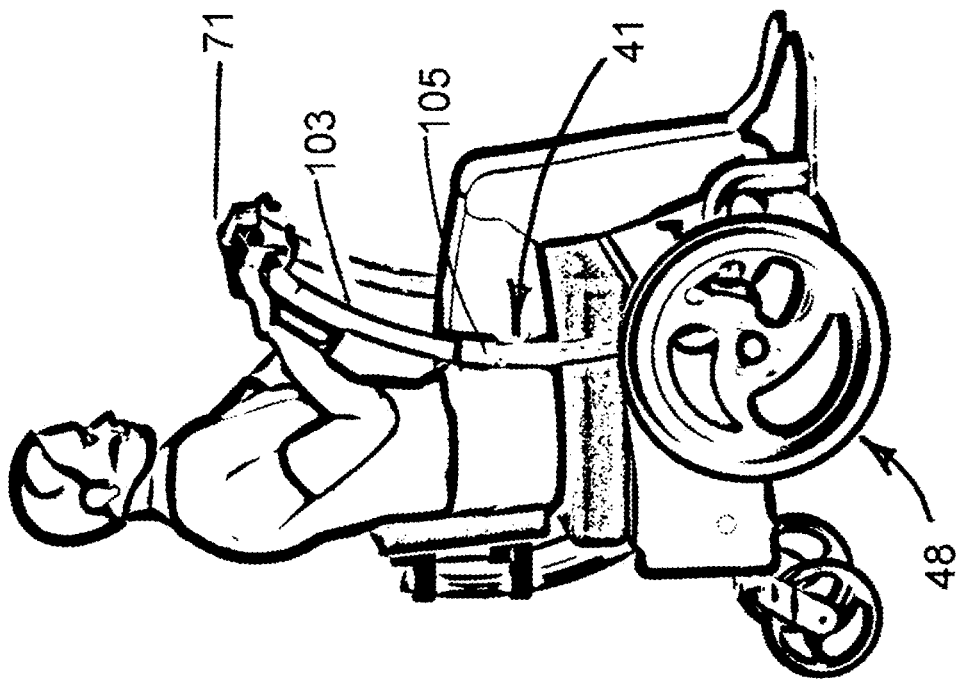
FIG. 3B illustrates a side view of a lever-propelled wheelchair embodiment with larger front wheels.
Figure 3A:
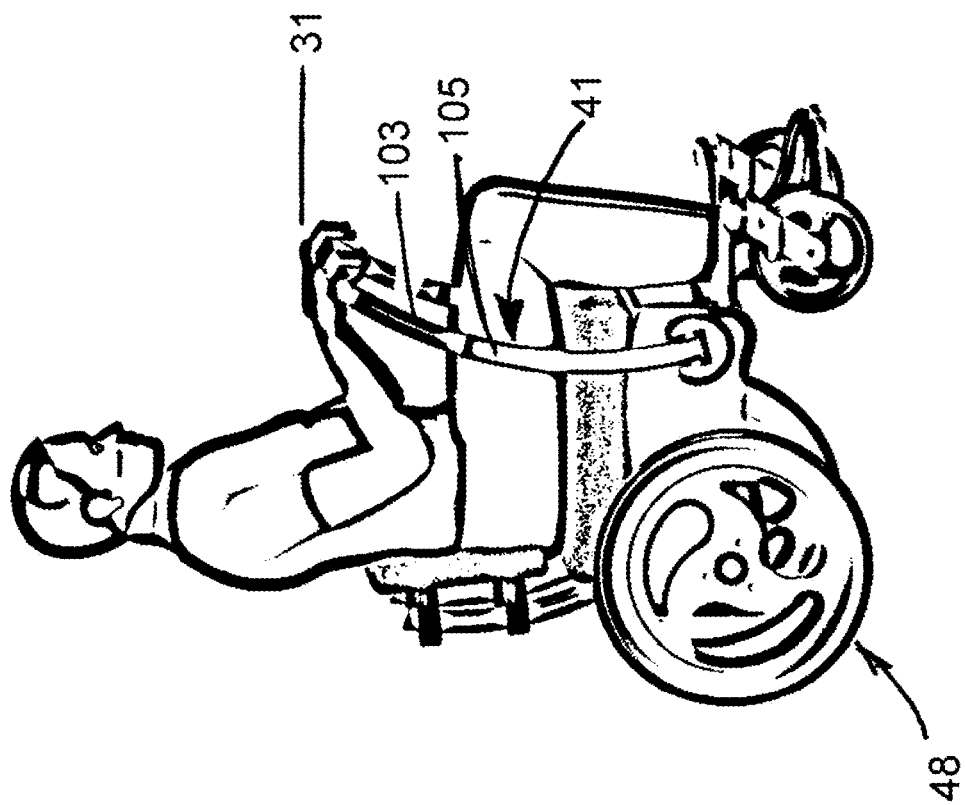
FIG. 3A illustrates a side view of a lever-propelled wheelchair embodiment with larger rear wheels.

FIG. 3A shows a "conventional" wheelchair wheel location embodiment where the larger drive wheels are in the back and the smaller caster wheels are in the front. FIG. 3B shows a "chariot" drive wheel location (front wheel drive) where the larger drive wheel is in the front and the smaller caster wheels are in the back. For each of these embodiments, the drive wheels and caster wheels can be moved forward and backward and up-and-down to adjust for such things as the size of the user, comfort of the user and to adjust the balance/center of gravity of the user on the wheelchair.

FIGS. 3A and 3B also demonstrate how the telescoping lever 41 has the top portion 103 able to be moved up and down at will from a low position such as 31 to a higher position 71 and vice versa. FIGS. 10A, 10B and 10C also show a similar depiction of the top portion of the telescoping lever 103 in a low position 31 a midway position 51 and a higher position 71. However, the top portion 103 of the telescoping lever 41 can be moved to virtually any position without the need to stop the conveyance or cease movement of the lever 41, forward and aft.

Also depicted is one embodiment of the location of the transmission 44. For an embodiment of the wheelchair where the larger drive wheels 48 are located in the back, such as depicted in FIG. 3A, the transmission can be elongated to allow power to be transmitted from the input shafts attached to the levers 41 and the output shafts which are attached to the drive wheels 48.

Figure 4A:
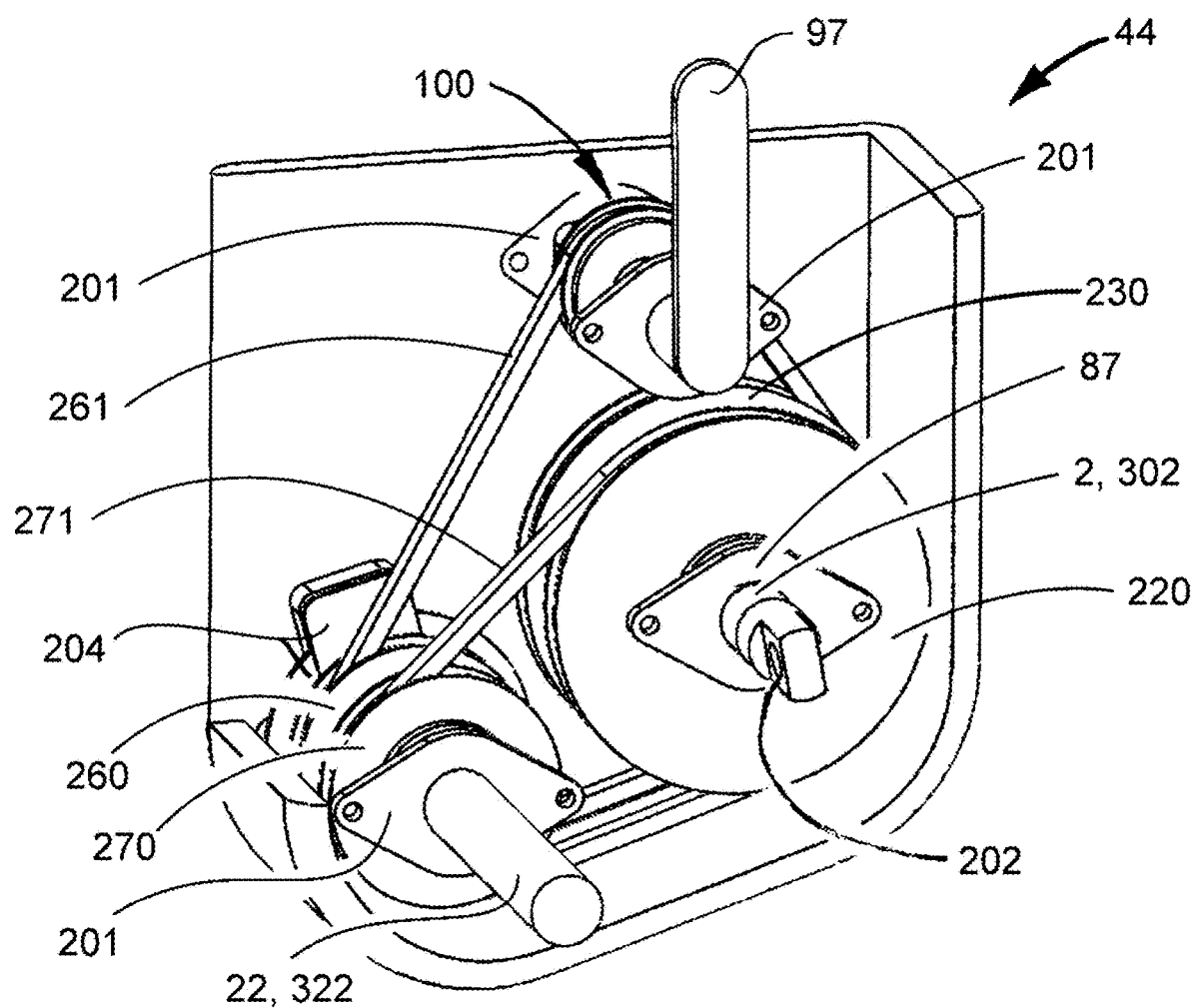
FIG. 4A depicts a perspective view of one embodiment of a forward, neutral and reverse transmission with a "No-Back" capability and disk type brake, which utilizes only a single input drive pulley and one output drive pulley.

FIG. 4A depicts one embodiment of the hardware of a "push or pull", forward, neutral and reverse transmission with a "No-Back" 100 (see transmission logic of FIG. 17) and disk type brake 204. It utilizes one pair of pulleys/sprockets 230 and 260 for forward gear and utilizes one pair of pulleys/sprockets 220 and 270 for reverse gear. Item 97 is one embodiment of a shift handle which allows the No-Back 100 to be engaged and disengaged by pushing its shaft 98 in and out.

Items 201 and item 87 acts as support bearing, having a bore that is bushed to allow the input shaft 302 or 2 to move freely in and out of the frame of the wheelchair 42 and the one-way clutch bearings in the transmission. Item 202 is the tang at the end of the input shaft 202 (FIGS. 5 and 7) which connects the lower portion of the lever 105 (FIGS. 1B, 5 and 7) to the input shaft 302 or 2 (FIGS. 5, 7, 12 and 13-18) depending on what embodiment of the transmission is being used.

Items 261 represent the forward drive belt/chain which engages the input and output pulleys, as well as the No-Back mode 100 and 271 represents the reverse drive belt. The "transmission logic" is that of FIG. 12 with the exception of the No-Back mode and brake which are not depicted in those "transmission logic" Figs.

Figure 4B:
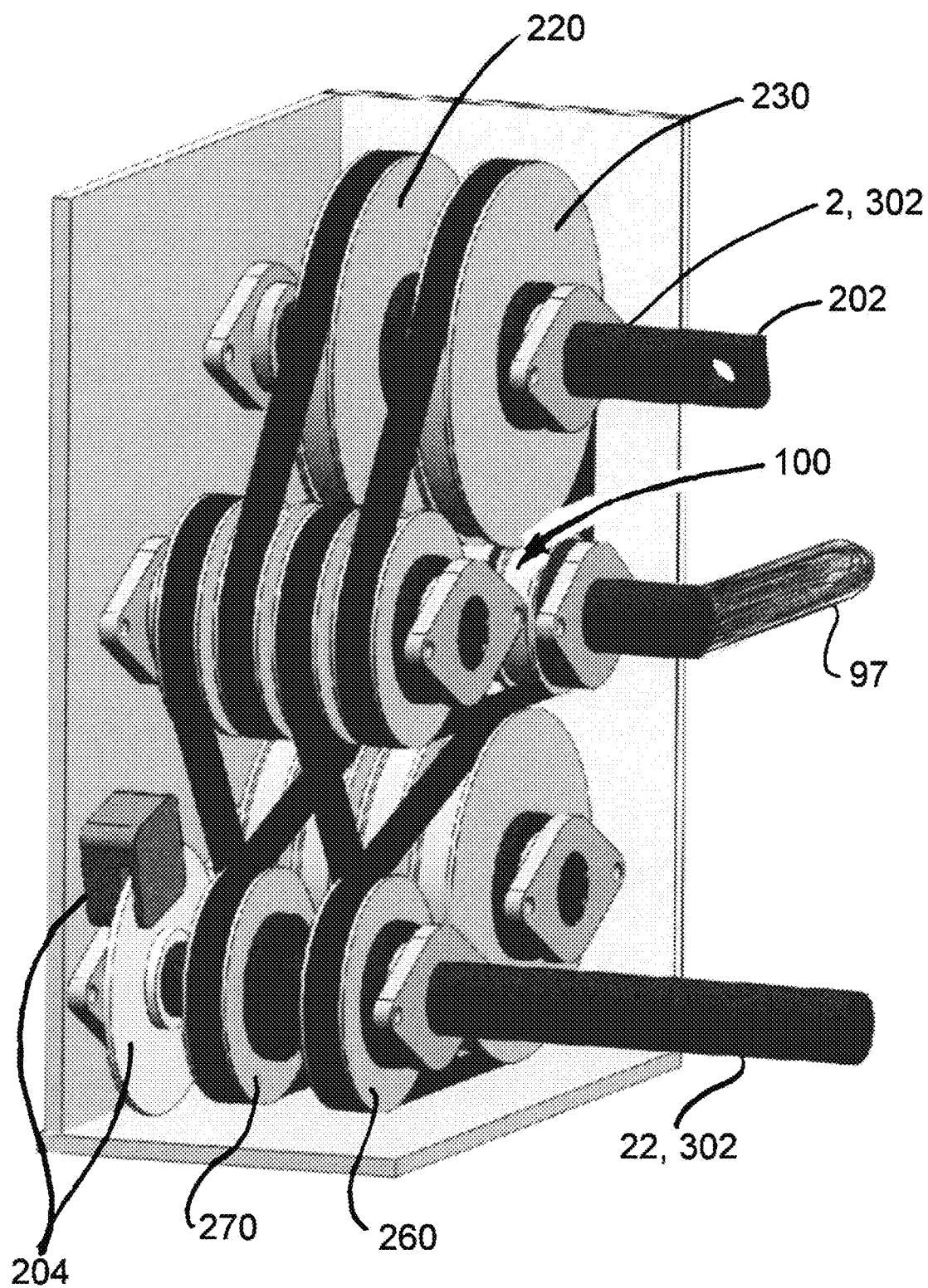
FIG. 4B depicts a perspective view of one embodiment of a transmission in which multiple pulleys and belts are used to provide the desired mechanical advantage (gear ratio).

FIG. 4B depicts one embodiment of a transmission where multiple pulleys and belts are used to provide the desired mechanical advantage (gear ratio). In most respects the transmission is the same as in FIG. 4A with the exception that the forward pulleys/sprockets 230 and 260 and the reverse sprockets/pulleys 220 and 270 are in swapped positions, i.e. moved from one side to the other left and right as viewed. Also, there are 2 additional shafts and additional pulleys/sprockets to provide for the desired gear ratio within the space allotted for the transmission housing.

Figure 5:
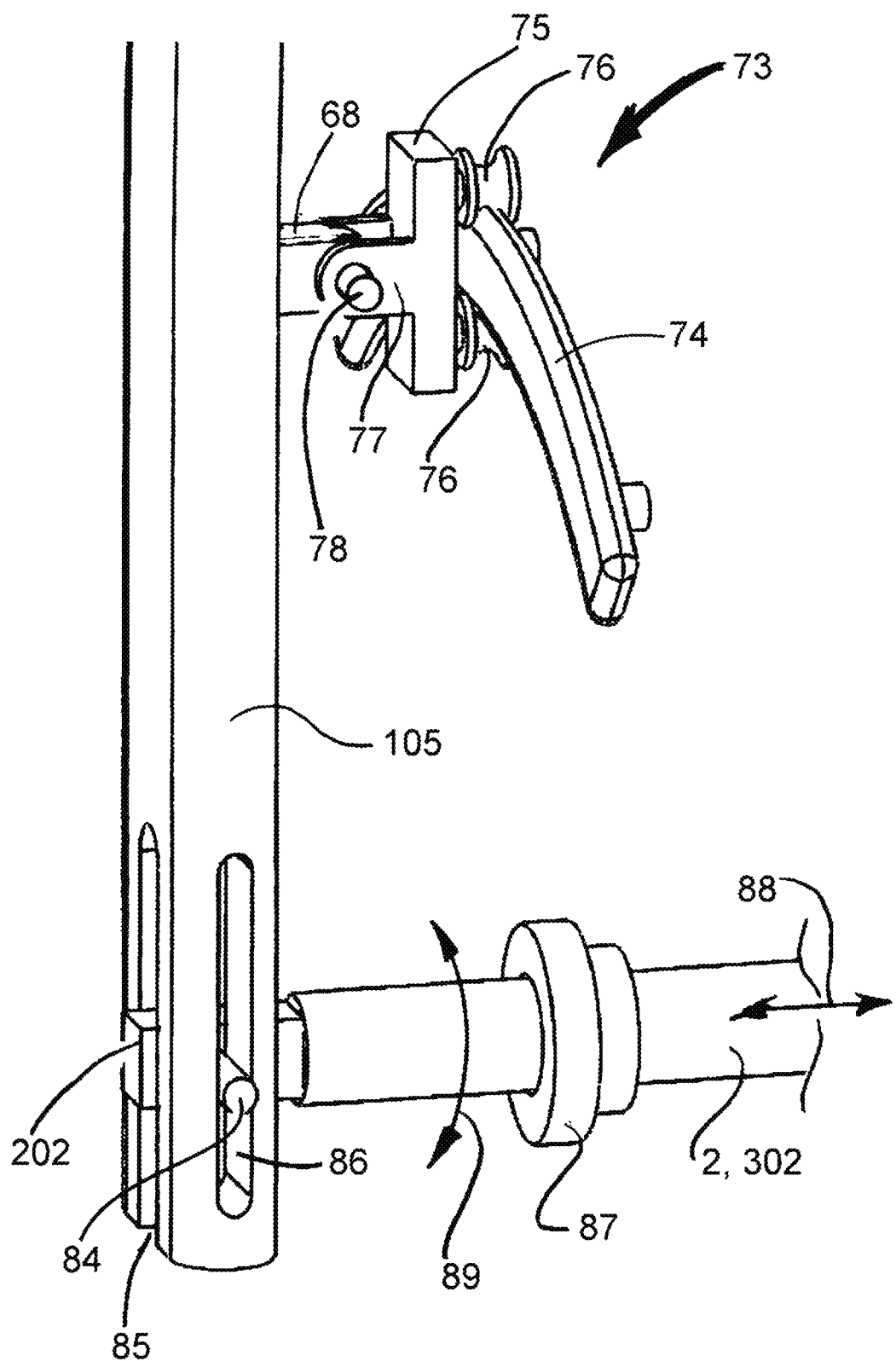
FIG. 5 depicts a perspective view of an embodiment of the drive elements which utilizes rollers on a curved track to provide a rotating fulcrum.
Figure 6C:
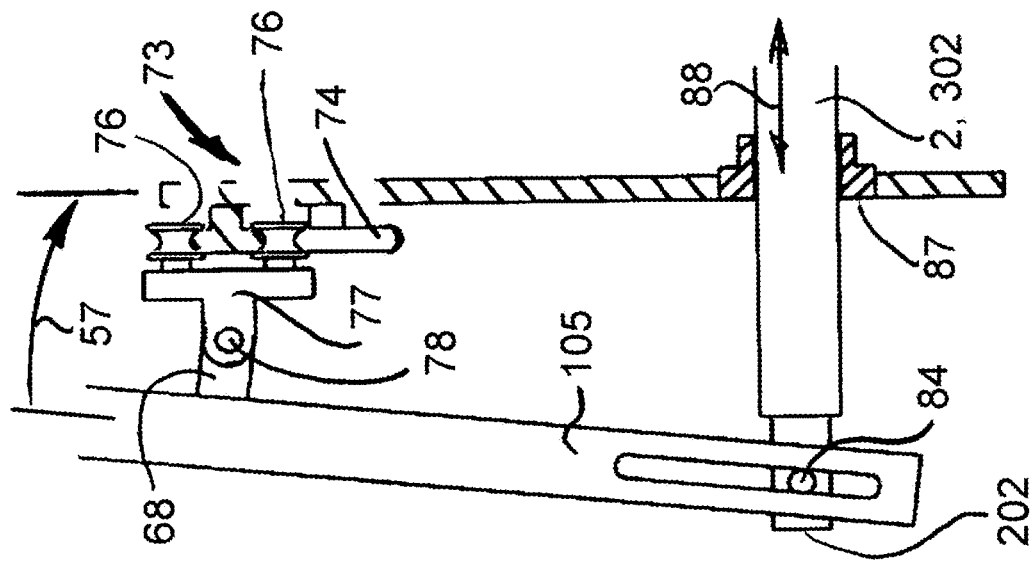
FIGS. 6A, 6B and 6C depict front views of the mechanism from FIG. 5, showing how the levers are positioned for an embodiment with three gears; Forward, Neutral and Reverse.
Figure 6B:
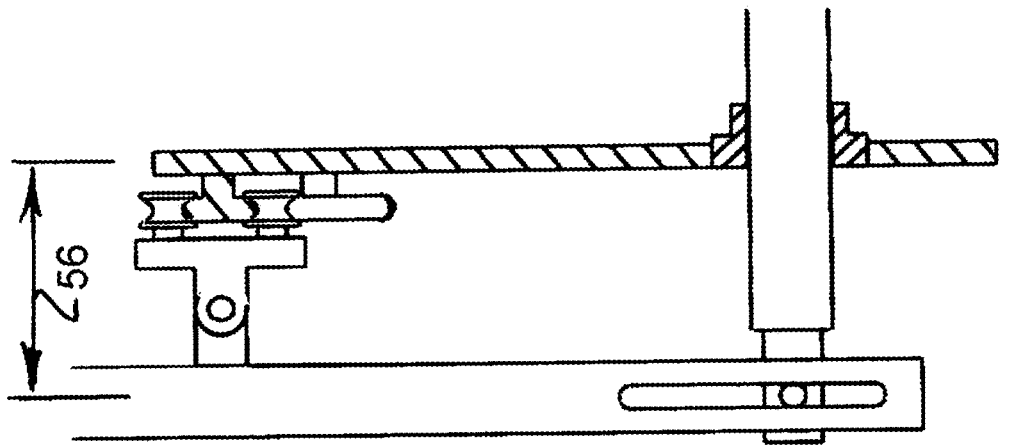
Figure 6A:
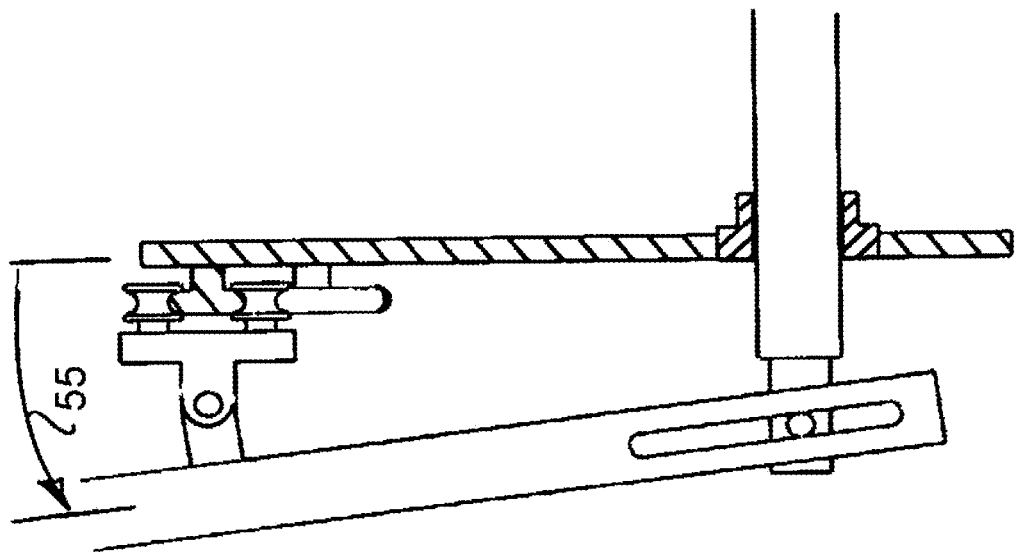
Figure 7:
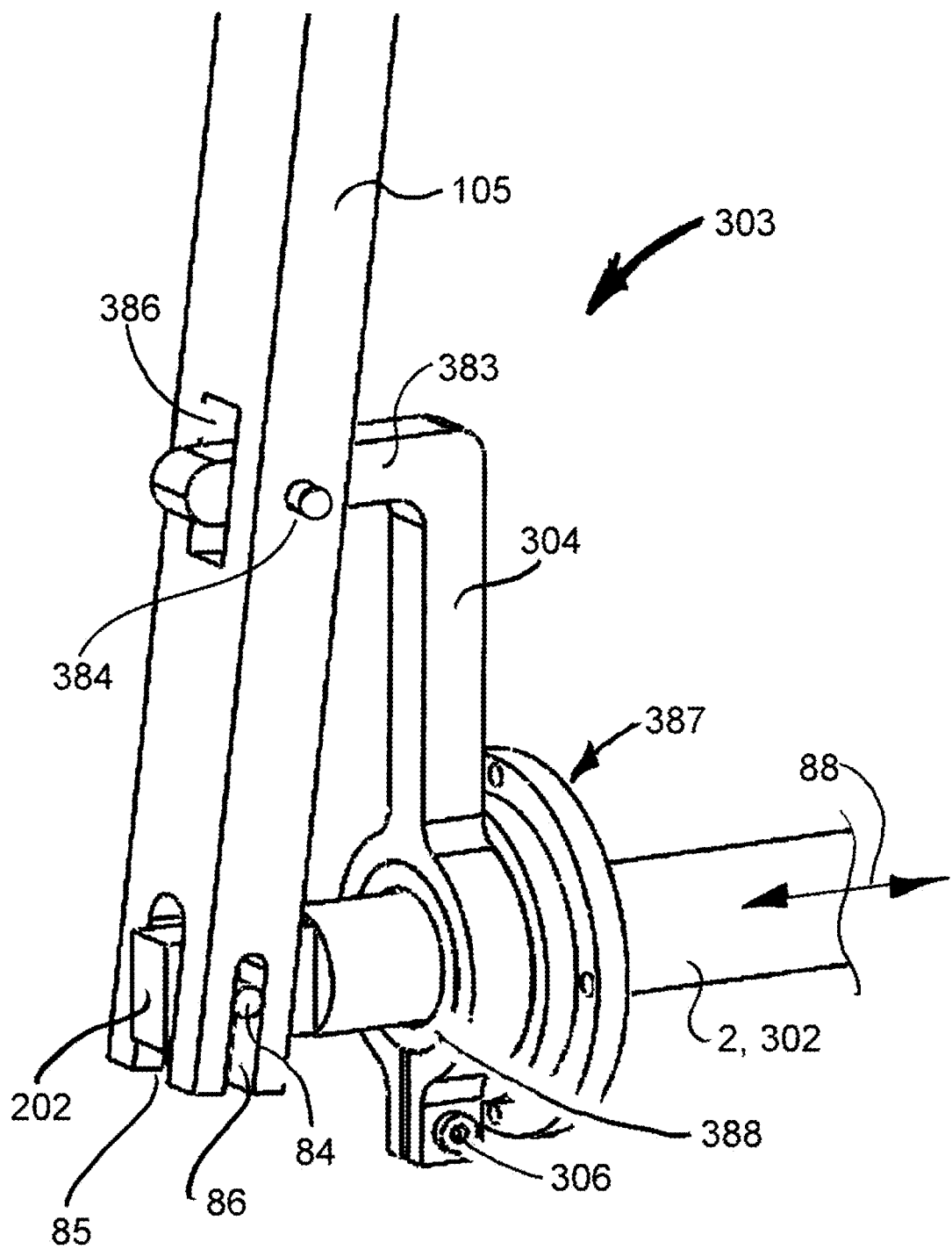
FIG. 7 depicts a perspective view of an embodiment a rotating fulcrum which utilizes a yoke secured to the inner race of the bearing.

What is referred to herein a "rotating fulcrum" 73 in FIGS. 5 and 7 and as referenced in FIGS. 6A-6F and FIGS. 8 and 9, allows the input shaft to move forward and backward in order to propel the wheelchair. This rotating fulcrum 73 allows for pushing and pulling the driveshaft in and out of the transmission via the lever 41 so that shifting from forward to neutral to reverse can occur. Shifting happens when this input driveshaft is slid in and out of one-way clutch bearings inside the transmission, as more fully described elsewhere.

During the forward or reverse swing of the drive lever 41 forward or backwards, the user must be able to move that drive lever 41 inboard or outboard (i.e. left or right looking towards the front of the conveyance, as seen in reference FIGS. 6A-6F arrows 55, 56 and 57) to move the input shaft into the appropriate position for forward, neutral or reverse. Therefore, a pivot/fulcrum located above the lever driveshaft should be able to rotate with the lever both forward and backwards at all times. The depicted carriage and rollers in FIG. 5 and semicircular track is one embodiment or a rotating fulcrum to address this requirement.

By way of example and with respect to the embodiment of the transmission logic of FIGS. 12A-12E and FIGS. 13-18 and FIG. 4A, forward gear position of the lever is represented by FIG. 6C and FIG. 6F, i.e. lever moved inward, neutral gear lever position is represented by FIGS. 6B and 6E, i.e. lever in middle position and reverse gear lever position is represented by FIGS. 6A and 6D, i.e. lever moved outward. With respect to FIG. 5, the track is affixed to each side of the frame of the conveyance concentric with the input shaft. A clevis 77 extends outward from the carriage 75 and rollers 76. The rollers have a V shape around their circumference so as to capture the V-shaped track 74 above and below it so that the carriage can move radially around the track but will not pull off the track. The clevis 77 which is attached to the carriage 75 rotates around a removable fulcrum pin 78. This pin connects the tang 68 on the lower part of the lever 105 to the clevis 77 on the carriage 75. The input shaft 2 or 302 is located radially below the carriage and rollers and fulcrum pin. However, a different embodiment can place the input shaft above the carriage and rollers. There is also a tang 202 on the end of the input shaft. A pin 84 goes through the tang 202 at the end of the lever driveshaft which protrudes out of the tang on both sides. This allows the forward and backward motion of the lever to be transmitted to the input shaft 2 or 302. There is a "clevis" 85 on the bottom end of the lever which has a slot cut into it 86. It slides over the pin 84 which is on the tang at the end of the input shaft. This allows the lever, while pivoting on the rotating fulcrum, to push and pull the input shaft in and out arrows 88 and also accommodate the small movement up and down of the end of the lever relative to the pin which occurs due to this movement of the lever in and out. There is a radial bearing 87 which supports the input shaft and allows it to rotate. The bore in the inner race of the bearing, which accepts the input shaft, is also outfitted as a bushing which allows the input shaft to move freely in and out of the transmission housing, so that shifting can be accomplished into forward, neutral and reverse. The fulcrum pin 78 is removable. When this fulcrum pin is removed, and the lever is moved well aft, it allows the lever to be moved outward to allow the user an even more unobstructed access to the wheelchair seat. Also, the lever can be removed for purposes including stowage and/or transport when the fulcrum pin 78 is removed and pin 84 is removed.

FIG. 7 item 303 is an additional embodiment of a "rotating fulcrum"; its use and method of function has been described above. In this embodiment, the bearing 387 provides both free rotation of the input shaft 2 or 302 and movement in and out of the frame and transmission arrows 88. In addition, the extended inner race of the bearing 388 supports a "yoke" 304 which is clamped to said extended inner race of the bearing. This "yoke" is this able to rotate forward and backwards as the lever moves forward and backward as the lever transmits forward and backward rotation to the input shaft 2 or 302 via the tang 202 and clevis 85. The top of the "yoke" 304 has a bend in it, area 383 which protrudes through a slot 386 in the lower portion of the lever 105. A fulcrum exists where pin 384 connects said top of the "yoke" to said lower portion of the lever. Therefore, when the lever 41 is moved sideways (i.e. left and right as seen looking toward the conveyance from the front) it pivots on pin 384 as a fulcrum and forces the input shaft in an out of the frame 42 and transmission, providing for forward, neutral and reverse gears as described elsewhere. This functionality is also depicted in FIGS. 8A, 8B and 8C.

Figure 9B:
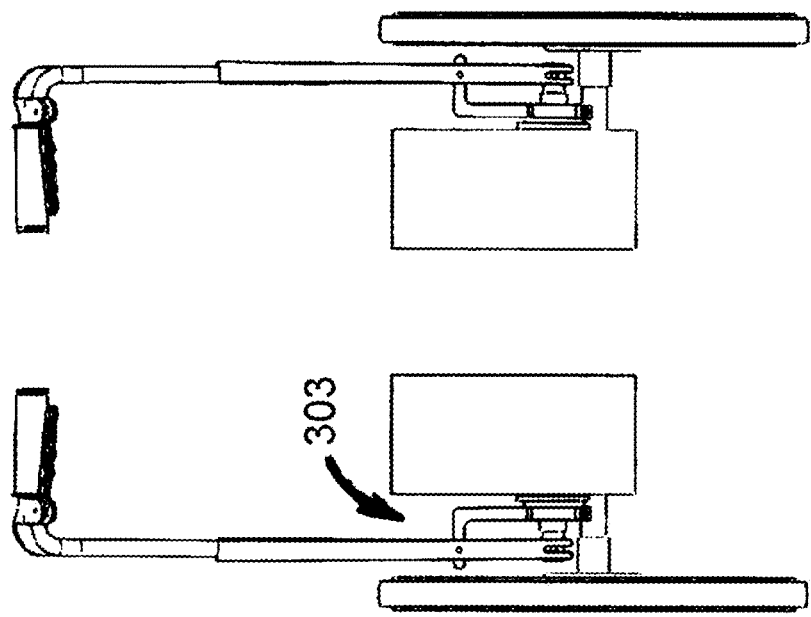
FIGS. 9A and 9B depict the front views of the drive trains showing the two types of rotating fulcrums described in FIGS. 5-8C.
Figure 9A:
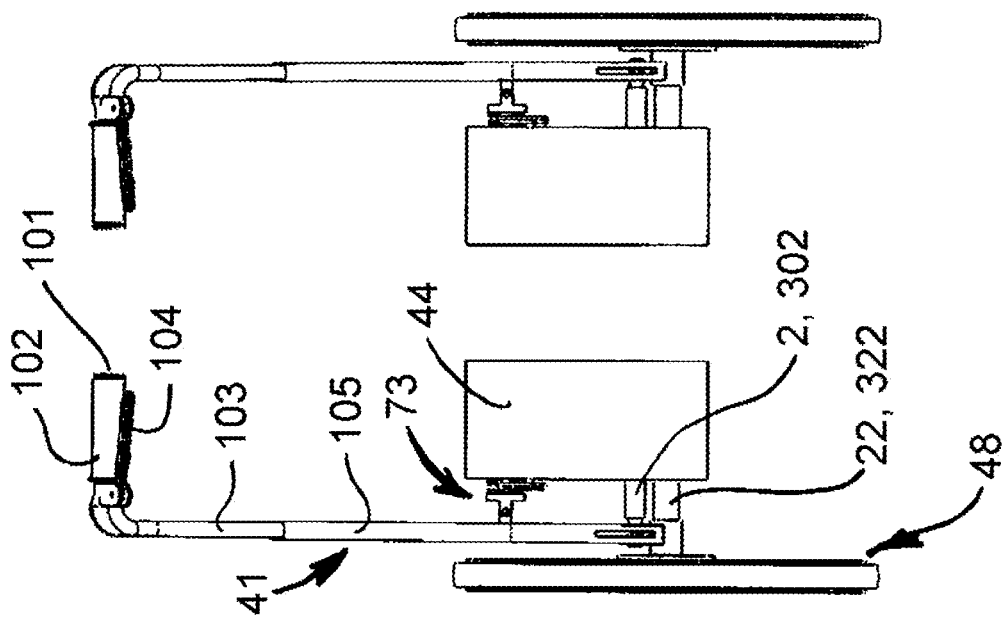

FIG. 9A is a front view of an embodiment of the drive train elements of the conveyance which utilizes rotating fulcrum as embodied in item 73. FIG. 9B is a front view of an embodiment of the drive train elements of the conveyance which utilizes rotating fulcrum as embodied in item 303.

FIGS. 10A, 10B and 10C depict how the top portion of the drive lever 103 drive lever "telescopes" up and down to allow the mechanical advantage applied to the input shaft to be "infinitely" adjustable and thereby give an "infinite" range of gear ratios. The conveyance does not have to be stopped to do this nor does the forward and back movement of the levers have to be stopped to do this. To prevent the lever from moving up or down when the user does not want it to, the upper part of the lever may be either "self-locking" or may be released and locked into place with a mechanism similar to that used, for instance, with telescoping handles on rolling luggage, in which case the upper part of the lever can be released to move, for instance, by a "release button" on the end of the lever's handle near the thumb of the user 101 (FIG. 1B).

In order to understand the figures that follow, it is helpful to understand the conventions used for the various components. FIG. 11A item 1 is a graphical representation used throughout these "logic diagrams" which depicts the "ground down" or reduced diameter area of the shaft, and generally the input driveshaft or input 2 which is attached to a lever 41 of FIG. 1A. The "ground down" portion 1 of the shaft is grossly exaggerated for clarity. When the location of a "ground down" portion 1 of a shaft 1 is totally under and within the confines of a one way clutch bearing such as depicted in FIG. 11C, item 3', there is sufficient change in the diameter of the shaft so that regardless of which direction the shaft is turned the one-way clutch bearing 3' does not grab/engage the shaft at location 1 and therefore the shaft is free to turn in either direction within the one-way clutch bearing and conversely the one-way clutch bearing is free to turn in either direction around the shaft at that location along the shaft.

Figure 11B:
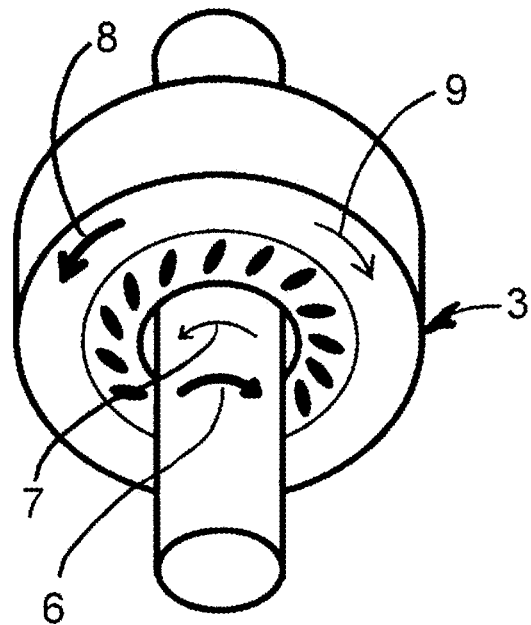
FIGS. 11A-16B depict transmission "gear logic" drawings which illustrate the how the transmission functions in different modes and embodiments.
Figure 11A:
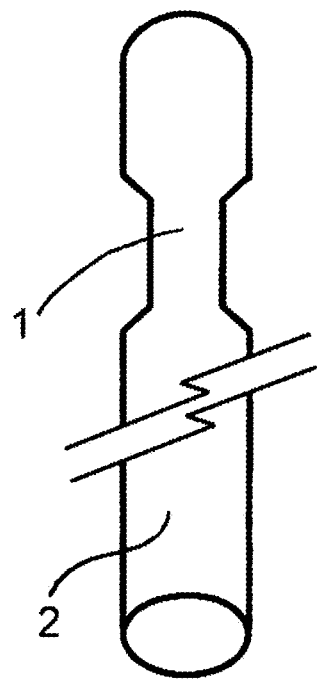
Figure 11C:
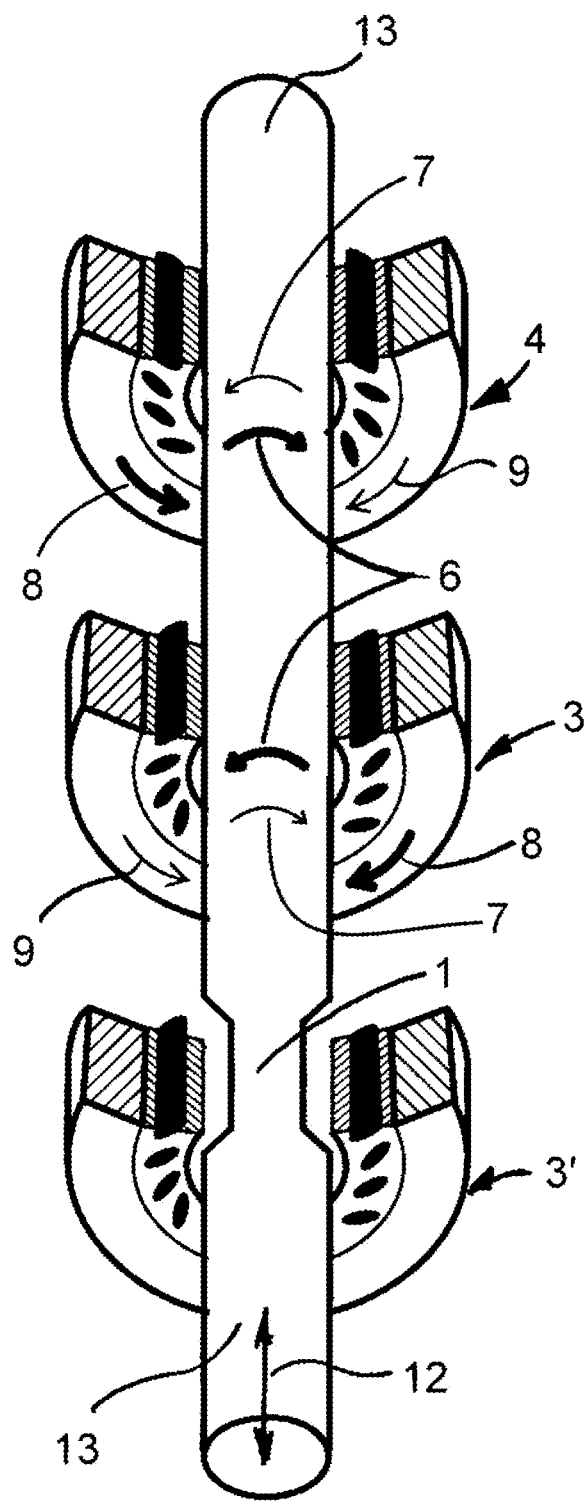

FIG. 11B, item 5 and FIG. 11C, items 3, 3' and 4 represent mechanical elements of a pulley, sprocket, or gear which has pressed/secured onto it a one-way clutch bearing which has a shaft running through it. But the said mechanical elements of a pulley or sprocket or gear are not shown for the sake of simplicity and understandability of the "transmission gear logic" diagrams. However, in some of the drawings what appears to be a belt is representative of a belt or chain around a sprocket or pulley.

Note that a one-way clutch bearing can be placed on a shaft in two ways. The way it is installed on the shaft determines which direction a shaft placed into it will grab when turning the shaft and which direction the shaft will be fee to spin/slip when turning the shaft within the one-way clutch bearing. In FIG. 11C One-way clutch bearing 3 represents a one-way clutch bearing which, when located on a portion of shaft 13 which is not reduced in diameter, is free to rotate/slip backwards (counterclockwise) around the shaft as indicated by the larger but lighter arrow 9 on the outer race and it also represents that the shaft 13 within said one-way clutch bearing is free to rotate within the one-way clutch bearing forward (clockwise) as depicted by the smaller lighter arrow 7 on the shaft. Further, conversely and by analogy, the one-way clutch bearing 3 represents a condition where when it is rotated forward (clockwise) it grabs the shaft 13 as depicted by the larger darker arrow 8 on the outer race of the one-way clutch bearing. It also depicts that when the shaft is rotated backwards (counterclockwise) the shaft grabs the one-way clutch bearing as depicted by the shorter darker arrow 6 on the shaft 13.

In FIG. 11C when the one-way clutch bearing 4 is placed on a shaft such as 13 the opposite way as with one-way clutch bearing 3, as depicted, by analogy the mechanical system works just the opposite of the conditions as depicted with one-way clutch bearing 3 and the shaft within it, as depicted and defined by the same arrow conventions (i.e. arrow direction, size and location), either on the outer race of the bearing or on the shaft. FIG. 11B is merely the same depiction of a one-way clutch bearing on a shaft as that of one-way clutch bearing 4, but is not a cut/sectioned view. Arrow 12 FIG. 11C indicates that the shaft 13 is free to also slide in and out of the one-way clutch bearing and thereby, when coupled with the fact that the shaft and the one-way clutch bearing are free to turn in both directions when at the location of the "ground down" portion of the shaft 1, form the basis for the "transmission logic" and the ability to shift gears by sliding the shaft in and out using the lever 41 FIG. 1A along with the rotating fulcrum FIG. 5-FIG. 9B.

The text below with accompanying FIGS. 12A-12E explains methods shifting of gears into Forward into Neutral or into Reverse for a push or pull embodiment of a transmission. Note this is not a push-pull embodiment where the conveyance moves in the direction into which it is shifted, regardless of the motion of the drive lever 41, be it forward or backward.

Figure 12A:
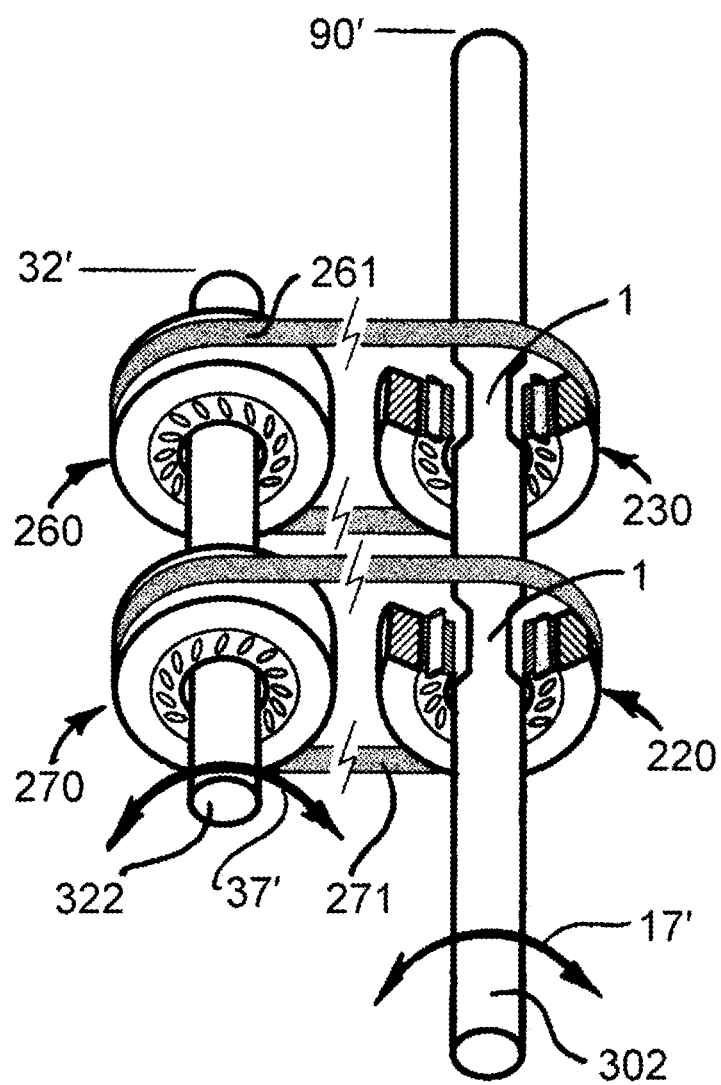

FIG. 12A depicts an embodiment of the transmission in neutral gear in the push or pull configuration/embodiment. Among other reasons, a neutral gear has utility so that the drive levers 41 can be positioned out of the way for entry and exit from a wheelchair (transitions) and to allow a wheelchair or other conveyance to be pushed, pulled and turned unimpeded, from behind. In this configuration/embodiment, for neutral gear, the drive lever 41 is moved to the center position. With the lever in this center position, because of the "rotating fulcrum" such as depicted in FIGS. 5, 6A,6B,6C, 6D, 6E, 6F, 7, 8A, 8B, 8C, and 9A, 9B, it moves the input shaft to the middle position 90' as well to position 90'.

As can be seen in FIG. 12A, the two "ground down" portions 1 of the input shaft 1 each sit inside of the two one-way clutch bearings 220, 230, 260 and 270. Therefore, the input shaft 302 spins freely within each of these two one-way clutch bearings and therefore movement of the drive lever 41 and resultant rotation of the input shaft 302 forward or backward, arrow 17', has no effect on any of the pulleys/sprockets and the drive lever 41 attached to input shaft 322 can move freely forward or backward without any impediment.

Note that the output shaft 322 to the drive wheel will turn some of the one-way clutch bearings and their attached pulleys/sprockets and the belts/chains attached to them if the drive wheel is rotated forward or backward as, for instance when the wheelchair or other conveyance is being manipulated from behind such as being pushed, pulled or turned arrow 37'. This will then rotate some of the one-way clutch bearings 220 and 230, depending on whether the drive wheel and therefore the output shaft 322 is rotating forward or backward. But each of these one-way clutch bearings have "ground down" portions of the input shaft 1 within them. Therefore, rotation of the drive wheel and output shaft 322 in either direction, forward or backward, has no effect on the input shaft 302 or the attached drive lever 41 and therefore the input drive shaft 302 can move freely in either direction arrow 17' and also the attached drive lever can move freely forward or backward without any impediment.

Location 32' on the output drive wheel shaft 322 is the end of the shaft opposite the drive wheel. There are embodiments where this end of the shaft can be extended through the transmission housing toward the inside/middle of the conveyance to be used as a power takeoff to power rotational devices such as an electric generator, a compressor or a pneumatic or hydraulic pump and other rotary devices. Further, there are embodiments where this same extension of the shaft can be used as an input shaft for use of an electric motor, or other embodiment of a drive unit, to augment/assist the user of the conveyance to propel the conveyance.

Figure 12B:
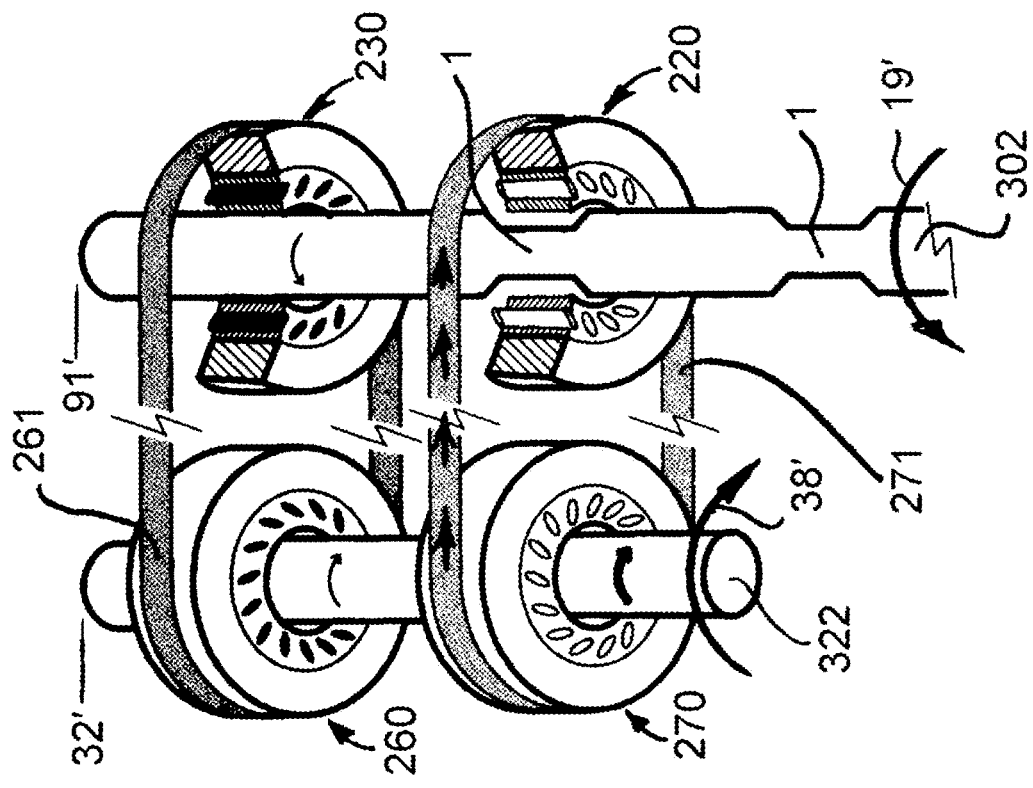

FIG. 12B depicts Forward gear with the drive lever 41 being pushed forward. The lever is pushed forward for forward propulsion and is free to move backward, unimpeded, to start the next forward stroke. This is the "drive logic" for a situation for one embodiment of forward gear where propulsion is desired in a forward direction—in forward gear—only when the user pushes on the levers. There is no propulsion either forward or backwards in this forward gear when the lever is moved rearward/pulled backward. That is this is not a "push pull mode".

FIG. 12B depicts the input shaft in position 91'. In this embodiment, forward gear is when the input shaft 302 is pulled outward by means of the lever. The user then pushes the lever forward which rotates the input shaft 302 forward. The shaft has been moved into a position where only the "ground down" section 1 of the input shaft 302 is within one-way clutch bearing 220. Therefore, the shaft just spins freely inside of this one-way clutch bearing and does not move the gear or pulley or sprocket which is attached to the clutch bearing, in either direction. The input shaft 302 is rotating forward and the one-way clutch bearing 230 is situated such that the shaft drives it in the same direction as the shaft, that is in the forward direction, and the pulley or sprocket turns with it. With the pulley or sprocket turning forward it pulls the belt or chain 261 along with it in the forward direction. With the belt or chain 261 being pulled in a forward direction, it then drives the rear pulley or sprocket forward with it. The one-way clutch bearing 260 is pressed/secured into the pulley or sprocket and is configured such that this movement grabs onto the output shaft 322 and rotates it forward.

One end of the shaft is attached to the drive wheel and therefore the forward movement (push) of the drive lever 41 rotates the drive wheel forward and propels the wheelchair drive wheel 48 (see FIG. 1) on that side forward. The output shaft also goes through one-way clutch bearing 270. The configuration of the one-way clutch bearing 270 is such that the output shaft 322 drives it and the attached pulley or sprocket in a forward direction. The one-way clutch bearing 270 and pulley or sprocket then drive the attached belt or chain along with it as well. The belt or chain 271 then drives the pulley or sprocket 220 in a forward direction. However, because the input shaft 302 within the one-way clutch bearing 220 which is attached to that pulley or sprocket has the "ground down" section 1 of the input shaft within it, it nearly spins and does not affect the movement of the input shaft 302. An embodiment using location 32' is one location to use as a rotational power take off or input for an electric motor assist.

Figure 12C:
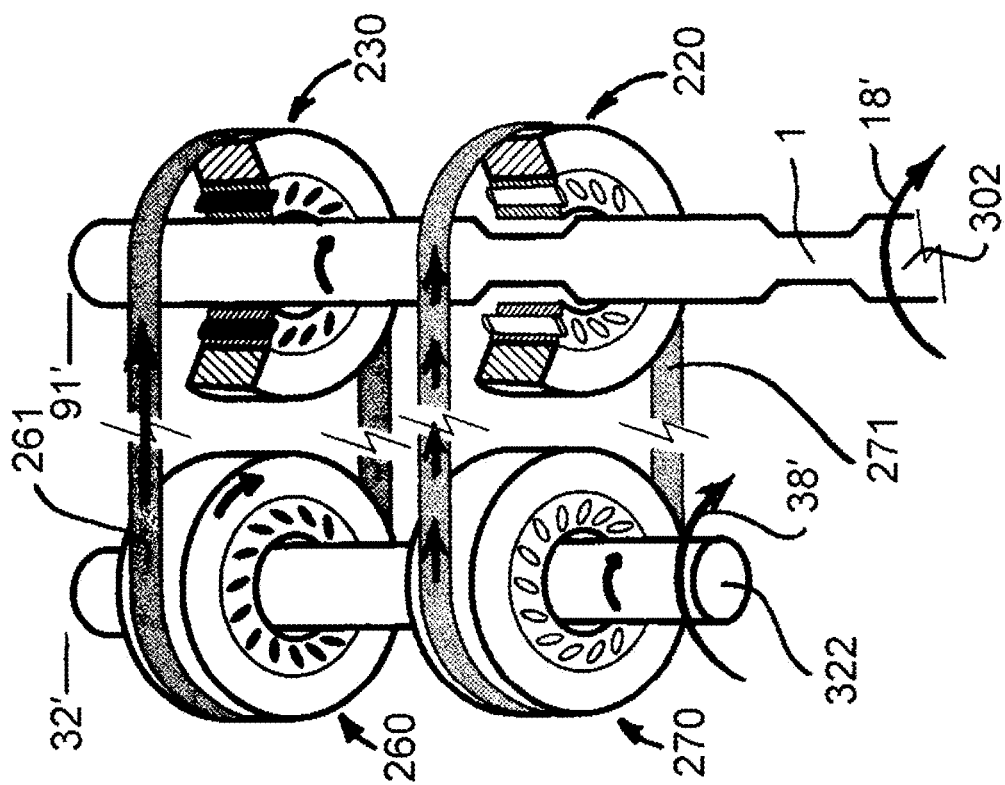

FIG. 12C depicts Forward gear where the drive lever 41 is being pulled back to start a new forward stroke and also depicts the conveyance coasting forward. In this configuration, forward gear is when the input shaft 302 is pulled outward by means of the drive lever 41 to position 91'. The user then moves the lever backwards (pulls it back) which rotates the input shaft 302 backward. The shaft has been moved into a position where only the "ground down" portion 1 of the input shaft 302 is within one-way clutch bearing 220. Therefore, the shaft just spins freely inside of this one-way clutch bearing and does not move the gear or pulley or sprocket which is attached to the clutch bearing, in either direction. The input shaft 302 is rotating backward. The one-way clutch bearing 230 is situated such that the shaft slips within this one way to clutch bearing and therefore cannot turn the pulley or sprocket attached to it or the belt attached to the pulley or chain attached to the sprocket. Therefore, in this configuration, in forward gear and because the Transmission is not in a "push pull mode", on this return stroke (rear stroke) of the drive lever 41, the drive wheel 48 (FIG. 1), just coasts forward. However, the output shaft 322 which connects to the drive wheel is spinning/coasting within the two one-way clutch bearings 260 and 270. The output shaft 322 within the one-way clutch bearing number 260 has no effect on it, because the configuration of that one-way clutch bearing is such that when the output shaft 322 runs in a forward direction within it, it merely slips within the one-way clutch bearing 260.

However, also the output shaft which connects to the drive wheel 48 is spinning forward within one-way clutch bearing number 270 and it drives it and its attached pulley or sprocket forward. The belt or chain 271 then moves with it and turns the pulley or sprocket and one-way clutch bearing 220 within it forward as well. But, because the input shaft within the one-way clutch bearing 220 has the "ground down" portion of the input shaft 1 within it, it does not affect the shaft movement and therefore does not prevent the drive lever attached to shaft, from being moved backward/being pulled backward. So therefore, the drive lever 41 can be pushed forward for forward propulsion and is free to move backward, unimpeded, to start the next forward stroke and the drive wheel 48 coasts unimpeded. An embodiment using location 32' is one location to use as a rotational power take off or input for an electric motor assist.

Figure 12E:
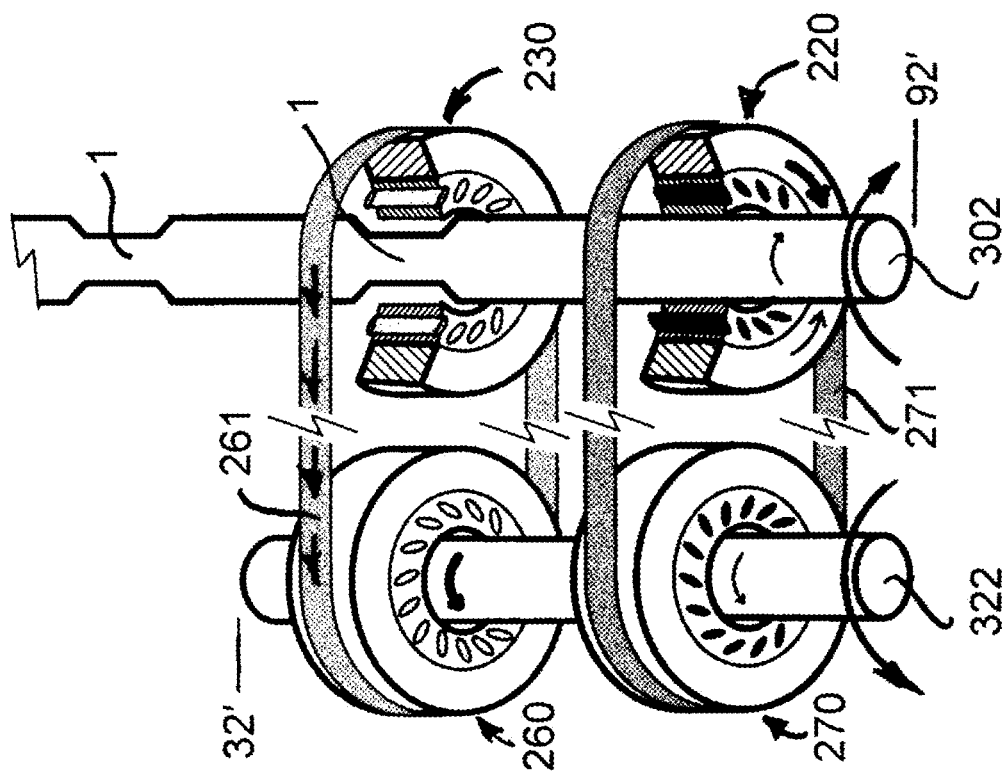
Figure 12D:
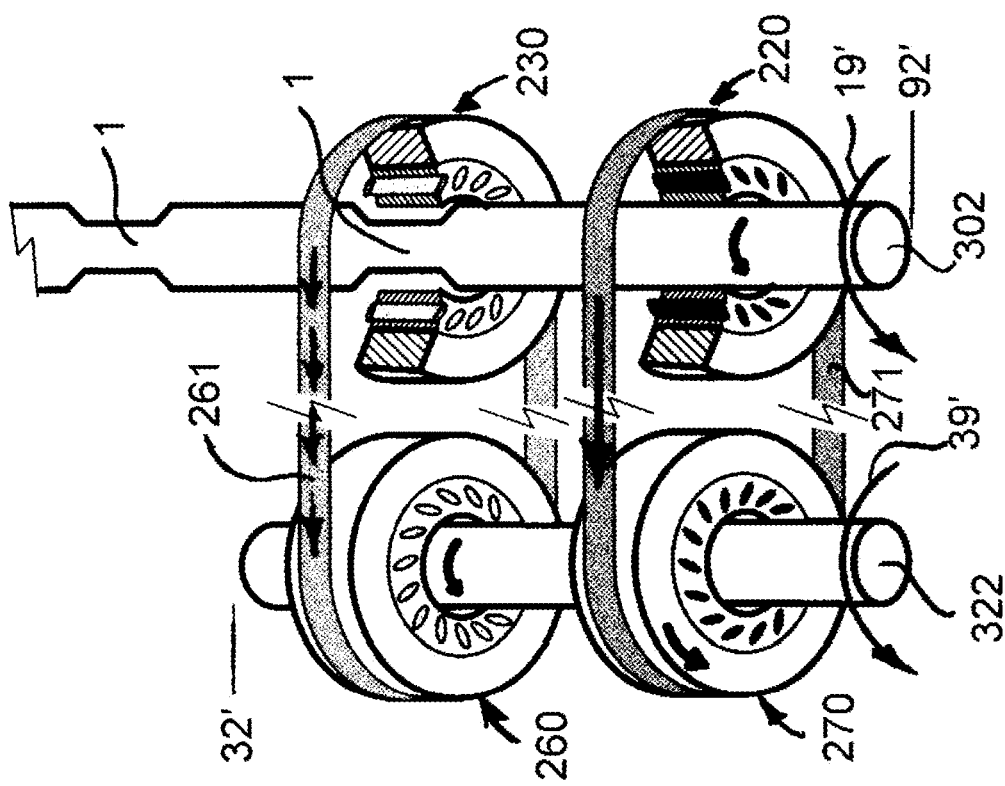

FIGS. 12D and 12E depict embodiments of the transmission where the drive lever 41 FIG. 1 can be pulled backward for backward propulsion and is free to move forward, unimpeded, to start the next backward stroke while the drive wheel 48 coasts backward. This is the "drive logic" for a situation where only forward neutral and reverse gears are utilized, and where propulsion is desired in a reverse direction—in reverse gear—only when the user pulls on the levers. There is no propulsion either forward or backwards in this reverse gear when the lever is moved forward/pushed forward. That is, this is not a "push-pull mode" embodiment. In this embodiment, reverse gear is when the shaft is pushed inward by means of the drive lever 41 to position 92'. The user then pulls the drive lever 41 backward which rotates the input shaft 302 backward. The input shaft 302 shaft is rotating backward and the one-way clutch bearing 220 is situated such that the input shaft drives it in the same direction as the input shaft, that is in the backward direction, and the pulley or sprocket turns with it. With the pulley or sprocket turning backward it moves the belt or chain 271 along with it.

The movement of the belt or chain 271 then drives the rear pulley or sprocket backward with it. The one-way clutch bearing 270 which is pressed/secured into that pulley or sprocket is configured such that this movement grabs onto the output shaft 322 and rotates it backward. One end of the output shaft 322 is attached to the drive wheel 48 and therefore the backward movement (pull) of the drive lever 41 rotates the drive wheel backward and propels the wheelchair on that side backward. Further, the input shaft 302 has been moved into a position 92' where only a "ground down" portion 1 is within this one-way clutch bearing 230. Therefore, the input shaft just spins freely inside of this one-way clutch bearing and does not move the gear or pulley or sprocket which is attached to the one-way clutch bearing 230 in either direction. But the output shaft 322 is also inside one-way clutch bearing number 260.

The configuration of the one-way clutch bearing 260 drives it and the attached pulley or sprocket in a backward direction. The one-way clutch bearing and pulley or sprocket then moves the attached belt or chain 261 with it. The belt or chain 261 then drives the pulley or sprocket which is attached to one-way clutch bearing 230 in a backward direction. However because the portion of the input shaft 302 within the one-way clutch bearing is a "ground down" section 1 of input shaft 302, it merely spins and does not affect the movement of the driveshaft. So the drive lever 41 can be pulled back to drive the drive wheel 48 in reverse and yet it is free to move forward unimpeded to begin the next stroke as described below.

FIG. 12E depicts Reverse where the drive lever 41 is being pushed forward to start a new forward stroke and also depicts the conveyance coasting backward. In this configuration, reverse gear is when the input shaft is pushed inward by means of the drive lever 41 to position 92'. The user then moves the drive lever 41 forward (pushes it forward) which rotates the input shaft 302 forward. The input shaft 302 is rotating forward and the one-way clutch bearing 220 is situated such that the input shaft slips within the one way to clutch bearing 220 and therefore cannot turn the pulley or sprocket attached to it or the belt attached to the pulley or chain attached to the sprocket. Therefore, in this configuration, in backward (reverse) gear and not being in a "push-pull mode", on this return stroke (forward stroke) of the drive lever, the drive wheel just coasts backward. The input shaft 302 has been moved into a position where only "ground down" section 1 is within one-way clutch bearing 230. Therefore, the shaft just spins freely inside of this one-way clutch bearing and does not move the gear or pulley or sprocket which is attached to the clutch bearing, in either direction.

However, the output shaft 322 which connects to the drive wheel 48 is spinning/coasting backward within the two one-way clutch bearings numbers 270 and 260. The output shaft within the one-way clutch bearing number 270 has no effect on the one-way clutch bearing, because the configuration of the one-way clutch bearing is such that when the shaft runs in a backward direction within it, it merely slips.

But, the output shaft 322 which connects to the drive wheel 48 is spinning backwards within the one-way clutch bearing 260. The output shaft within the one-way clutch bearing number 260 drives it and its attached pulley or sprocket backward. The belt or chain 261 then moves with it and turns the pulley or sprocket and one-way clutch bearing 230 within it, backward as well. However, because the input shaft 302 within the one-way clutch bearing number 230 has the "ground down" portion of the input shaft 1 within it, it does not affect the input shaft movement and therefore does not prevent the drive lever 41 and the attached input shaft 302 from being moved forward i.e. being pushed forward unimpeded. So therefore, the drive lever can be pulled backward for backward propulsion and is free to move forward, unimpeded, to start the next backward stroke.

Figure 13:
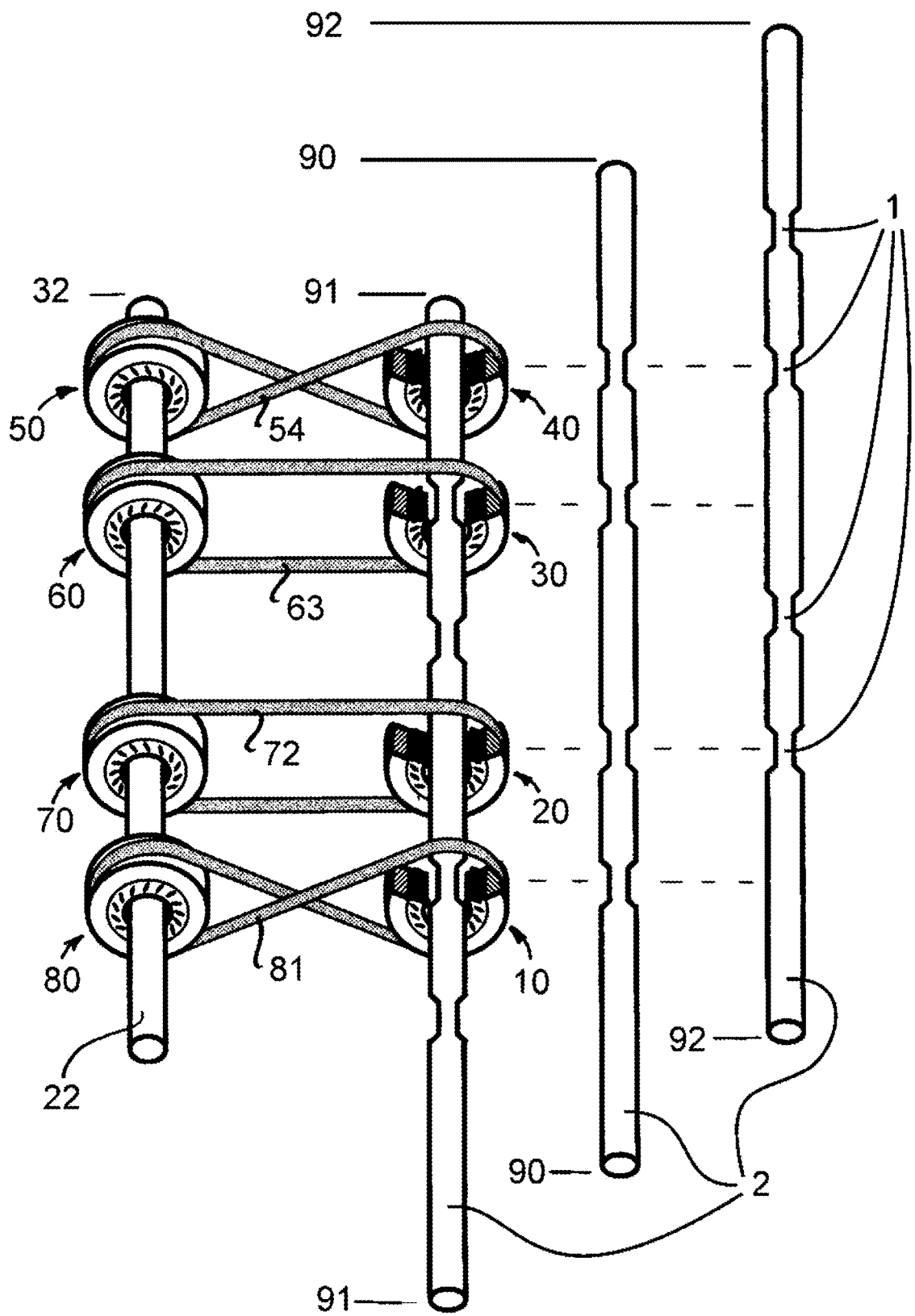

Referring to FIG. 13, a description of the operation of the transmission in a Push-pull "drive logic" configuration/embodiment follows. FIG. 13 demonstrates that there are "drive logic" configurations/embodiments where the conveyance, including a wheelchair, can be propelled forward when the levers are moved both forward and backwards and the conveyance can be propelled backward when the levers are moved both forward and backwards. This is the so-called "push-pull mode" or "push-pull configuration" or "push-pull embodiment" where the wheelchair is propelled in the same direction on both the push and pull of the levers. Even though the drawings show, in essence, that all of the pulleys/sprockets are the same diameter this would likely not be the situation in its actual manifestation. For instance, the gear ratio i.e. mechanical advantage, for forward drive may be different than the gear ratio for reverse. Further, additional pulleys, sprockets and/or gears and belts and chains can be utilized between the input shaft from the levers 2 and the output drive wheel shaft 22 in other embodiments of transmission logic.

Location 32 on the output drive wheel shaft 22, is the end of the shaft opposite the drive wheel. There are embodiments where this end of the shaft can be extended through the transmission housing toward the inside/middle of the conveyance to be used as a power takeoff to power rotational devices such as an electric generator, a compressor or a pneumatic or hydraulic pump and other rotary devices. Further, there are embodiments where this same extension of the shaft can be used as an input shaft for use of an electric motor, or other embodiment of a drive unit, to augment/assist the user of the conveyance to propel the conveyance. The "Push-pull" lever drive shaft and one-way clutch bearing configuration/embodiment depicted in FIG. 13 applies to all of the push-pull figures herein.

FIG. 13 is a "zoomed out" view of the major drive components inside the Transmission, where it is configured for a "Push-Pull" mode. In this example the lever drive shaft is all the way out for forward gear. FIG. 13 shows the lever drive shaft with four "ground down" sections 1 and depicts their relative position along the lever drive shaft. Also shown are the relative positions of the pulleys/sprockets, one-way clutch bearings 10, 20, 30, 40, 50, 60, 70, and 80 and belts/chain 81, 72, 63 and 54. FIG. 13 also indicates how the lever input drive shaft is positioned all the way out for forward drive position 91, is moved to the middle position 90 for neutral and is pushed all the way in for reverse, position 92. As mentioned elsewhere, depending on the end requirement, this sequence can be changed. The positioning of the lever input drive shaft 2 is accomplished via one of the various embodiments of the lever-rotating fulcrum such as depicted in FIGS. 5, 6A,6B,6C, 6D, 6E, 6F, 7, 8A, 8B, 8C, and 9A, 9B.

Figure 14A:
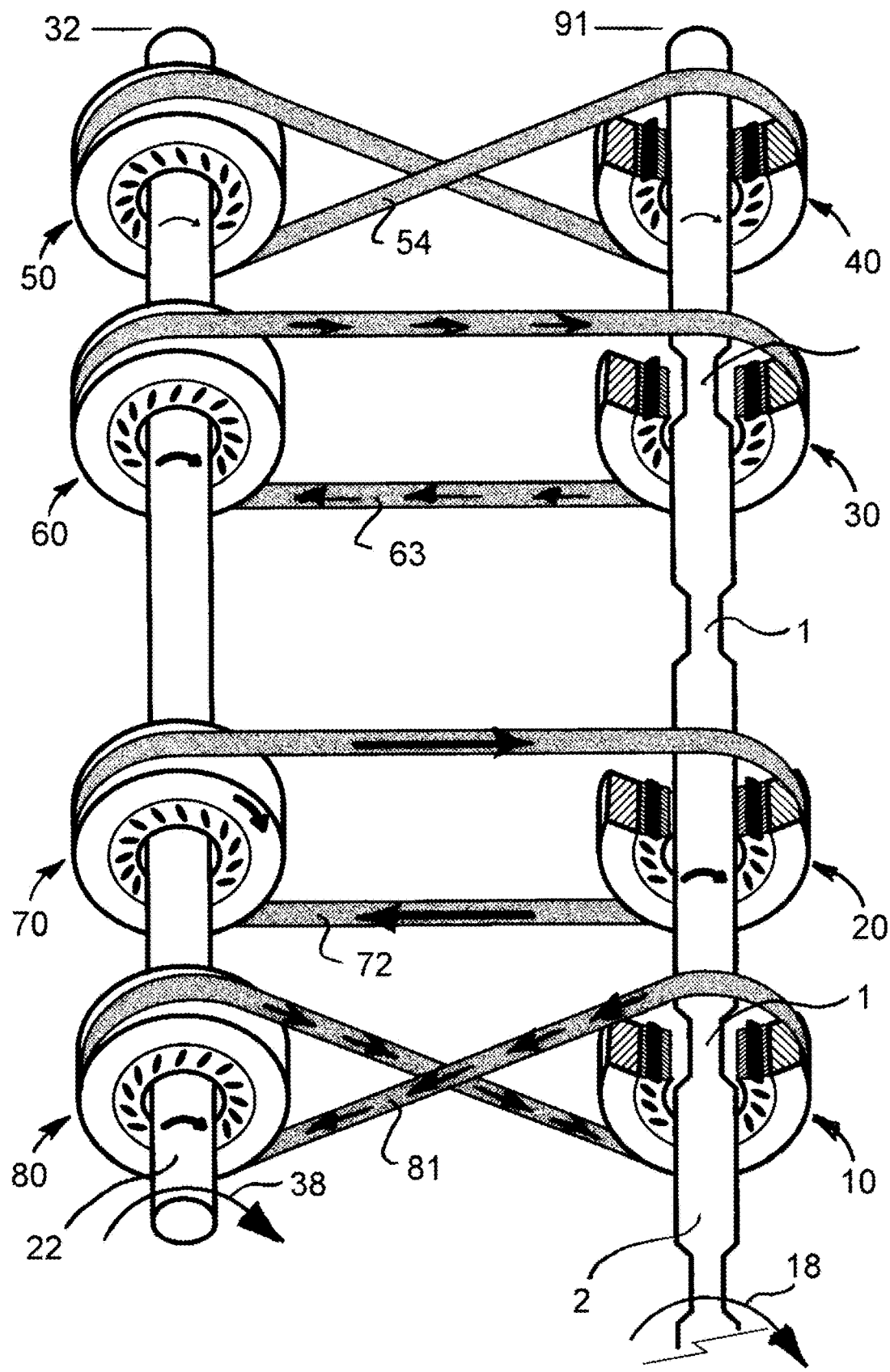

FIG. 14A depicts the transmission in forward gear, in the push-pull configuration, when the lever is pushed forward i.e. the forward Lever stroke. The result is that the drive wheel turns forward. In the push-pull configuration the drive wheel turns in the same direction no matter whether the lever is pushed forward or pulled backward. In other words, if the lever for a particular drive wheel is in forward gear the drive wheel moves forward whether the lever is pushed forward or pulled backward and, conversely, when in reverse gear, the drive wheel moves backwards whether the lever is pulled backwards or pushed forward. In this configuration, for forward gear, the lever drive shaft is moved all the way out position 91, i.e. the lever is moved inward which, because of the "rotating fulcrum" such as depicted in FIGS. 5, 6A,6B, 6C, 6D, 6E, 6F, 7, 8A, 8B, 8C, and 9A, 9B, it pulls the shaft out.

The lever is pushed forward which rotates the input shaft 2 forward arrow 18. The one-way clutch bearing 10 has the "ground down" portion of the shaft within it so it is not driven. The input shaft drives the one-way clutch bearing 20 forward and therefore rotates the pulley/sprocket forward pulling the belt/chain 72 with it and rotating the one-way clutch bearing 70 forward. The one-way clutch bearing 70 drives the output shaft 22 forward arrow 38. This output shaft is attached to the drive wheel. Therefore, the output shaft and drive wheel are rotated forward arrow 38. The output shaft 22 also drives the one-way clutch bearing 80 forward as well, which drives the pulley/sprocket forward and the belt/chain 81 moves with it. But because of the FIG. 8 of the belt/chain this drives the one-way clutch bearing 10 backwards. However, because the "ground down" portion of the input shaft 1 is within the one-way clutch bearing 10 the shaft is not affected and the one-way clutch bearing 10 merely spins freely. The output shaft 22 is running forward along its entire length. Because the output shaft is running forward along its entire length it drives the one-way clutch bearing 60 forward as well which causes the belt/chain 63 to be moved with it. The belt/chain 63 therefore rotates the one-way clutch bearing 30 forward with it. However, because the "ground down" portion of the shaft 1 runs through the one-way clutch bearing 30 the shaft is not affected. Again, the output shaft 22 is running forward its full length and enters one-way clutch bearing 50. However, because of the configuration of the one-way clutch bearing 50 the output shaft merely spins freely within it and the attached pulley/sprocket is not affected and it is not turned. Note that the input shaft 2 also turns along its entire length and goes through the one-way clutch bearing 40. However, it just slips within it and does not turn it. The input shaft 2 also goes through one-way clutch bearing 30. Because a "ground down" portion of the shaft is inside this one-way clutch bearing, the shaft rotation within it has no effect on it.

Figure 14B:
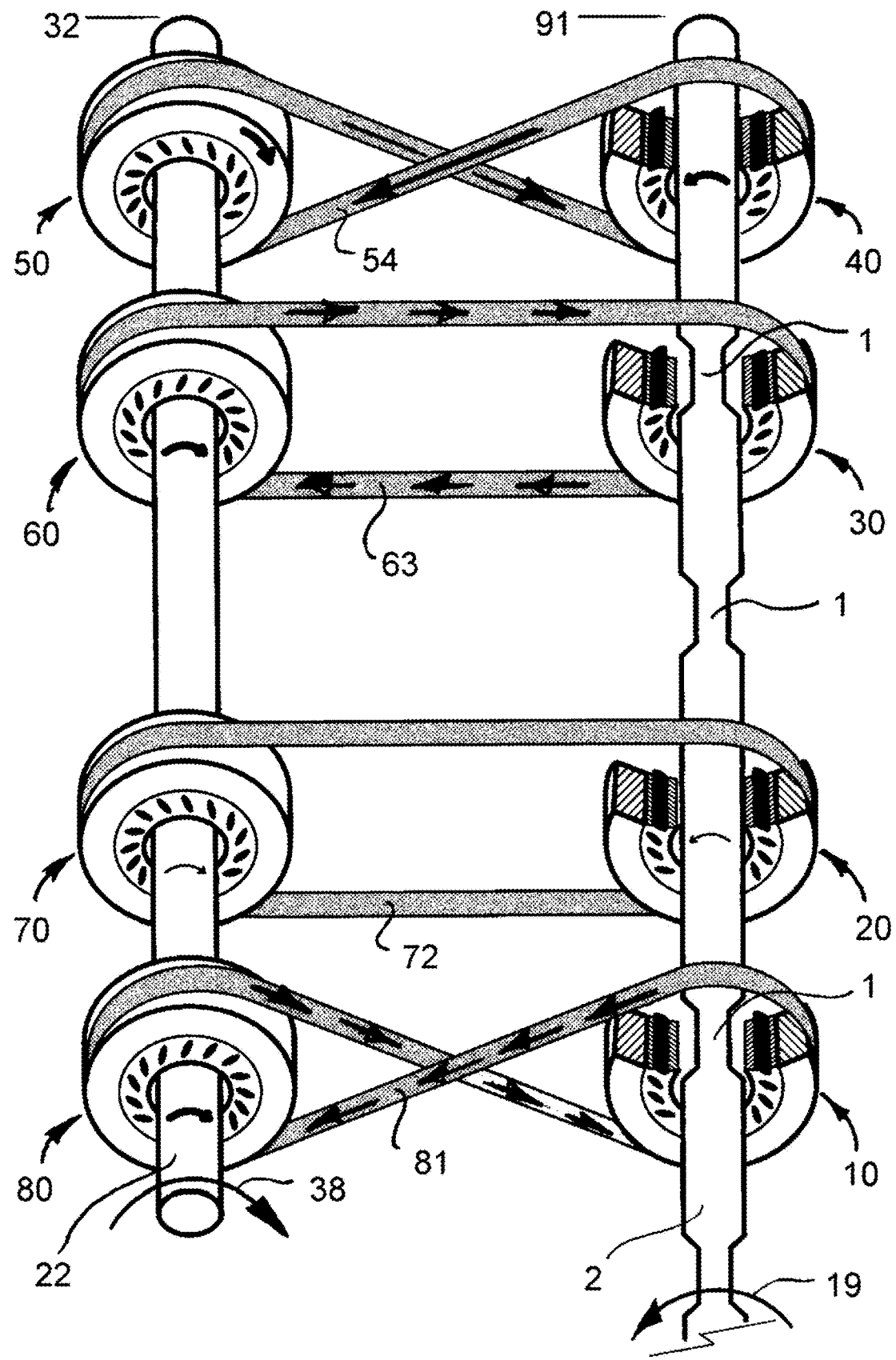

FIG. 14B depicts the transmission in forward gear in the push-pull configuration when the lever is pulled backward i.e. rear lever stroke. The result is that the drive wheel turns forward. In the push-pull configuration/embodiment the drive wheel turns in the same direction no matter whether the lever is pushed forward or pulled backward. In other words, if the lever for a particular drive wheel is in forward gear the drive wheel moves forward whether the lever is pushed forward or pulled backward and, conversely, when in reverse gear, the drive wheel moves backwards whether the lever is pulled backwards or pushed forward. In this configuration/embodiment, for forward gear, the lever drive shaft is moved all the way out position 91, i.e. the lever is moved inward which, because of the "rotating fulcrum" such as depicted in FIGS. 5, 6A,6B,6C, 6D, 6E, 6F, 7, 8A, 8B, 8C, and 9A, 9B, it pulls the shaft out. The input drive shaft 2 is rotated backwards arrow 19 by a pull stroke on the lever. However, because the transmission is in a push-pull configuration the result will be for the drive wheel to rotate forward, as the transmission is in forward gear. The input drive shaft 2 first enters one-way clutch bearing 10 which has a "ground down" portion of the shaft 1 inside it. Therefore, the shaft spins freely within one-way clutch bearing 10 and has no effect on it. The input driveshaft 2 also runs through one-way clutch bearing 20. Its configuration is such that the shaft slips within it and therefore the pulley/sprocket does not turn.

The input driveshaft 2 also goes through one-way clutch bearing 30 which has a "ground down" portion of the shaft 1 inside it. Therefore, the shaft spins freely within one-way clutch bearing 30 and has no effect on it. The input driveshaft 2 also goes through the one-way clutch bearing 40. This one-way clutch bearing 40 is configured such that when the input drive shaft 2 rotates backwards it drives the attached pulley/sprocket backwards and the attached belt/chain 54 moves with it. However, because the belt/chain 54 is configured in a FIG. 8, as shown, instead of driving the one-way clutch bearing 50 backwards, one-way clutch bearing 50 is driven forward.

One-way clutch bearing 50 is configured such that the output shaft 22 which is inside of it, drives this shaft 22 forward with it. The output shaft to the drive wheel 22 rotates forward and rotates the drive wheel forward with it. Thus, the rearward rotation of the input driveshaft 2 is translated into forward rotation of the output shaft 22 and attached drive wheel. The output shaft 22 is turning forward along its entire length and therefore goes through the one-way clutch bearing 60. This drives the one-way clutch bearing 60 forward with the shaft 22. The belt/chain 63 moves with it and rotates the one-way clutch bearing 30 forward. However, because there is a "ground down" portion of the input shaft 1 inside one-way clutch bearing 30, it merely spins freely and does not affect the rotation of the shaft 2.

The output shaft 22 also goes through one-way clutch bearing 70. This one-way clutch bearing 70 is configured such that the shaft 22 merely slips within it so the pulley/sprocket attached to it does not turn. The output shaft 22 also goes through one-way clutch bearing 80. This one-way clutch bearing 80 is configured such that output shaft 22 which is rotating forward, drives it 80 and the attached pulley/sprocket attached to it forward as well. The belt/chain 81 moves along with it. Because of the FIG. 8 configuration, it drives one-way clutch bearing 10 forward. However, because there is a "ground down" portion of the input shaft 1 inside one-way clutch bearing 10, one-way clutch bearing 10 merely spins freely and does not affect the rotation of the shaft 2.

Figure 15:
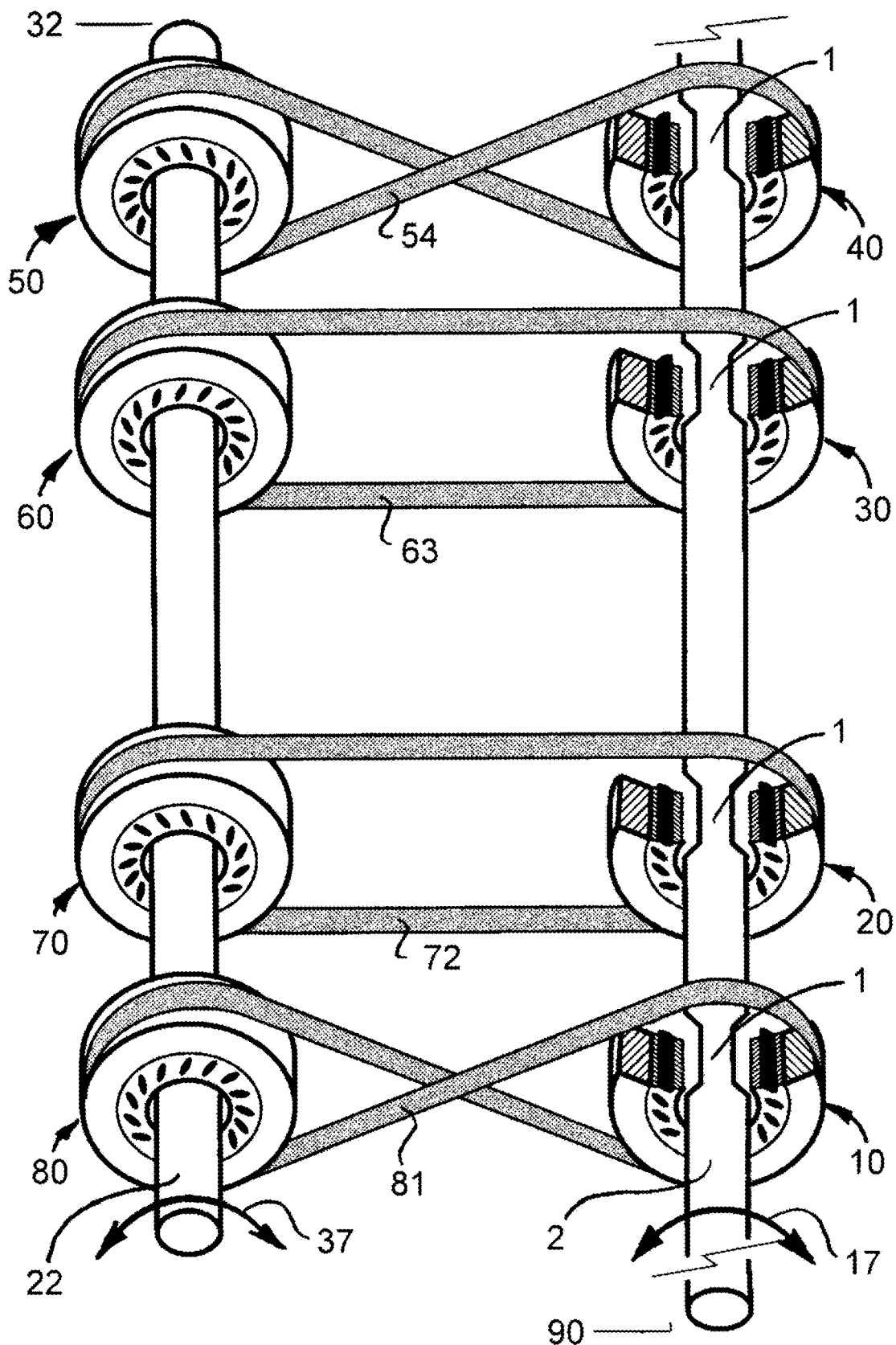

FIG. 15 depicts the transmission in neutral gear in the push-pull configuration/embodiment. Among other reasons, a neutral gear has utility so that the levers can be positioned out of the way for entry and exit from a wheelchair (transitions) and to allow a wheelchair or other conveyance to be pushed, pulled and turned unimpeded, from behind. In this configuration/embodiment, for neutral gear, the drive lever is moved to the center position. With the lever in this center position, because of the "rotating fulcrum" such as depicted in FIGS. 5, 6A,6B,6C, 6D, 6E, 6F, 7, 8A, 8B, 8C, and 9A, 9B, it moves the input shaft 2 to the middle position 90 as well. As can be seen in FIG. 15, the four "ground down" portions of the lever drive shaft/input shaft 1 each sit inside of the four one-way clutch bearings 10, 20, 30 and 40. Therefore, the input shaft 2 spins freely within each of these four one-way clutch bearings and therefore movement of the drive lever drive and resultant rotation of the input shaft 2 forward or backward, arrow 17, has no effect on any of the pulleys/sprockets and the lever attached to input shaft 2 can move freely forward or backward without any impediment.

Note that the output shaft 22 to the drive wheel will turn some of the one-way clutch bearings and their attached pulleys/sprockets and the belts/chains attached to them if the drive wheel is rotated forward or backward as, for instance when the wheelchair or other conveyance is being manipulated from behind such as being pushed, pulled or turned arrow 37. This will then rotate some of the one-way clutch bearings 10, 20, 30, and/or 40, depending on whether the drive wheel and therefore the output shaft 22 is rotating forward or backward. But each of these one-way clutch bearings have "ground down" portions of the input shaft 1 within them. Therefore, rotation of the drive wheel and output shaft 22 in either direction, forward or backward, has no effect on the input shaft 2 or the attached lever and therefore the input drive shaft 2 can move freely in either direction arrow 17 and also the attached lever can move freely forward or backward without any impediment.

Figure 16A:
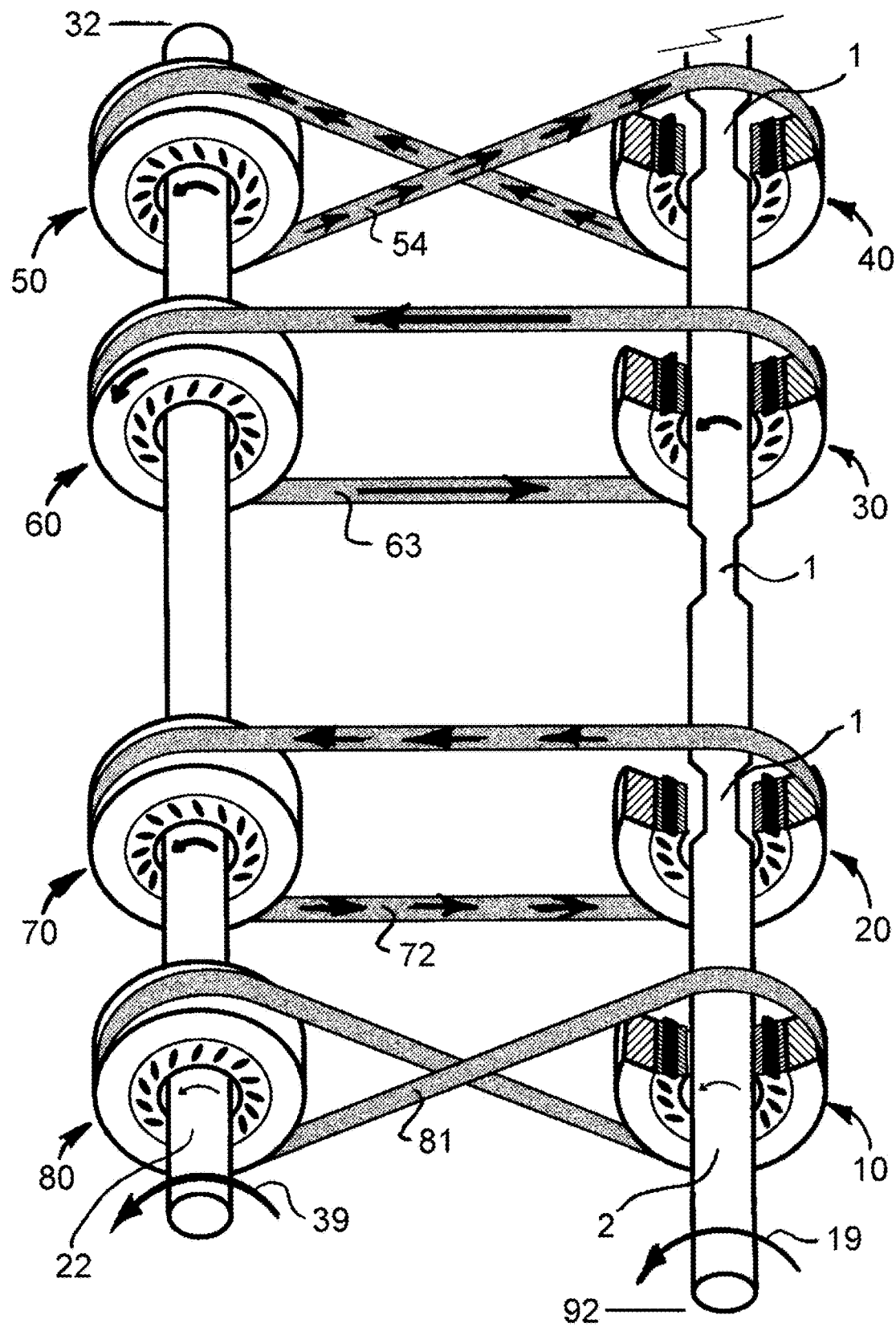

FIG. 16A depicts the transmission in reverse gear in the push-pull configuration/embodiment when the lever is pulled backward i.e. the rear lever stroke. The result is that the drive wheel turns backward i.e. moves in reverse. In the push-pull configuration/embodiment the drive wheel turns in the same direction no matter whether the lever is pushed forward or pulled backward. In other words, if the lever for a particular drive wheel is in forward gear the drive wheel moves forward whether the lever is pushed forward or pulled backward and, conversely, when in reverse gear, the drive wheel moves backwards whether the lever is pulled backwards or is pushed forward. In this configuration/embodiment, for reverse gear, the input drive shaft 2 is moved all the way in, position 92, i.e. the lever is moved outward, which, because of the "rotating fulcrum" such as depicted in FIGS. 5, 6A,6B,6C, 6D, 6E, 6F, 7, 8A, 8B, 8C, and 9A, 9B, pushes the shaft in. When the lever is moved backwards it rotates the input shaft 2 backwards. The input shaft 2 runs through one-way clutch bearing 10. In this configuration/embodiment the shaft 2 slips within one-way clutch bearing 10 and therefore does not rotate the pulley/sprocket attached to it. A "ground down" portion of the input shaft 1 runs through the one-way clutch bearing 20. Because it is "ground down" the shaft spins freely within one-way clutch bearing 20 and has no effect on it. The input shaft 2 is turning backwards along its entire length and runs through one-way clutch bearing 30. It is configured such that when the shaft 2 rotates backwards it drives the attached pulley/sprocket backwards with it. The belt/chain 72 attached to the pulley/sprocket moves with it and drives one-way clutch bearing 60 backwards. The one-way clutch bearing 60 is configured such that when it rotates backwards it drives the output shaft to the drive wheel 22 backwards with it. The output shaft 22 to the drive wheel rotates backwards driving the drive wheel backwards with it. The output shaft 22 is rotating backwards along its entire length so it also passes through one-way clutch bearing 70. This one-way clutch bearing 70 is configured such that when the output shaft 22 rotates backwards within one-way clutch bearing 70, it is rotated backwards as well. This moves the belt/chain 72 back with it. The movement of the belt/chain 72 drives one-way clutch bearing 20 backwards. However, because a "ground down" portion of the input shaft 1 is inside of one-way clutch bearing 20, the one-way clutch bearing spins freely and does not affect the input shaft 2. The output shaft 22 to the drive wheel which is turning backwards along its entire length, also runs through one-way clutch bearing 80. However, the configuration of one-way clutch bearing 80 is such that the output shaft to the drive wheel 22 slips/turns freely within it and therefore does not rotate the pulley/sprocket attached to it.

Figure 16B:
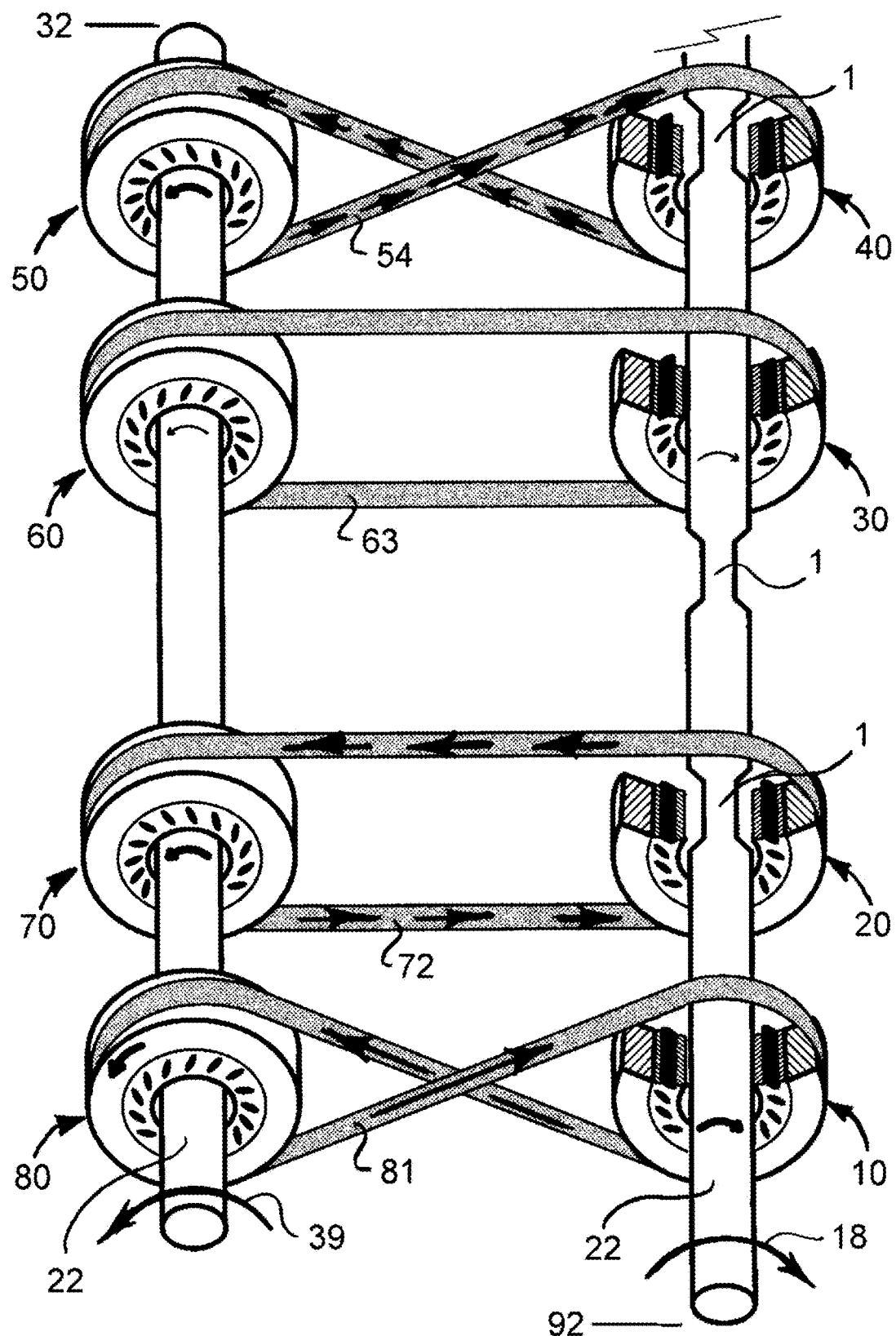

FIG. 16B depicts the transmission in reverse gear in the push-pull configuration/embodiment when the lever is pushed forward i.e. a forward stroke. The result is that the drive wheel turns backward i.e. moves in reverse. In the push-pull configuration the drive wheel turns in the same direction no matter whether the lever is pushed forward or pulled backward. In other words, if the lever for a particular drive wheel is in forward gear the drive wheel moves forward whether the lever is pushed forward or pulled backward and, conversely, when in reverse gear, the drive wheel moves backwards whether the lever is pulled backwards or pushed forward.

In this configuration/embodiment, for reverse gear, the input shaft 2 is moved all the way in, i.e. the lever is moved outward, which, because of the "rotating fulcrum" such as depicted in FIGS. 5, 6A,6B,6C, 6D, 6E, 6F, 7, 8A, 8B, 8C, and 9A, 9B, pushes the shaft in. When the lever is pushed forward the input shaft 2 rotates forward. The shaft 2 runs through one-way clutch bearing 10. One-way clutch bearing 10 is configured such that when the drive shaft 2 rotates forward within it, one-way clutch bearing 10 rotates forward with the shaft which rotates the attached pulley forward as well. Because the belt/chain 81 is configured in a FIG. 8, rather than driving the rear pulley/sprocket and attached one-way clutch bearing 80 forward, it drives one-way clutch bearing 80 in reverse/backwards.

The configuration of the one-way clutch bearing 80 is such that when it is rotated backwards it drives the output shaft to the drive wheel backwards with it. The one-way clutch bearing 80 drives the output shaft to the drive wheel 22 backwards with it and therefore drives the drive wheel backwards/in reverse. The output shaft to the drive wheel 22 is turning backwards along its entire length and it also runs through one-way clutch bearing 70. The configuration of one-way clutch bearing 70 is such that the output shaft to the drive wheel 22 drives one-way clutch bearing 70 backwards, and along with it the attached pulley/sprocket. The backwards rotation of the pulley/sprocket which is attached to one-way clutch bearing 70, moves the belt/chain 72 with it and rotates the one-way clutch bearing 20 backwards as well.

However, because one-way clutch bearing 20 has within it a "ground down" portion of the input shaft 1, the one-way clutch bearing 20 spins freely on the shaft and does not affect its rotation. The output shaft to the drive wheel 22, which is turning backwards along its entire length, also runs through the one-way clutch bearing 60. However, this one-way clutch bearing 60 is configured such that the output shaft to the drive wheel 22 freely slips/spins within it and therefore one-way clutch bearing 60 is not rotated. The output shaft to the drive wheel 22, which is rotating backward along its entire length, also runs through one-way clutch bearing 50. This one-way clutch bearing is configured such that when the output shaft to the drive wheel 22 rotates backwards within one-way clutch bearing 50, it drives the attached pulley/sprocket backwards with it moving the belt/chain 54 with it as well. The movement of the belt/chain 54 rotates one-way clutch bearing 40 forward due to the belt/chain FIG. 8 configuration. However, within the one-way clutch bearing 40 is a "ground down" portion of the lever driveshaft/input shaft 1 and therefore the one-way clutch bearing 40 spins freely on the shaft and does not affect its movement. The input shaft 2 is being rotated forward along its entire length and it passes through one-way clutch bearing 30. However, the configuration of one-way clutch bearing 30 is such that the input shaft merely slips/spins freely within one-way clutch bearing 30 and therefore does not rotate the one-way clutch bearing 30 or the pulley/sprocket attached to it.

Figure 17:
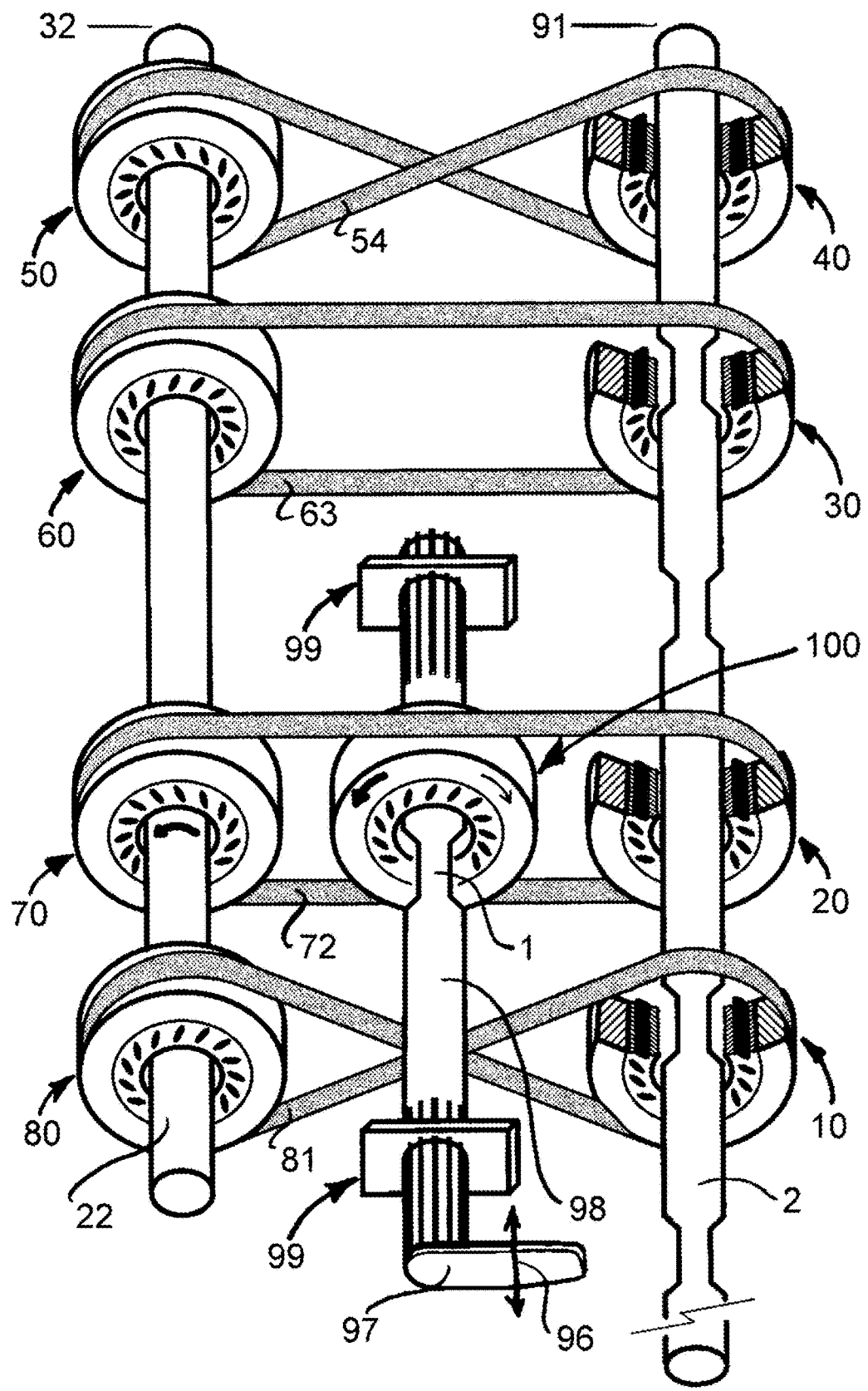
FIG. 17 depicts an embodiment of a "No-Back" within a transmission, which is used to prevent the conveyance from rolling backward.

Referring to FIG. 17, a "No-Back" mode is used with certain types of rotating devices to assure that the device rotates only in the direction desired and is not forced by external forces to rotate in an undesired direction. In the context of a conveyance including a "Dedicated Lever Drive Wheelchair" the "No-Back" would be used primarily when the conveyance user is going up a grade and the user does not want the conveyance to roll backwards, including between lever strokes. There is utility in being able to be able to turn the "No-Back" off/disengage it, so that it does not interfere with other operations of the conveyance such as when it is being pushed from the rear.

In FIG. 17 the configuration of the one-way clutch bearings numbers 10, 20, 30, 40, 50, 60, 70 and 80 are identical to those in the previous FIGS. 13-16 which depict a push-pull configuration of the Transmission. FIG. 17 is an exemplar embodiment to demonstrate the "No-Back". It has been arbitrarily drawn with the input shaft position for forward motion of the wheelchair, position 91. The "No-Back can be used in many embodiments of a conveyance drive train and/or transmission. One embodiment of the "No-Back" device consists of items 97, 98, 99, and 100 and a shaft with a "ground down" portion 1 which can slide in and out of a one-way clutch bearing by means of, for instance, a device such as a handle 97 but it cannot rotate due to the constraints such as 99. This inability to rotate is accomplished by means of a mechanical device such as splines on one or both ends of the shaft 99 or rectangular tabs in a rectangular slot at the end of the shaft etc. So, although the "No-Back" shaft 98 cannot rotate, the shaft can be positioned with the "ground down" portion of the shaft 1 within the one-way clutch bearing, in which case it has no effect on the one-way clutch bearing.

Alternatively, the shaft can be slid to a position with the shaft with its full diameter inside the one-way clutch bearing, as depicted in the configuration in FIG. 17, in which case it "locks" the one-way clutch bearing 100 from moving backwards. FIG. 17 shows the shaft, with its full diameter, inside of the one-way clutch bearing. In this position the one-way clutch bearing is engaged, it cannot turn backward and thus the "No-Back" is engaged. To disengage the "No-Back", the shaft would be pushed in as depicted by the arrows 96 on the drawing, by a force applied, for instance via handle 97 or other mechanical means. To reengage the "No-Back" a force would be applied to move the full diameter of the shaft back inside the one-way clutch bearing. The "No-Back" consists not only of the sliding shaft 98 and one-way clutch bearing 100, but also the pulley/sprocket attached to the one-way clutch bearing.

The "No-Back" which consists of the one-way clutch bearing 100 and the pulley/sprocket (or possibly a gear) which is situated between one-way clutch bearing 20 and one-way clutch bearing 70. The output shaft to the drive wheel 22 runs through one-way clutch bearing 70. This shaft 22 spins freely within the one-way clutch bearing when it is rotating forward but drives the one-way clutch bearing 70 and its attached pulley/sprocket backwards if the output shaft 22 attempts to turns backwards, as in a situation where the conveyance is attempting to roll backwards. This attempted movement backwards of the pulley/sprocket attached to one-way clutch bearing 70 pulls the belt/chain 72 backwards with it. However, this same belt/chain also engages with the pulley/sprocket attached to one-way clutch bearing 100. As already described, this one-way clutch bearing 100 cannot turn backward when the "No-Back" is engaged. Therefore, the output shaft to the drive wheel is restricted from turning backwards. The effect is that when the "No-Back" is engaged, the associated conveyance drive wheel cannot roll backwards or be moved backwards.

Figure 18:
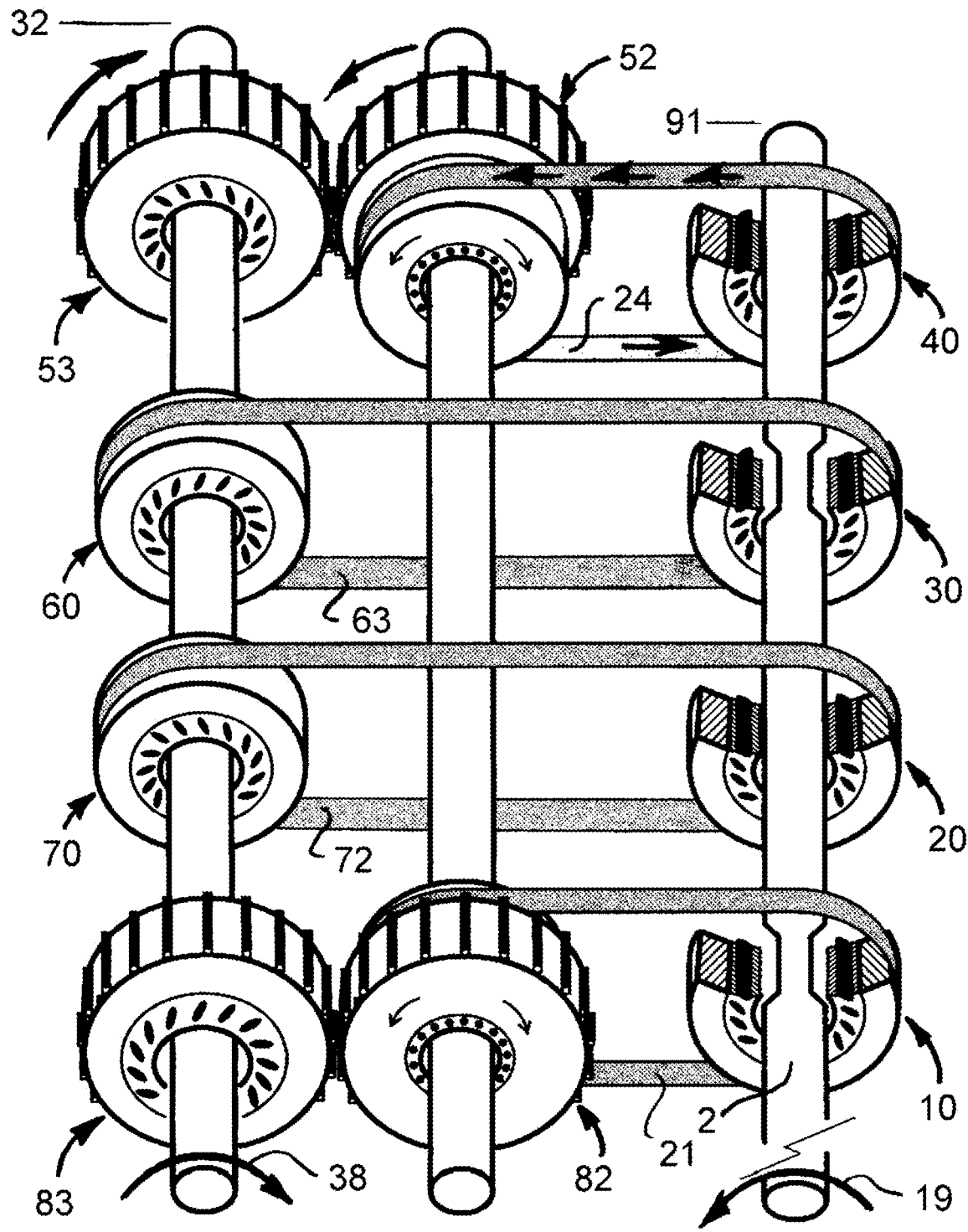
FIG. 18 depicts the "transmission gear logic" of one transmission embodiment for a "push-pull" type transmission in Forward Gear with a reverse lever stroke, but which still propels the conveyance forward.

Various embodiments of a transmission and "Transmission Logic" can be effectuated by using different combinations of pulleys and/or sprockets and/or gears. FIG. 18 is one such embodiment. It demonstrates how a pairing of gears can be utilized for the push-pull configuration rather than use a FIG. 8 configuration of the belt or chain as depicted in FIGS. 13-17.

For this FIG. 18 configuration, the input shaft 2 has been positioned for forward gear position 91 but is demonstrating a rearward movement of the drive lever (pull) arrow 19, with the desired movement of the output shaft to the drive wheel being a forward rotation arrow 38 (i.e. the Transmission is in a "push-pull" mode). In other words the lever is being moved/pulled backwards, but the drive wheel is moving forward. For simplification, only the active drive path will be described. The input, which is the rearward movement of the lever input shaft, arrow 19 rotates that shaft backwards. It drives one-way clutch bearing 40 and its attached pulley/sprocket backwards. The engaged belt/chain 24 then rotates a conventional bearing (i.e. not a one-way clutch bearing)/pulley/sprocket assembly and attached gear 52 backwards as well. This bearing/pulley/sprocket assembly also has attached to it a gear 52 engages another gear 53 which has inside it the one-way clutch bearing.

Although the bearing/pulley/sprocket and attached gear assembly 52 rotates backward the mating gear attached to the one-way clutch bearing 53 rotates forward. The effect is that the one-way clutch bearing inside the gear rotates forward and drives the output shaft to the drive wheel 22 forward along with it. And thus, the drive wheel rotates forward. This embodiment of "transmission logic" works effectively the same as in FIG. 14B. Although the "No-Back" is not depicted on FIG. 18, a "No-Back" could be inserted in a Transmission utilizing these types of components i.e. whether they are pulleys, sprockets or gears and associated devices.

Figure 19A:
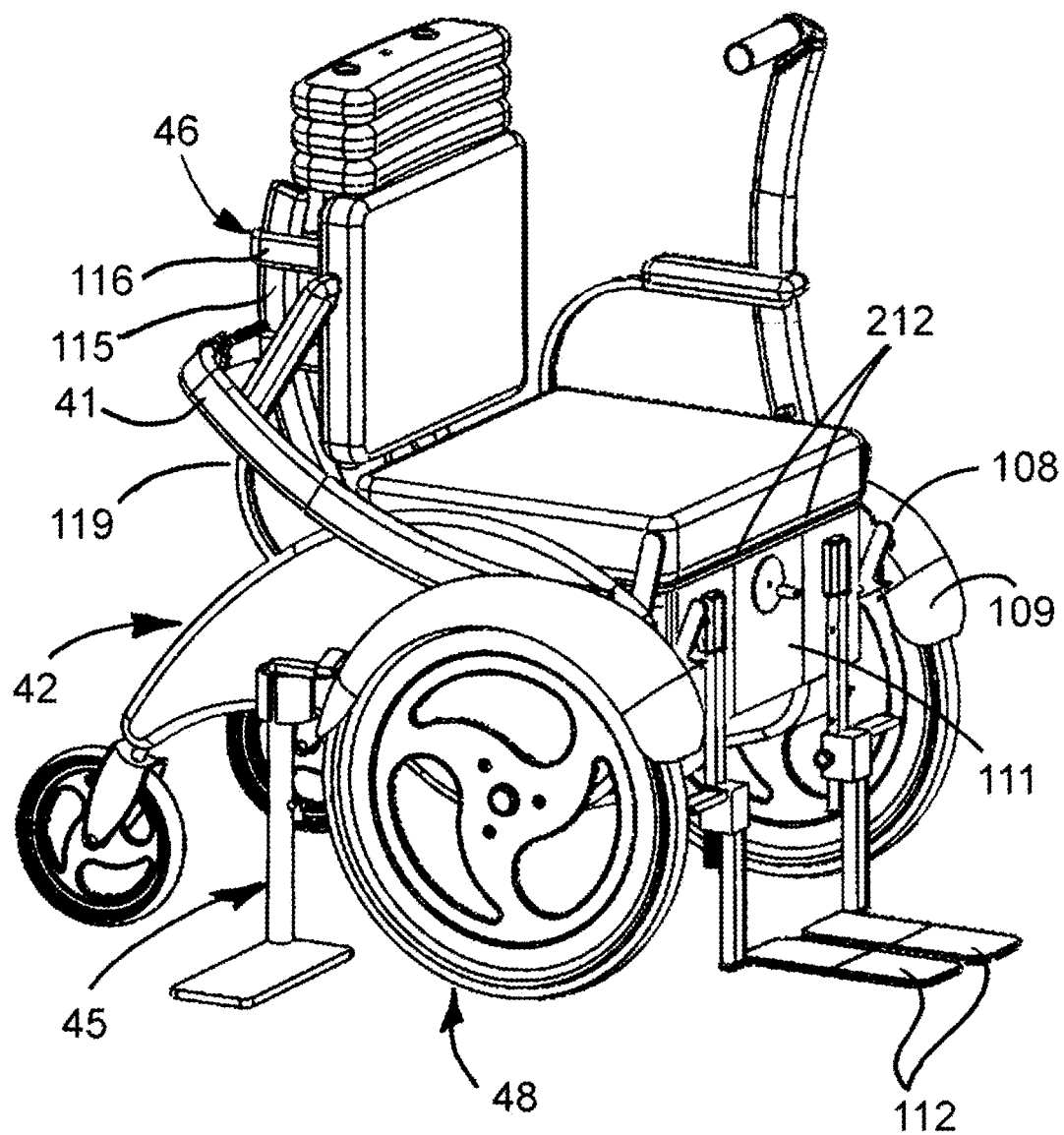
FIG. 19A illustrates a perspective view of the wheelchair depicted in FIG. 1, in an "entry and exit mode" which provides few impediments/interference with entry or exit of a person on to, or out of, the seat.

FIG. 19A depicts one configuration that the wheelchair can be placed in to facilitate entry to, and exit from, the wheelchair (transitioning). This "Dedicated Lever Drive Wheelchair" utilizes wheels 48 which are small enough in diameter so that they do not extend above the level of the seat. This means that the wheel does not obstruct the user when transitioning on or off the wheelchair. The wheelchair is shown with an 18 inch drive wheel but smaller drive wheels can also be used. If desired larger wheels can also be used. The fender 109 is attached to the frame 42 and protects the user from debris on the tires of the wheel and from material thrown off the wheel when moving, such as water or mud. The lever 41 can be rotated aft so that it does not obstruct transitioning on or off the wheelchair.

A further option is to release the lever from the rotating pivot/fulcrum so that the lever can be swung out and moved back even further (Ref FIGS. 5-9B). Optional arm rests 119 can tilt back allowing the user further ability to transition on and off the conveyance without obstruction. This "Dedicated Lever Drive Wheelchair" design provides additional assistance to the user in transitioning, particularly transitioning onto the wheelchair in that a lever 41 on the opposite side of the wheelchair is robust enough and can be positioned so that it can be grabbed to help pull oneself onto the wheelchair or help push oneself off.

Figure 19C:
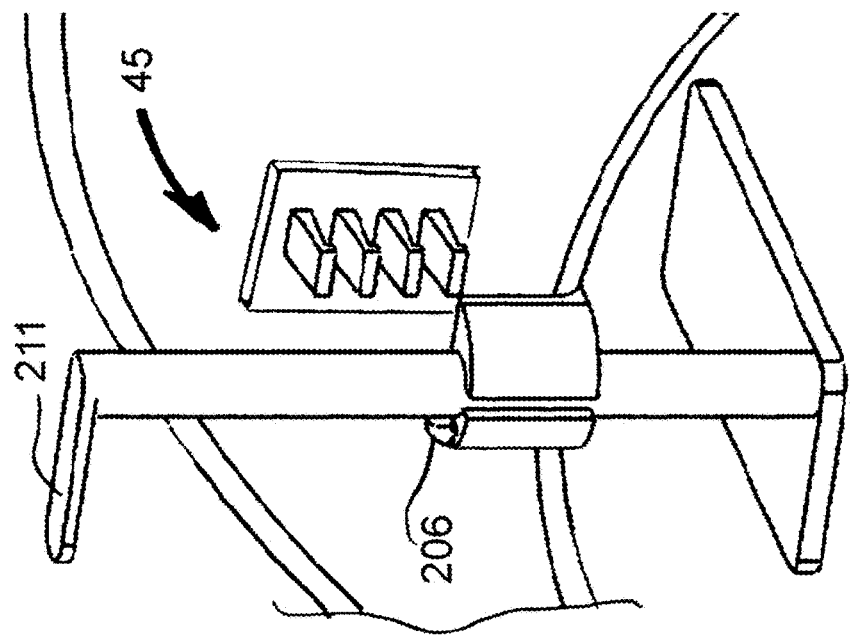
FIGS. 19B and 19C illustrate perspective views of an embodiment of a raisable "foot" which can be used to help steady the conveyance.
Figure 19B:
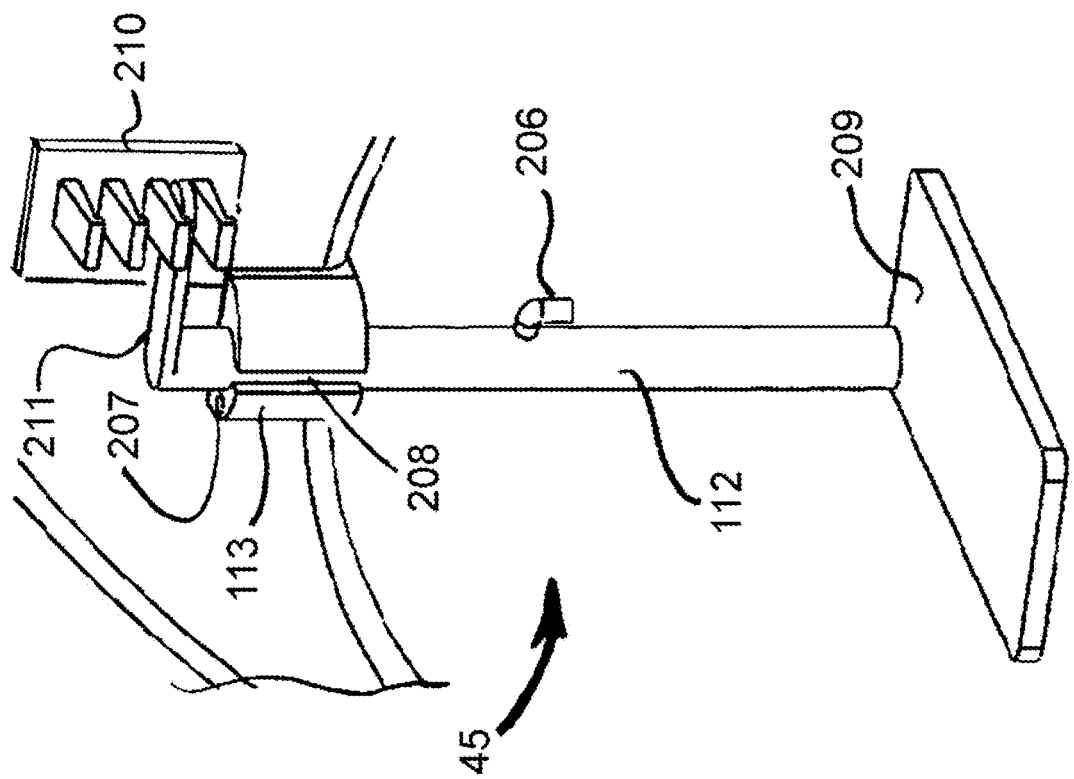

Additionally, the wheelchair frame can be equipped with a "support foot" 45, FIGS. 19A and 19B, to help steady the wheelchair for transitions on and off it, as shown in FIGS. 19A, and 19B and is similar to that shown in FIGS. 21A-21D, which is depicted in that case as being attached to the inside portion of the Transmission. When the wheelchair is to be moving, the support foot is retracted/raised and is oriented along the underside of the wheelchair frame FIGS. 1A, 1B and 19C. To deploy the "support foot", for this embodiment, the handle 211 is lifted slightly to release the support hook 206 from the stowage hole 207. The handle is then rotated outward 90 degrees and the support hook is slid down through the slot 208 and the support foot 209 is lowered to the desired position. The handle 211 is then rotated forward and locked under the latch mechanism 210. This type of support foot can be used for both the "conventional" wheel placement where the drive wheels are in the back as well as for "chariot" style configuration where the drive wheels are in the front (Ref FIGS. 3A and 3B). The effective seating space forward and back can be adjusted, including for a growing child or for use with different persons. This is accomplished by adjusting the seat back forward and aft using the seat back adapters 116. These seat back adapters 116 are attached to the "canes" 115 of the seat back mechanism 46. The seat back mechanism 46 can also be adapted to recline using various embodiments of mechanisms.

The width of the seat of embodiment of the conveyance, including as a wheelchair, can be altered without the user being required to acquire a new one. One might consider the basic design of this "Dedicated Lever Drive Wheelchair", excluding the seat back, as being comprised of a left and right side each containing the lever, transmission, drive wheels and caster wheels. Each side is then held in the form a rigid rectangle, though it is able to be folded. Depending on the folding method, an embodiment may be some sort of "seat bottom plate" or "plates" (FIG. 20, 214) which can either cover the front and back and side to side of the entire frame or merely a rigid device of some sort which sits down between the four sides of the wheelchair's frame 42 and secures it as a rigid rectangle.

Another embodiment is to have horizontal linkages in the front and back of the wheelchair which may be used alone to hold the wheelchair frame 42 in a rigid rectangular position or may be used in conjunction with a seat bottom plate or frame as well or other embodiments can be used to hold the folding frame 42 in a rigid rectangle. With respect to the above Ref FIGS. 20A, 20B and 20C and FIGS. 22A-22E. All of the above embodiments allow the width of the wheelchair to be changed without the user having to purchase/acquire an entirely new wheelchair as described below. In the case of folding method embodiment depicted in FIGS. 20A-20C, and FIGS. 22A-22E, the width of the wheelchair frame 42 can be changed by swapping out the hinged panel of the frame 111 which sit in both the front and rear of the wheelchair and are hinged with vertical hinges 212, with a different width of panel, and then either replacing or adjusting the seat bottom plate 214 or other embodiment such as a hollow frame which maintains the wheelchair frame 42 in a rigid rectangular condition. For the folding method embodiment depicted in FIGS. 21A-21D the width of the wheelchair can be changed by swapping out the front and rear linkage mechanisms 215 for linkages with a different width and, depending on the specific embodiment, by swapping out or adjusting the seat bottom plate and/or the frame which also might be used to help maintain the wheelchair in a rigid rectangular condition.

Figure 20A:
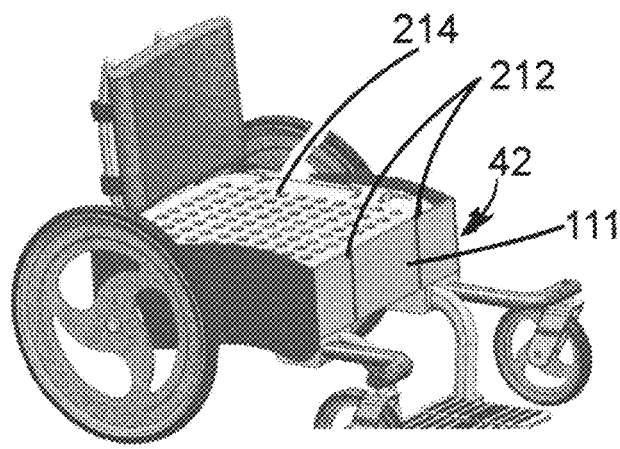
FIGS. 20A, 20B and 20C depict an embodiment of the folding mechanism and folding sequence of the seat frame, where one side of the frame is moved laterally back of the other side causing the width to be diminished.
Figure 20B:
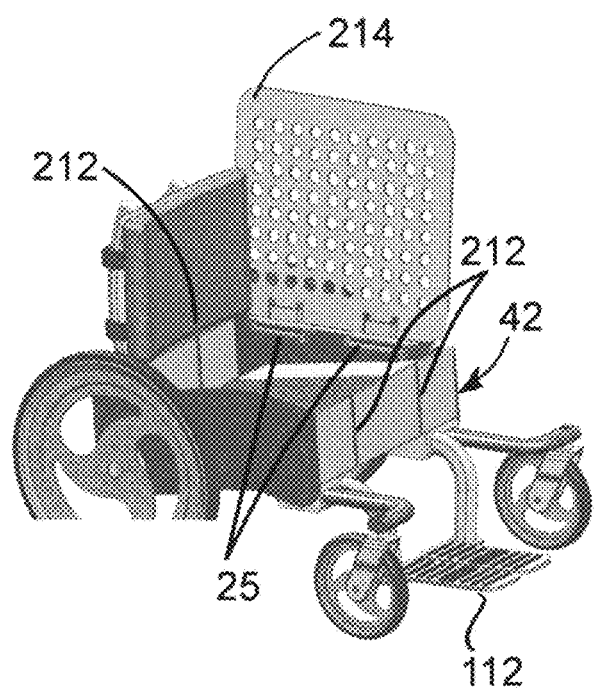
Figure 20C:
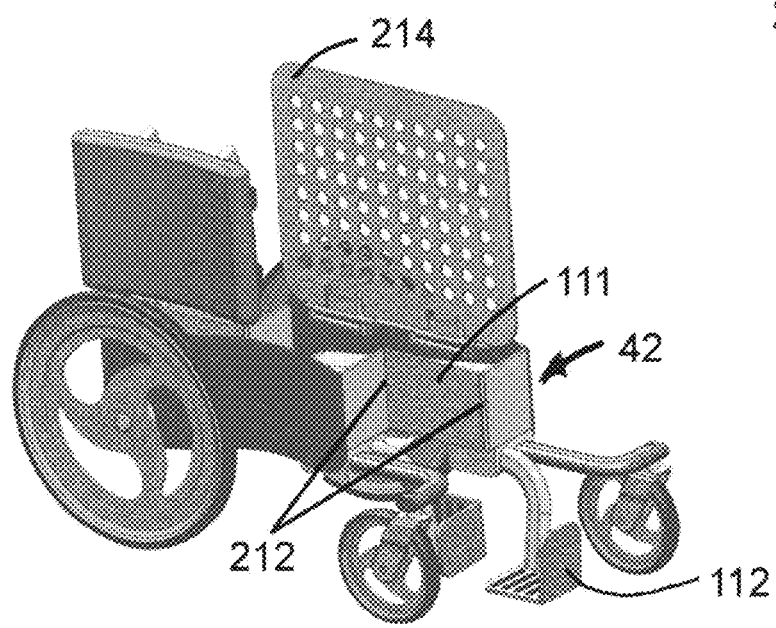

With reference to FIG. 20A-20C, embodiments of the conveyances described herein include that of a wheelchair. FIGS. 20-20C depict an embodiment of a wheelchair where the frame 42 consists of two "U shaped" side portions which are separated in the front and in the back by a middle panels 111 which have the same width. These front and back portions are attached to the two "U shaped" portions of the frame 111 by four vertical hinges 212. That is two hinges in the front and two hinges in the rear. Not shown in FIGS. 20A-20C is that the Transmission itself may be configured as part of, or all of the frame replacing the "U shaped" frame in a manner similar to the embodiment of the frame of the conveyance depicted in FIGS. 21A-21E. The frame is held rigidly as a rectangle by a rigid seat bottom plate 214 which sits down inside the four portions of the frame.

Although the bottom plate 214 could be a separate item and not attached to the frame, as a practical matter the seat bottom plate can be attached to one side of the frame and rotated up and down. That is when it is in the down position it locks the frame and when the seat bottom plate is rotated up the frame becomes unlocked and unable to fold. This is one embodiment to maintain the frame 42 rigid. There are many others. The seat bottom plate 214 is attached to its hinge which allows it to tip up and a linkage 25, FIG. 20B which allows it to swing forward by way of tabs which slide into a receiver. It can easily be removed for transport with the folded frame.

Another embodiment, not shown in any of the figures, is to have the seat bottom plate made in two or more sections where each section could be affixed to the wheelchair frame. When each of the sections is lowered to where they would all meet in a horizontal position and forced up against each other, this would have the effect of making the wheelchair frame held in a rigid rectangular position. In this embodiment of folding of a conveyance, the wheelchair is folded by releasing the frame 42 by raising the seat bottom plate 214 which allows one side of the frame to swing forward of the other FIG. 20C. In essence, the smallest that the wheelchair frame can be folded to would be approximately the width of the two transmissions plus the drive wheels if the drive wheels remain attached. The bottom portion of the footrests 112 (Ref FIG. 1B) in this embodiment, can be folded. To unfold the wheelchair this folding sequence is reversed. This folding methodology is essentially the same whether the "Dedicated Lever Drive Wheelchair" has a conventional drive wheel configuration FIG. 3A or a "chariot" drive wheel Configuration FIG. 3B.

Figure 21C:
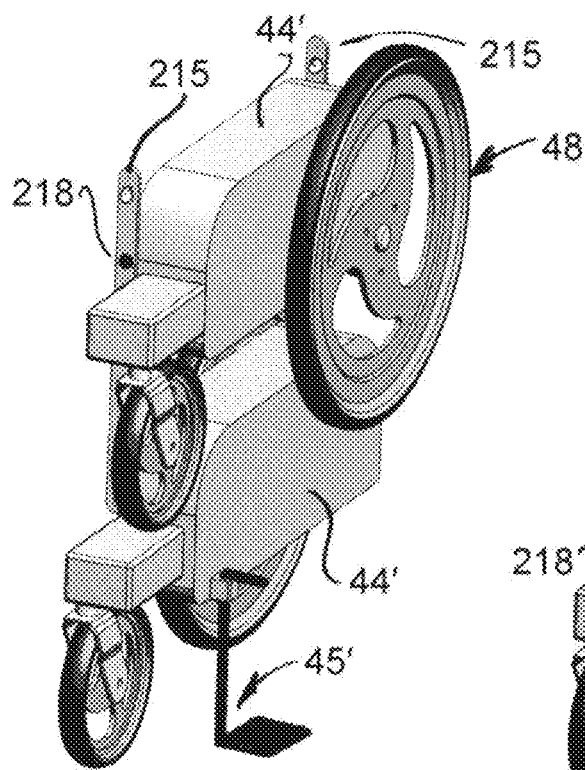
FIGS. 21A, 21B, 21C, 21D depict an embodiment of a wheelchair showing a folding sequence of the seat frame, where one side of the frame is moved up and over the other side causing the width to be diminished.
Figure 21B:
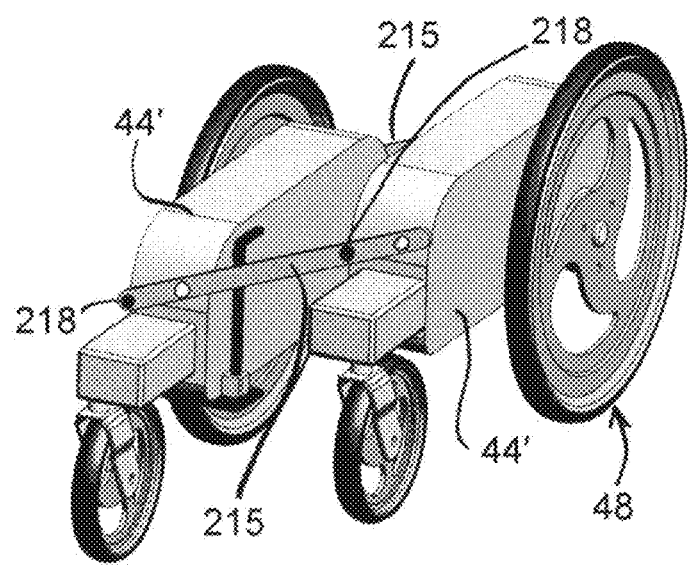
Figure 21D:
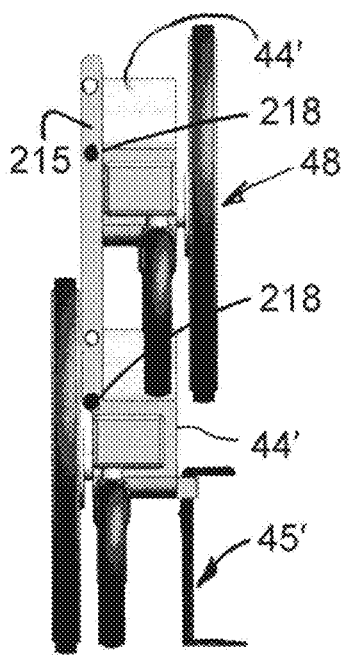
Figure 21A:
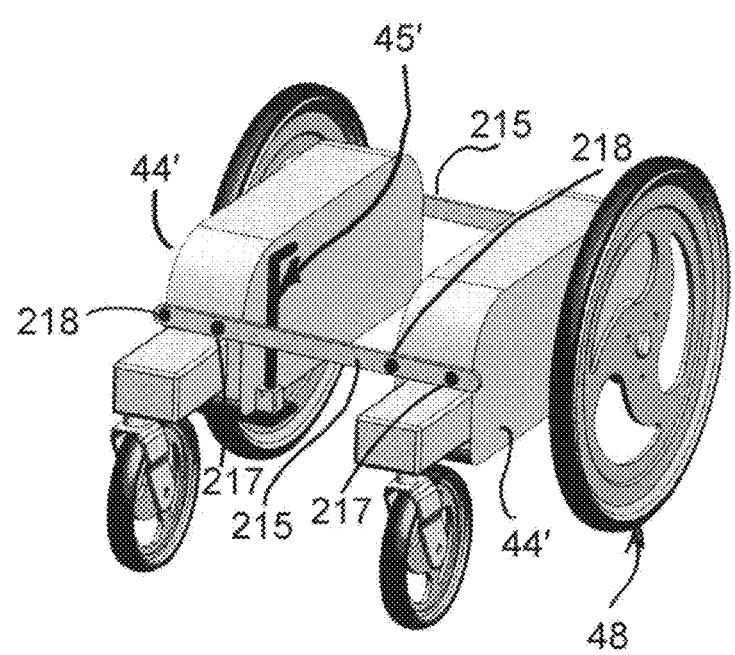
Figure 22C:
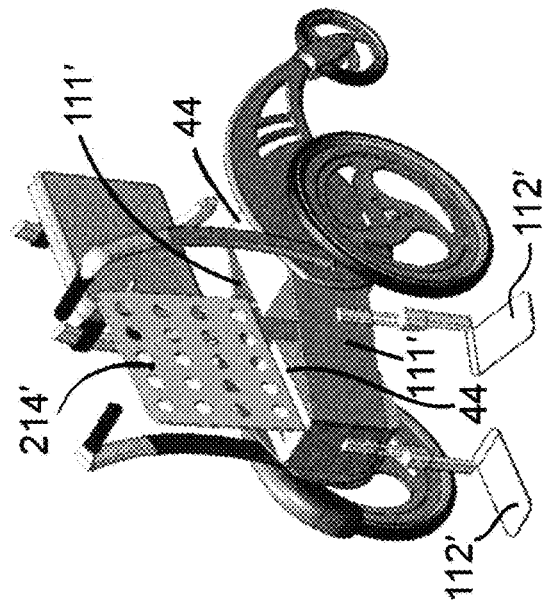
FIGS. 22A, 22B, 22C, 22D, and 22E depict a folding sequence of the seat frame of one embodiment of a wheelchair, where one side of the frame is moved laterally back of the other side and one transmission is stowed behind the other, causing the width to be diminished.
Figure 22B:
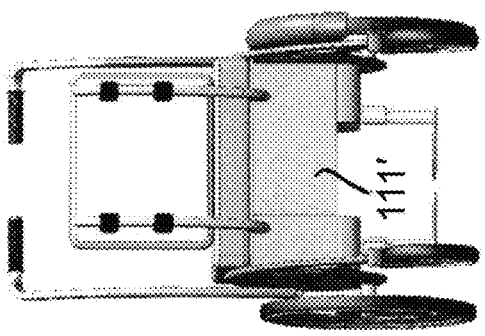
Figure 22A:
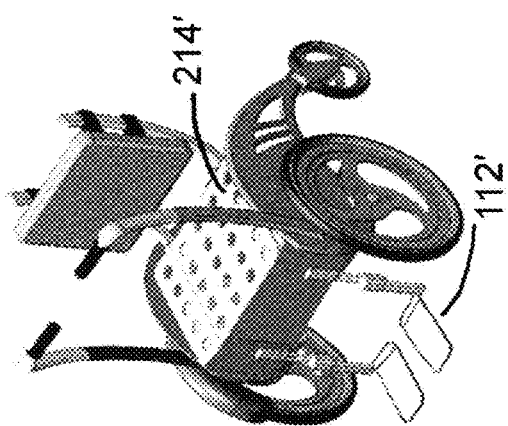
Figure 22E:
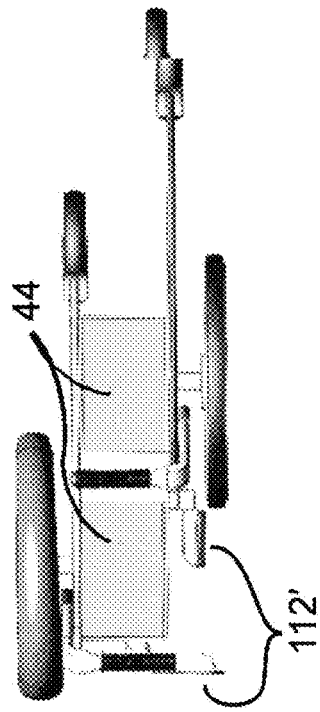
Figure 22D:
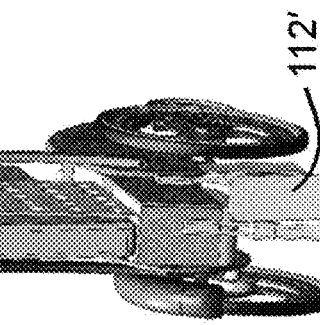
Figure 25A:
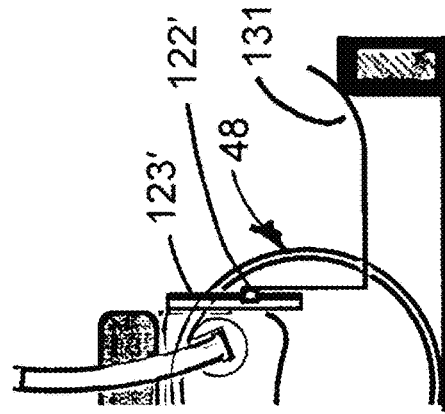
FIGS. 25A, 25B, 25C, 25D and 25E depict an embodiment of a raisable footrest with the end formed in a turned up "skid" design which allows the footrest to ride up and over various obstacles
Figure 25B:
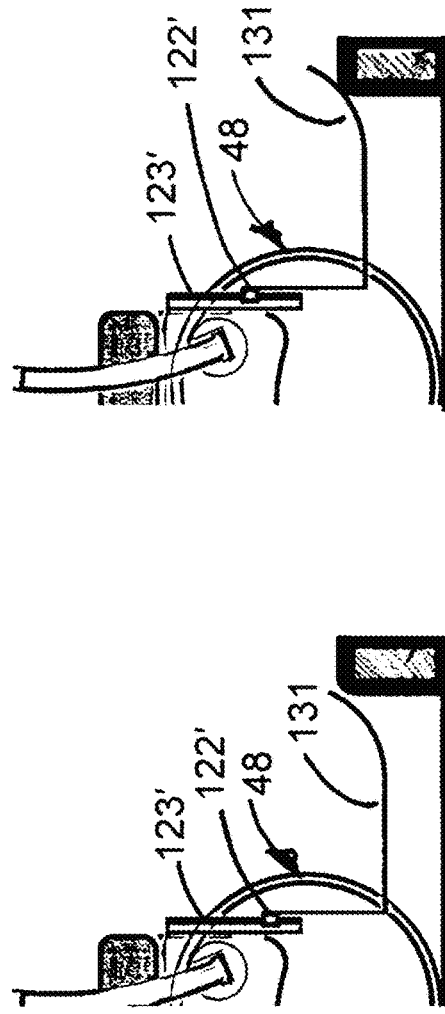
Figure 25C:
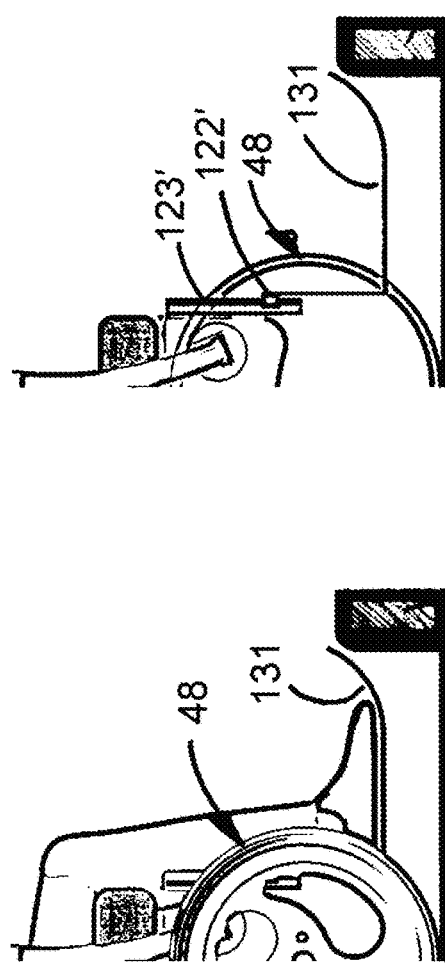
Figure 25E:
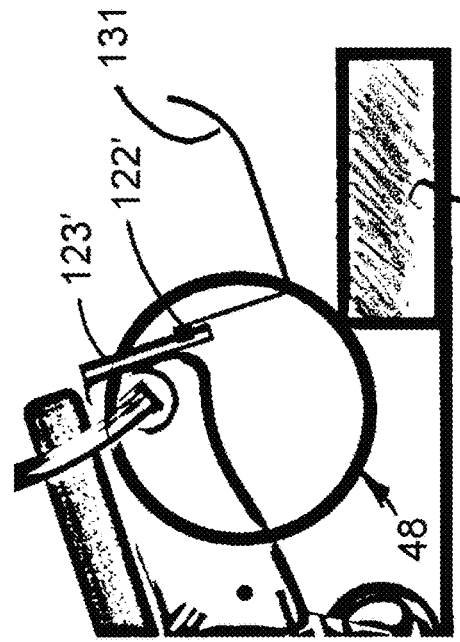
Figure 25D:
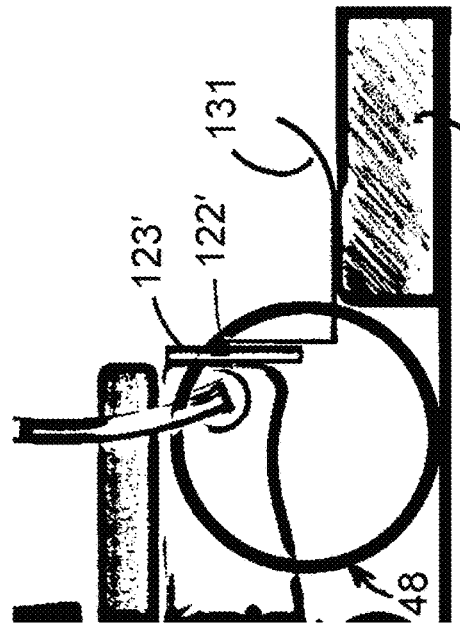
Figure 26C:
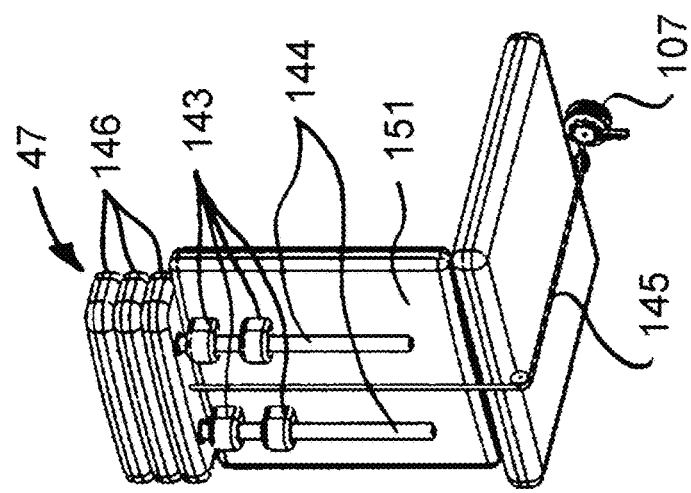
FIGS. 26A, 26B and 26C depict one embodiment of a collapsible backrest and headrest in the full up and full down positions showing the springs, support mechanism and reel mechanism which pulls down the collapsible components.
Figure 26B:
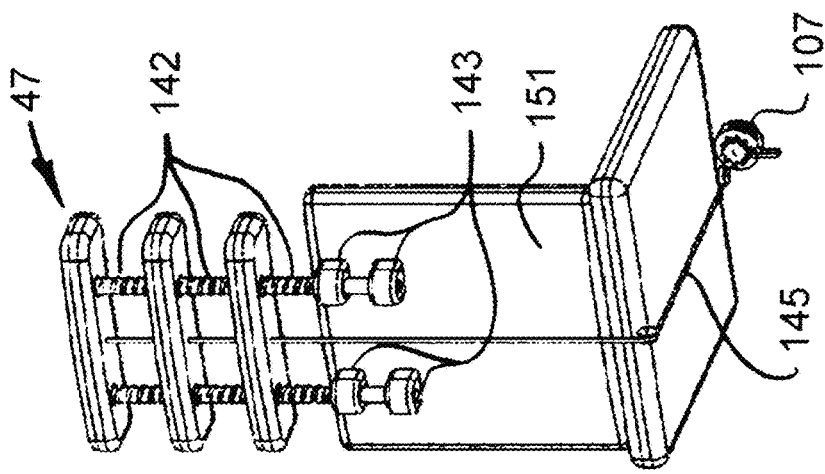
Figure 26A:
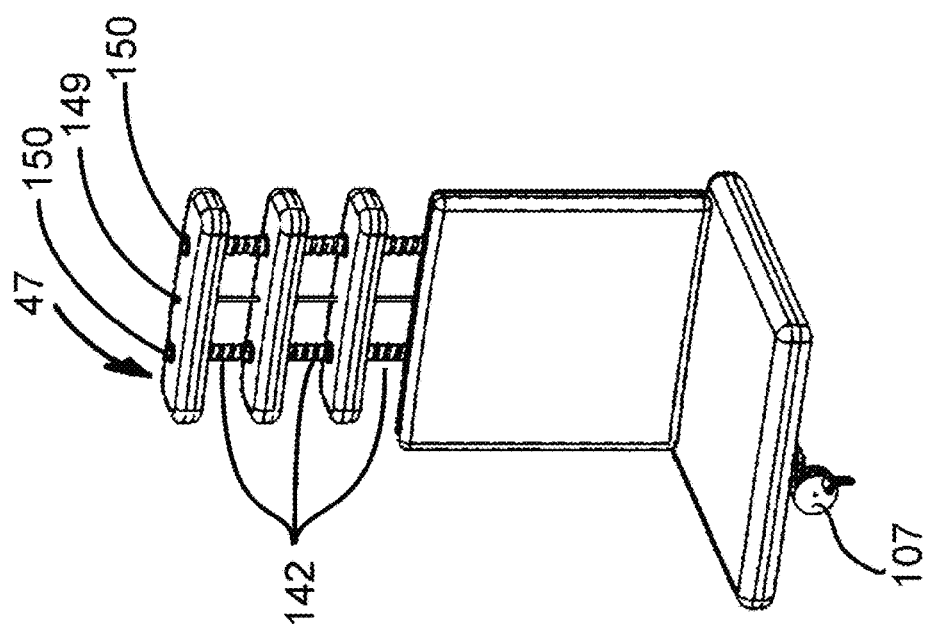

Referring to FIGS. 21A-21C which depicts on embodiment of a folding method for a conveyance such as a wheelchair. FIG. 21A depicts the wheelchair in the open/down and locked position. Note that there is a transmission with wheels on each side separated by a linkage bar. Although for clarity one rather thin bar is shown, a finished design would likely use a larger linkage bar, perhaps with a different cross-sectional geometry and/or use a wider bar and/or multiple linkage bars. The linkage bars have locking pins 217, FIG. 21A front and back, or hardware which serves the same purpose, to lock the linkage bars firmly in place when the wheelchair is in the open position. The linkage pivots on other pins/hinges 218. Further, depending on the degree of stability desired, not shown, are for instance cross braces which are cross between the two transmissions and/or the wheelchair frame which is not shown in the drawings. Note that the support foot 45' is in the up position and stowed.

One embodiment of this support foot is as in FIGS. 19A-19C. FIG. 21B depicts a condition where the locking pins or other locking mechanism have been removed/released and one side of the wheelchair has begun to be raised. FIGS. 21C and 21D depict the wheelchair in the fully folded up position with the support foot (or other type support perhaps a "kickstand" type device) deployed, (Ref. FIGS. 19A-19C) and moved down to the ground to support this stacked configuration so that does not fall over. Further, depending on the degree of stability desired, not shown, are for instance cross braces which are cross between the two transmissions and/or the wheelchair frame which is not shown in the drawings. Note that in this configuration the wheelchair can be folded to just somewhat larger than the width of the Transmission plus drive wheels. For stowage and/or transport the drive wheels can be removed with a quick release making the overall width even smaller.

This folding methodology is essentially the same whether the "Dedicated Lever Drive Wheelchair" has a conventional drive wheel configuration FIG. 3A or a "chariot" drive wheel Configuration FIG. 3B.

FIGS. 22A-22E depict one embodiment of a folding method for a conveyance, in this case a wheelchair. The folding method shown depicts a "chariot" type wheelchair with the drive wheel in front (Ref FIG. 3B). However, this same embodiment of a folding method can be used for a "conventional" type wheelchair (Ref FIG. 3A). This folding method is similar to that as depicted in FIGS. 20A-20C as described above including that the seat bottom plate or other device can be used to secure the frame in a ridged rectangle. For added compactness the bottom of the footrests 112' can be folded up. Further the descriptions of how the effective front to back bottom seat dimension can be changed apply to this embodiment of design as referenced with respect to FIGS. 19A, 20A-20C and 21A-21C as discussed above. Also, the method of changing the width of the conveyance also discussed with respect to FIGS. 19A and 20A-20C are similar to that described in FIGS. 22A-22E. The major difference is that to allow the transmissions 44, FIG. 1A, FIG. 4A, FIG. 4B, FIG. 6F, FIG. 9A to be stowed one behind the other, requires the each side of the frame to be a rigid "L" shape and the front and rear vertically hinged panels 111' to be offset as shown in FIGS. 22A-22E. This embodiment also provides for changing the width of the conveyance by changing the width of the front and rear panels 111' as well as for adjusting the front to back effective size of the seat through use of the sear back adapters 116, FIG. 1B.

With reference to FIGS. 23A-23C, FIG. 24A-24C and FIGS. 25A-25E, there is utility in having footrests on a conveyance such as a wheelchair which do not snag on the ground and can be raised to go over obstacles. FIGS. 23A-23C, 24A-24C as well as FIGS. 1A, 2A, and 19A depict an embodiment of a footrest which accomplishes this. Note that although this raisable type footrest in FIGS. 1A, 2A and 19A is shown with a "chariot" type configuration of "Dedicated Lever Drive Wheelchair" FIG. 3B, it can also be used on a configuration of a conventional type wheelchair FIG. 3A where the caster wheels are in the front and the larger drive wheels are in the back.

The described raisable footrest can be either a flat footplate or a footplate similar to that used with a "skid" type footrest as depicted in FIGS. 25A-25E where the front end of the footrest is curved up and can be have a foldable bottom or a rigid bottom. The footrest on a wheelchair is often very close to the ground. This poses problems when the user attempts to climb over a curb or over an obstacle. The embodiment of a raisable footrest in FIGS. 23A-C and FIGS. 24A-24C allows the user to manually lift his/her legs and have the spring-loaded footrest move with them and lock in place. This then allows either the front drive wheels on a "chariot" type "Dedicated Lever Drive Wheelchair" or the front caster wheels, for a conventional arrangement of wheels, to contact the curb or obstacle without the user's footrest and feet getting in the way.

Note that the embodiment of the spring 120, 120' and 120", which raises the footrest can either be a conventional coil spring as shown or a gas spring. The force of the spring is enough to follow the person's legs as they are manually raised but not such a large force that the person cannot get their legs back down either to the bottom position as in FIG. 23A and FIG. 24A or a "midway" position FIG. 23B and FIG. 24B. There are various types of embodiments of latching mechanisms which can be used to lock and unlock the footrest in/from its top position. Shown in FIGS. 23A-23C and 24A-2C is the use of a tab 121 on the linear bearing 122 which locks under a latch 108 to lock the footrest in the upper position as the user manually lifts his/her legs. When clear of the obstacle the user releases the latch and the weight of his/her legs pushes the footrest back to the riding position of FIG. 23B and FIG. 24B where there are various embodiments of a latch to hold the footrest in place, in this case via a pin with a knob on it 126, FIGS. 24A-24C. Also note that the spring must have a spring rate low enough that the weight of the users feet and legs are enough to allow gravity to push the footrest back down, although, the user may be able to use some arm force as well to push his/her legs back down.

There can be many positions to lock the footrest at. As shown here the bottom position FIGS. 23A and 24A and other low down positions, can be used for entry and exit of the conveyance, here a wheelchair so that said entry and exit are unobstructed by the footrest. This type of footrest would work well for normal everyday use and would be particularly useful for off-road use over rough terrain were a footrest remaining low to the ground would easily snag or bottom out.

FIGS. 25A-25E depict an embodiment of a "skid" type raisable footrest. Although this "skid" type footrest is shown with a "chariot" type "Dedicated Lever Drive Wheelchair", it can also be used on a configuration of a conventional type wheelchair where the caster wheels are in the front and the larger drive wheels are in the back. In this "chariot" type wheelchair as well as a conventional wheelchair configuration, the footrest can get in the way and be a hindrance when the user is attempting to climb over a curb or obstacle. But when the turned-up front of this "skid" footrest 131 contacts an obstacle 132, it slides up on a track 123', using a linear bearing 122', which is located on the front of the wheelchair and raises the user's feet and legs with it. This allows either the drive wheel of the "chariot" type wheelchair configuration 48 or the caster wheels on a conventional type wheelchair configuration 49, FIG. 1, to ride up over the curb or obstacle unobstructed by the footrest. As the curb or obstacle is cleared, the weight of the user's feet and legs allow the "skid" to lower back down.

FIGS. 26A-26C, 27A-27D and FIG. 1A depict an embodiment of an optional retractable backrest/headrest 47 which can be added to a seat back 151 being utilized or to the canes supporting the backrest 115, by means of various embodiments of attachment 143. The means of attachment also provide a guide which allows vertical movable supports 144 to slide up and down thereby raising and lowering the constituents of the backrest/headrest upon which a person's back and/or head would rest. The embodiments depicted have three pieces which provide support. However, there are many different embodiments, including the use of an accordion like structure. There are various embodiments available to spring-load the sections so that they lift/raise by themselves after the cord type restraint 145 is allowed to be unwound off of a device such as the ratchet type spool depicted 107.

Figures 27A, 27B:
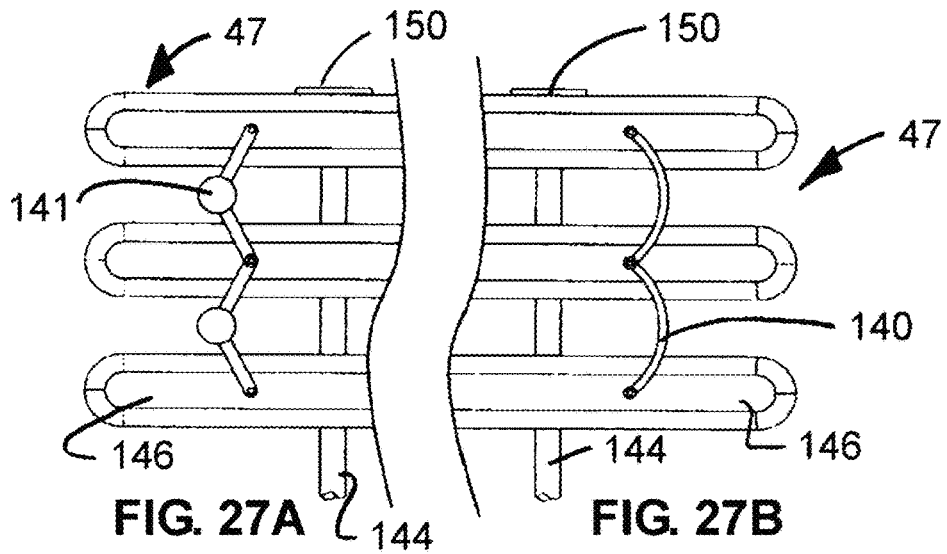
FIGS. 27A, 27B, and 27C depict embodiments of spring systems for raising the collapsible backrest and headrest.
Figure 27C:
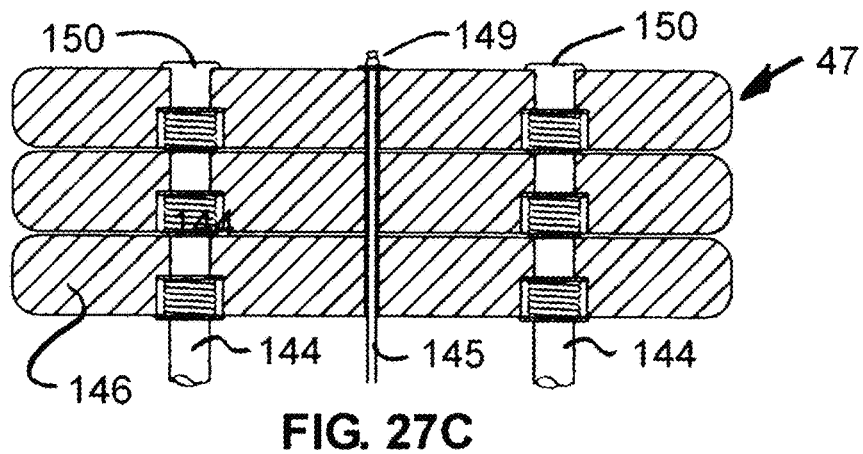
Figure 27D:
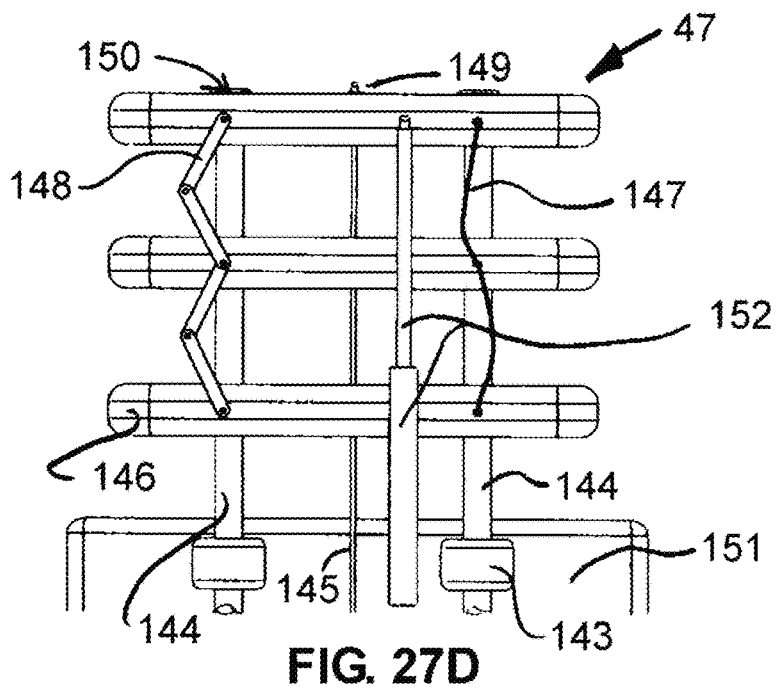
FIG. 27D contains an embodiment of a backrest and headrest where those items are raised with the use of a gas type spring.

There are various embodiments which can be utilized to reel in and hold the cord or other restraint device which collapses the backrest/headrest. When it is in its raised position, one embodiment has the most forward part, which would support the upper back and head flush with the seat back below it FIGS. 1A, 1B and 26A-26C. In other words no incongruity in the plane of the lower seat back and upper seat back and headrest. In one embodiment the horizontal support sections could be made of molded expanded foam. There are various embodiments of springs which can be used to deploy the backrest/headrest. Some of these are depicted in FIGS. 1A, 1B, 26A, 26B, and FIGS. 27A-27D. These include coil springs 143, wound clock type springs on a linkage 141, FIG. 27A, leaf type springs, 140 FIG. 27B and an air type spring 152, FIG. 27. FIG. 27C demonstrates one embodiment to nest the springs so that the backrest/headrest can be completely collapsed. At the top of the topmost horizontal support piece, the "cord" 145 is restrained 149 so that it can pull down on that top support to collapse the pieces down. When a gas spring is used a linkage 148, FIG. 27 or a cord type material 147 needs to be attached to each horizontal element so that as the top element is raised by the gas spring (air spring) it pulls the other elements up as well FIG. 27D.

To collapse the backrest/headrest the ratcheting reel or other device 107 is turned FIGS. 26A-26C and FIGS. 1A and 16. While the figures depict the reel under the seat, there are alternative embodiments for locations of placement of a reel, and alternative embodiments for collapsing the backrest/headrest. An alternative to molded or padded horizontal members is the use of a "fabric" "sling" which could be folded accordion like or on a roll which would be deployed by either coil springs or a gas type spring(s).

Figure 28B:
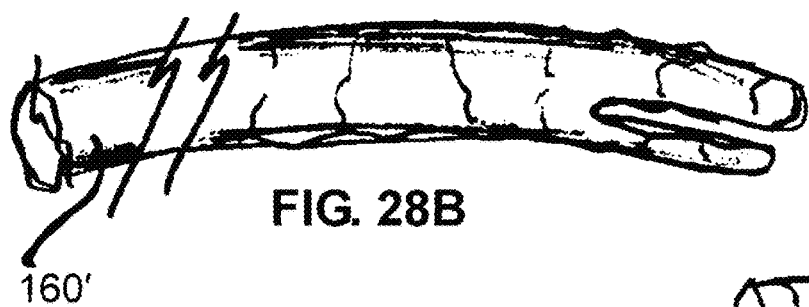
FIGS. 28A, 28B and 28C depict various embodiments of protective sleeves which can be placed over components of a wheeled conveyance.
Figure 28C:
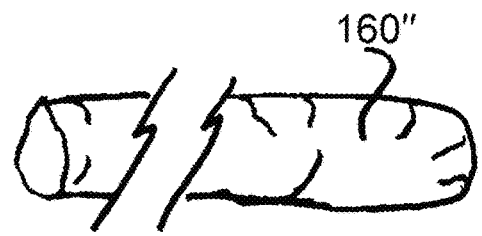
Figure 28A:
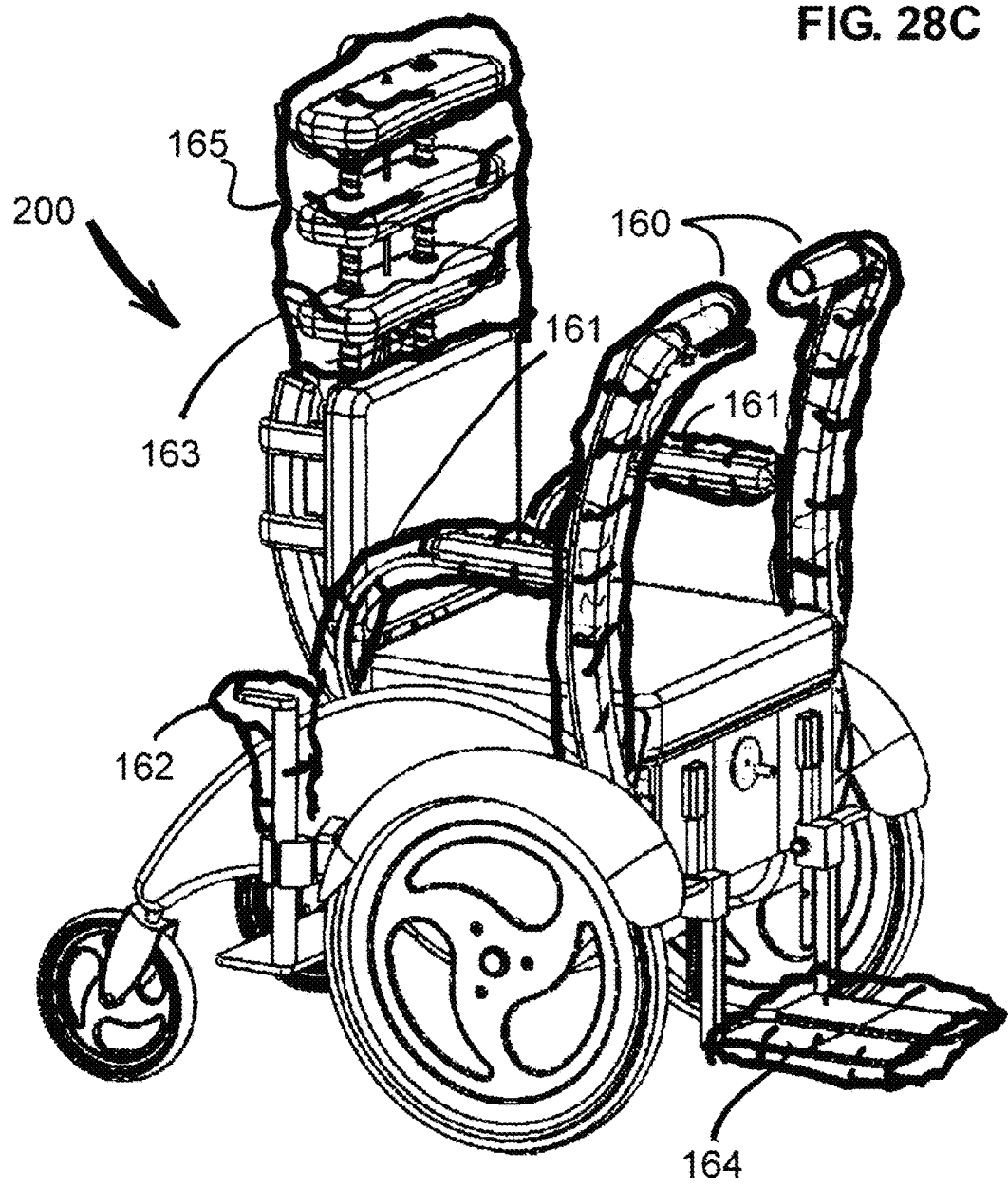

FIGS. 28A-28C depict embodiments of protective covers which can be placed over various parts of a conveyance, such as the lever driven wheelchair 200. One embodiment is a custom shaped disposable sleeve which can be placed over the lever handle and brake lever so that material, including infectious material, is not transferred from the hands of the user to another user 160. In other words, each wheelchair could get clean sleeves placed on the lever handles and lever as, for instance, an infection control mechanism. In one embodiment of the sleeve, it can be made out of plastic or other material impermeable to bacteria and other infectious organisms. In one embodiment, it can be shaped with "pockets" to accommodate the lever handle and brake lever separately 160' FIG. 28B or it can be without separate pockets 160" FIG. 28C. Protective sleeves can also be fitted on other parts of a conveyance like a wheelchair including the footrests 164, the support foot 162, the arm rests 161 and/or the backrest/headrest.

Figure 29:
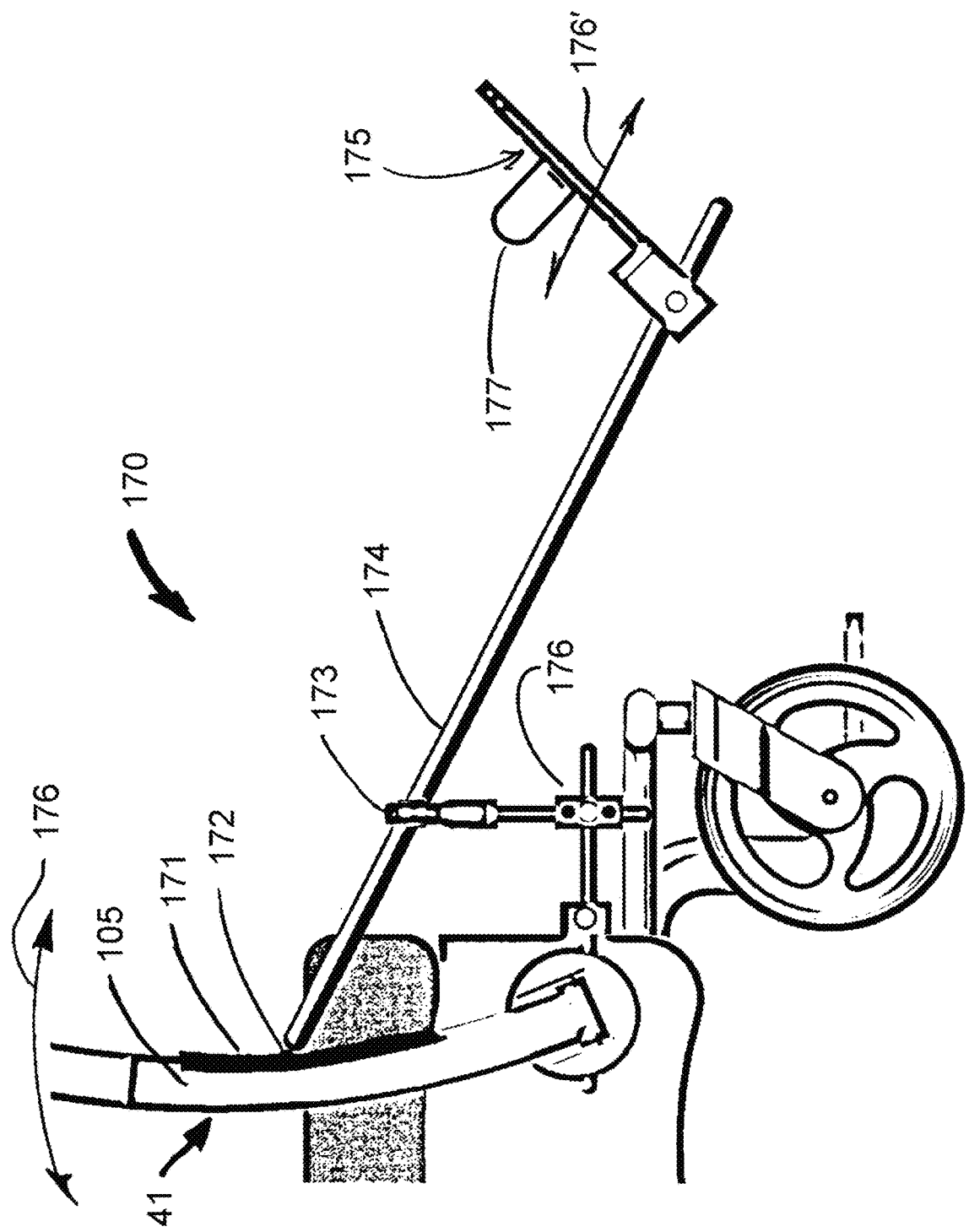
FIG. 29 depicts one embodiment of an attachment to an embodiment of the wheeled conveyances which allows the user to also use a leg to move the lever forward and/or aft.

FIG. 29, 170 is one embodiment of an attachment to the "Dedicated Lever Drive Wheelchair" which allows a user to augment the movement of one or both levers using either one leg or both legs. In some instances, the reverse situation may be true, that is, the user's arms may be weak as compared to the legs and so that effectively the legs are doing the propelling, augmented by the user's arms on the levers. In either instance a foot strap 177 can be used on the footplate 177 so that movement of the footplate upward as well as downward can move the lever. In other words, one pushes on the foot plate which moves the lever 41 forward but pulls up on the foot strap which moves the lever 41 backwards.

The footrests are attached to a pushrod which runs through a bushed rod end type device 173 to allow the pushrod 174 to be supported and travel in and out, arrows 176' as the levers move forward and back, arrows 176. The "lever-leg combination drive" is adjustable up, down, forward and back in and out (left and right) via support and adjustments 176 which is attached to the wheelchair's ridged frame 42. Further the footplate 175 can be angled. Also, the pushrod 174 can be angled by sliding the pivot 172 up or down the track 171 which is attached to the lower part of the lever 105. The attachment can be used for either one or both legs.

In addition to the items set forth with Figures herein, optional attachments to the "Dedicated Lever Drive Wheelchair" include, but are not limited to arm rests, both foldable and ones that attach to the frame and move up and down, handle(s) in the rear of the wheelchair so that it can be pushed by someone in back of the wheelchair, foldable/removable table, snow plow, baskets for shopping and other purposes, a towing attachment so that small trailers/wagons can be towed, sweeping and leaf blower attachments, attachment to a snow blower etc.

Figure 30:
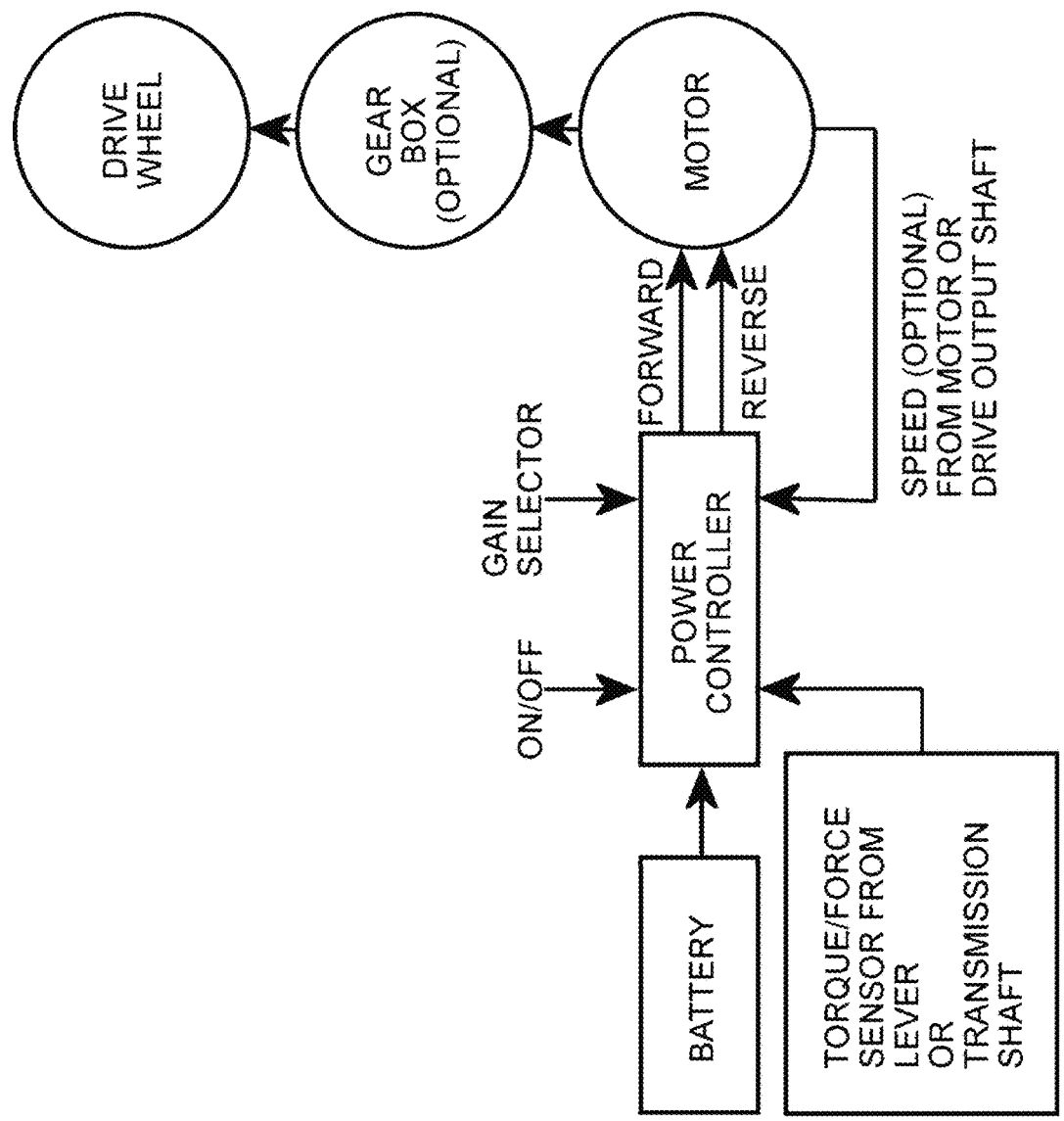
FIG. 30 depicts a schematic of an embodiment of an electric motor assist to a lever driven wheeled conveyance such as a wheelchair.

Embodiments of the conveyance, and the embodiment as a "Dedicated Lever Drive Wheelchair" can be used solely manually. However, they can also be configured with an electric motor assist. The flow chart/schematic FIG. 30 depicts the major elements of the electric motor assist. They include: Torque/force sensor(s) which determine how much force the user is applying to the lever and in what direction i.e. forward or backwards.

A gain adjustment set by the user determines how much power the power controller should send to the electric motor to aid the user in propelling the wheelchair relative to how much force is being exerted on the lever. The system also requires battery power. Depending on the type of motor selected, a gearbox may be needed to take high-speed rotation from the electric motor and translate it into lower rotational speed. It is obvious that a slightly different type of controller would be needed depending on whether the wheelchair is using just a "Push" for forward and "Pull" for reverse configuration, or whether the wheelchair is in the "Push-Pull" configuration where the wheelchair is propelled in the same direction on both the push and pull of the lever. Also, the controller can be configured such that a different gain can be applied for each lever. That is, for the same amount of force applied to each lever, different assist can be applied to each lever. This would have utility for instance where the user has different strength in each arm, or when used with the leg attachment, which augments the use of the user's arm movement/force, where the user has different strength in one leg vs the other, or is just using one leg to augment the user's arm movement, etc.

As can be seen the power controller is the heart of the system. It obtains the data from the torque/force sensor(s) which determine how much force the user is applying to the lever and in what direction i.e. forward or backwards and integrates that information with the gain selected by the user as well as potentially speed information, to determine how much power to send to the motor and whether for forward or reverse. Depending on the type of motor, it would either drive the drive wheel directly or through a step-down gearbox.

In an embodiment of the output shaft to the drive wheel, it can be configured in a manner that, the end of it that does not go to the drive wheel, (for instance see FIGS. 13A-18 at location 32), can be extended through the transmission housing toward the inside of the conveyance and can be used as a power take off to drive rotating devices such as a generator or air pump/compressor, hydraulic pump or other rotating devices. Depending on the device a gearbox may be utilized between the power take off in the rotating device. A generator can be used, for instance, to provide nighttime running lights including for safety purposes, to charge a battery and/or to charge/power various electronic devices. One of the medical issues of concern to wheelchair bound persons is keeping the skin of their buttocks area and back dry. The power take-off can be used to run an air pump/air compressor to force air through a custom seat bottom and/or custom seatback. There are other embodiments which can provide a rotational power take off.

Figure 31:
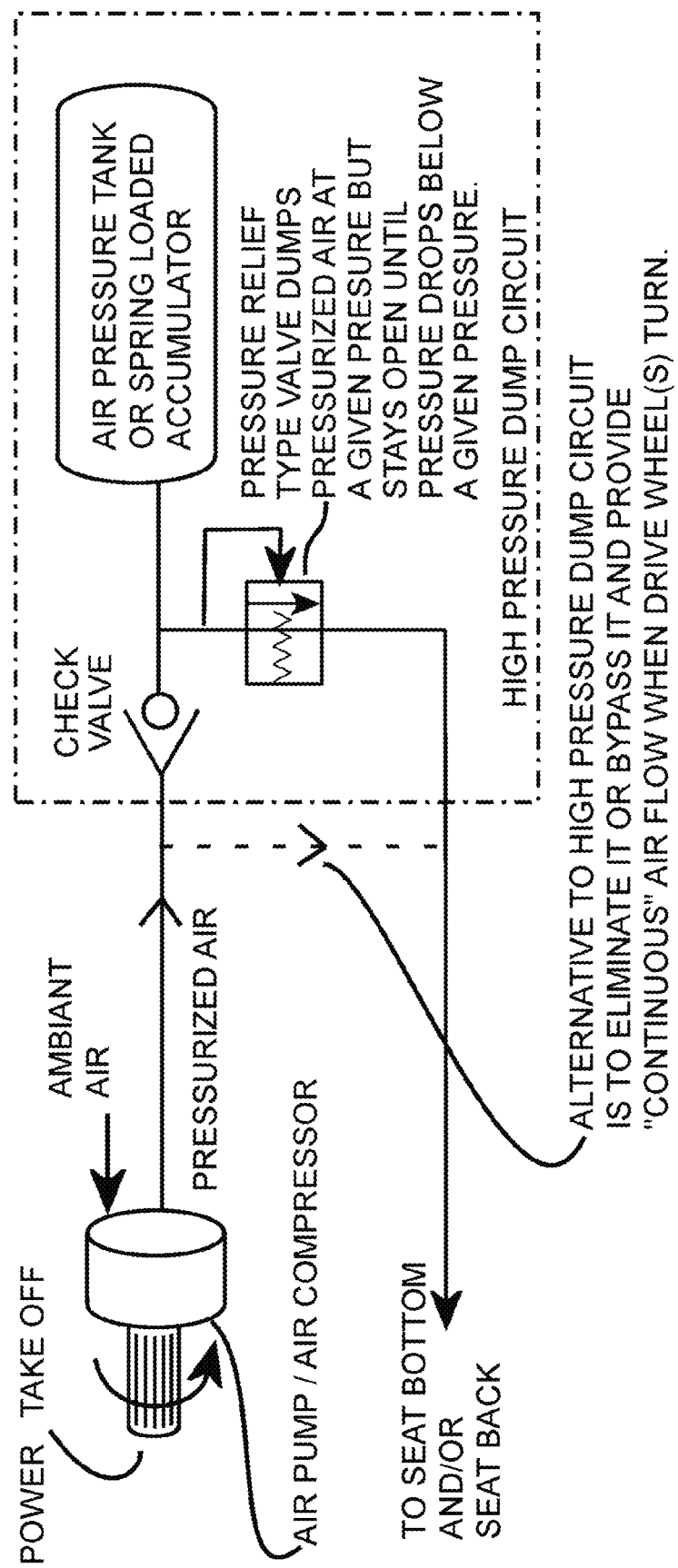
FIG. 31 depicts a schematic embodiment of a rotating power takeoff which drives a pneumatic pump which can be used to blow air into the bottom and/or back of the seat.

The schematic in FIG. 31 depicts two possible, but not all inclusive embodiments of methods for providing the air to the custom seat bottom and/or custom seatback. One system utilizes the High Pressure Dump Circuit which is shown within the dotted line box. Pressurized air from the air pump/air compressor runs through a check valve and into an air pressure tank or spring-loaded accumulator. When the pressure reaches a predetermined level, a pressure relief type valve opens fully and dumps the pressurized air to the custom seat bottom and/or custom seatback, which have been designed to allow the air to flow through them to the user's body. The valve stays open until the pressure drops below a predetermined pressure at which time the valve snaps shut. An alternative to the high pressure dump circuit is to merely continually pump air to the custom seat bottom and/or custom seatback as depicted by the vertical dotted line which bypasses the high pressure dump circuit. For clarification if this technique is used is likely that the high pressure dump circuit would be removed completely i.e. not exist in this configuration.

The drive wheels 48 on this "Dedicated Lever Drive Wheelchair" can be cambered either by way of a flexible coupling off of the drive wheel driveshaft or by angling the entire Transmission.

Tooth Clutch Transmissions

The following Figures and description relate to a transmission for a wheelchair or other conveyance, that includes a clutch mechanism with clutch faces or plates that selectively engage/disengage each other, depending on the axial or longitudinal position of the input drive shaft. Two specific examples that are described are a "tooth clutch transmission" and a "hybrid tooth clutch transmission", either of which are embodiments of the Lever-Drive Transmission which can be used instead of, or as a replacement for, or in conjunction with, the manual driven Lever-Dive Transmission described in the previous paragraphs as well as detailed in FIGS. 11A through 18 and associated text.

A manual Lever Drive Wheelchair is one where levers in front of the user are manually moved forward and aft. The levers are attached to a transmission through an input drive shaft which translates these movements to turn the wheelchair's output drive shaft to which the drive wheels are attached, and thus propels the wheelchair.

As used throughout this text and figures the term "tooth clutch" refers to various embodiments of a mechanical clutch mechanism which is generally constructed with two opposing clutch faces. Embodiments of these clutch faces include, but are not limited to, teeth similar to that shown in FIGS. 32 through 33C, which are shown grossly exaggerated for clarity, opposing blades, holes in one clutch face and pins in the other to fit the holes, "Velcro" type hooks on one face and loops on the other, friction materials on the clutch faces and other embodiments which allow one clutch face to mechanically interact/interlock with the other and can include magnetism or electromagnetism or detents to help lock the clutch faces together.

As used throughout this text and in the Figures, the term "sprockets" refers generally to what the bearings are inside of, be they conventional bearings or one-way clutch bearings. What is referred to as "sprockets" herein could be sprockets (with chain), pulleys (with belts) or gears and which transmit rotation from the input shaft to the output shaft and thus drive wheel of the conveyance. If gears are used, there likely would be a third gear between the input gear on the drive shaft and the output gear on the output shaft, so as to have the rotation of the output shaft in the same direction as the input shaft. Conventional bearings include, but are not limited to, roller bearings, needle bearings, ball bearings and bushing type bearings and combinations of same.

Methods of moving/sliding the input drive shaft in and out include but are not limited to rotating/moving the lever slightly left or right for a lever drive wheelchair or other human conveyance. See for instance FIGS. 5 through 9B and associated text. However, the input drive shaft can be moved/slid inward and outward by other means such as via push button and cable, or bicycle brake type lever and cable, doing it electrically such as with a solenoid, pneumatically or hydraulically, directly manually or via other means.

Figure 32:
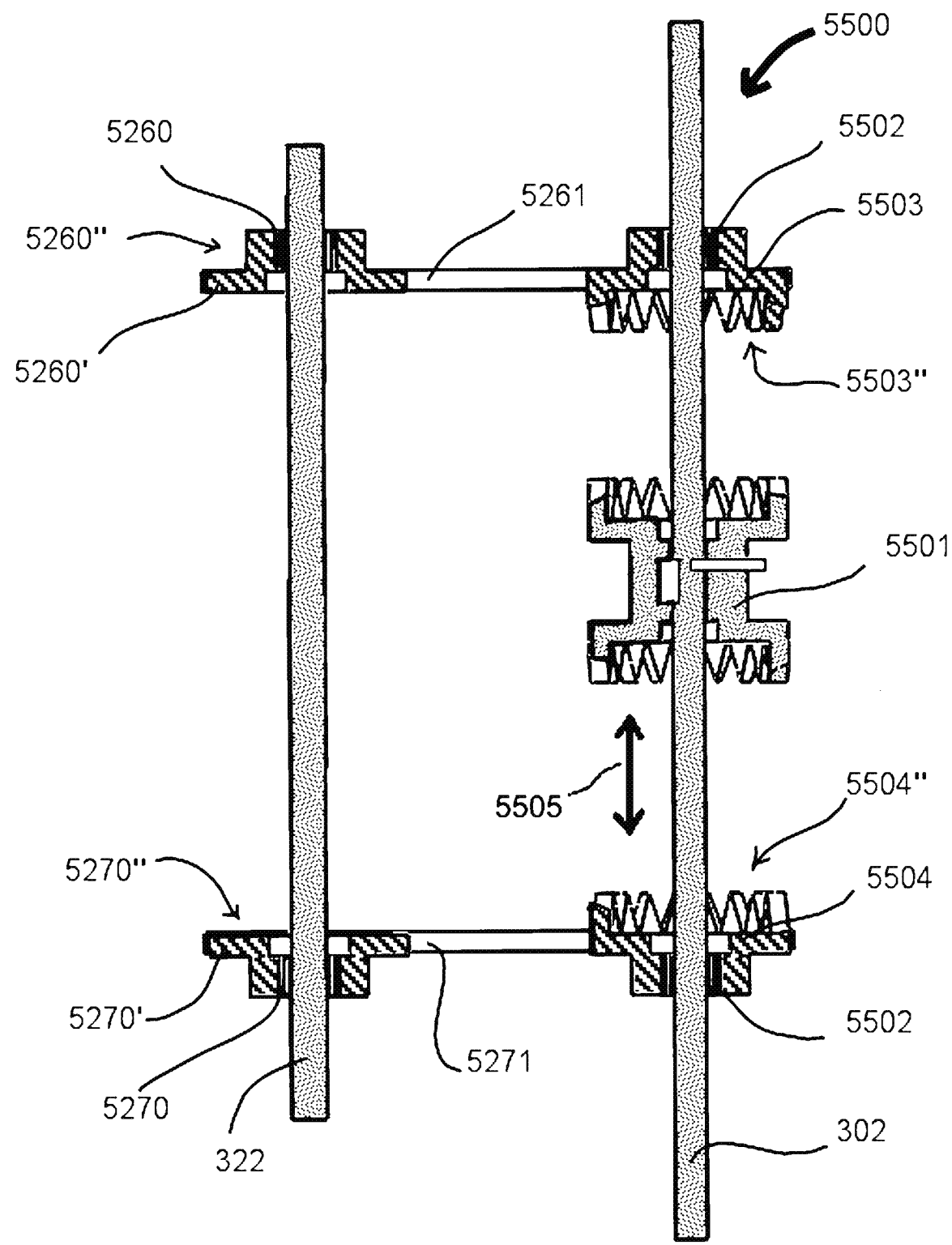
FIG. 32 depicts one embodiment of a tooth clutch.
Figure 33:
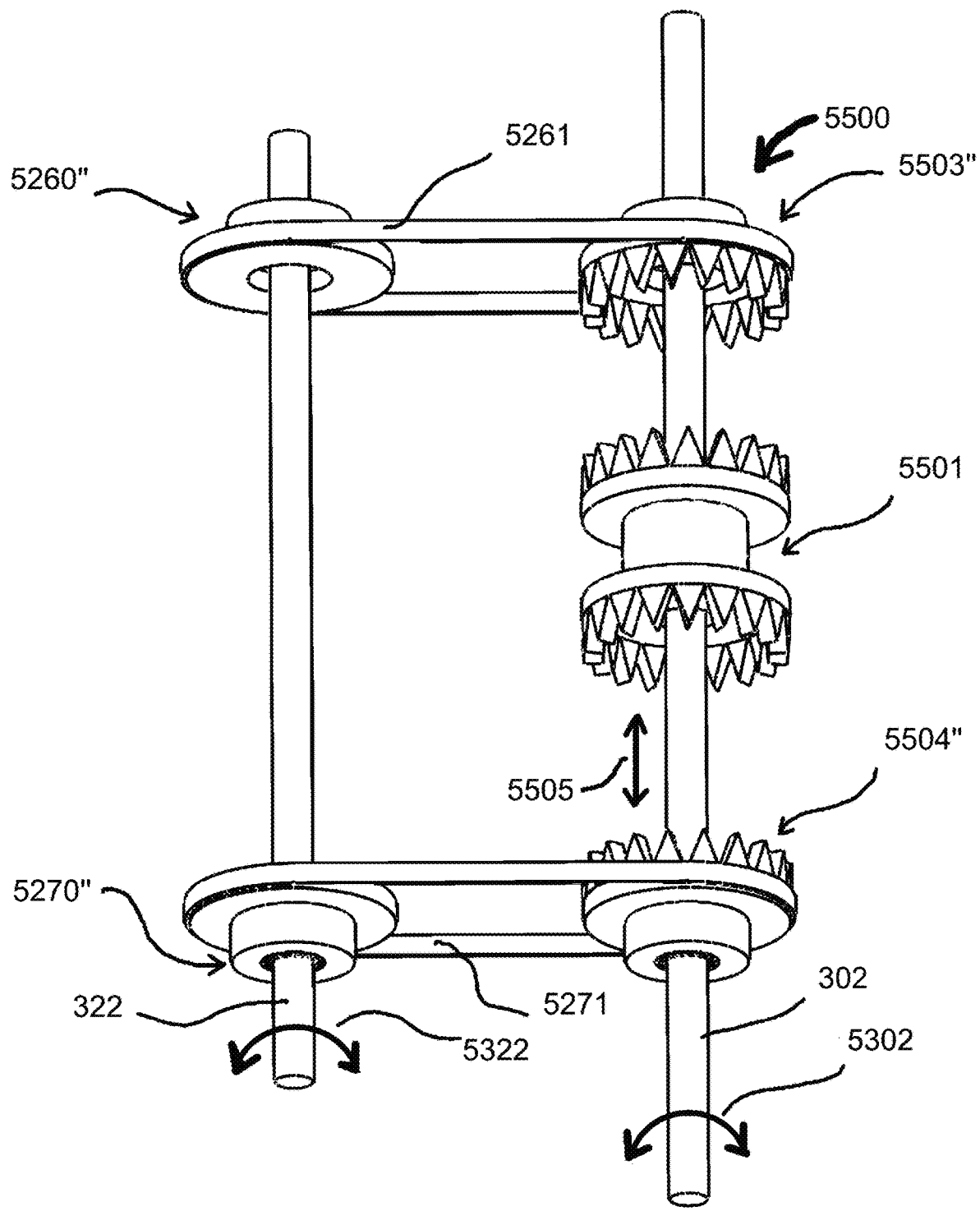
FIGS. 33, 33A, and 33B depict the tooth clutch of FIG. 32 in various positions.

The input drive shaft 302/5302 depicted as embodiments in the accompanying FIGS. 32 through 33C, regardless of how depicted in the figures, can be connected to the output drive shaft via pulleys and belts and/or sprockets and chain and/or gears, each of which allow for various gear ratios of input shaft to output shaft rotation. Each of these embodiments are not specifically depicted.

As to the output shaft item 322 which in an embodiment would drive the drive wheels of a conveyance such as a wheelchair, the other end of the shaft can be used as a power takeoff or as an input for electric motor assist as generally described in FIGS. 30 and 31 and related text.

An embodiment of the Transmissions described herein can be such that they allow the human conveyance to be propelled when in a forward and/or reverse mode, both when the input drive shaft 302/5302 is rotated forward and backward—what is sometimes called a "push-pull" mode. For instance, in a wheelchair with levers, when in forward gear, the wheelchair is propelled forward when the lever is moved/rotated forward and also when it is moved/rotated backward. Transmission logic embodiments like that shown in FIGS. 13-18 could be used.

Tooth Clutch Transmission Overview

In the previously described embodiments of a Lever Drive Transmission, the input shaft has the ability to selectively connect or disconnect from the output shaft, to which the drive wheel is connected, by selectively engaging or disengaging the one-way clutch bearing along the length of the input shaft, as the input shaft is moved/slid laterally through one-way clutch bearings. The one-way clutch bearings engage and can be disengaged, depending on the thickness of the shaft slid within them. When the portion of the shaft slid within them is full diameter they can engage, when the portion of the shaft slid within them is a smaller "ground down" diameter the one-way clutch bearings cannot engage as seen in FIGS. 11A through 18 and associated text.

In this unique "Tooth Clutch" design embodiment, for a Lever Drive Wheelchair or other conveyance, the input shaft is also moved laterally/axially along its length/axis to selectively engage or not engage and disengage the output drive shaft. However, the conceptual difference in the two Transmissions is that the selective engagement and disengagement in this "Tooth Clutch" design is accomplished by means of, what is commonly referred to, as a "tooth clutch". Such tooth clutches are used in a series along the lateral axis of the input drive shaft 302/5302, as depicted in FIGS. 32 through 33C, to selectively engage and disengage the belts and pulleys, and/or sprockets and chain and/or gears, which connect to the output shaft and thereby transmit rotation to the output shaft and to the drive wheel. Embodiments can include as well, the ability to connect to a "no back" or anti roll-back device similar to that described in FIG. 17 and associated text.

One embodiment of the Tooth Clutch Transmission is depicted in FIGS. 32, 33, 33A and 33B. A "Central Tooth Assembly" 5501 of the Tooth Clutch Transmission has teeth on both sides of it and is rigidly attached to the input drive shaft 302/5302 (e.g., via a pin, screw, keyway and pin or screw, press fit and/or other mechanical attachment modalities) such that it rotates with the shaft. This input drive shaft is supported on conventional bearings, which allows this input drive shaft to freely turn in both directions. These conventional bearings which sit inside the sprocket assemblies 5503" and 5504" are configured in a way which allows the input drive shaft to freely move/slide laterally in and out of these conventional bearings. This configuration of conventional bearings which allows a shaft to freely slide in and out through the center of the bearings is unique to this design.

In this embodiment, when the shaft along with the "Central Tooth Assembly" 5501 is moved/slid inward, the "Forward Teeth" of the Tooth Clutch are engaged. When the input drive shaft 302/5302 is rotated forward/clockwise by the Lever, such as depicted in FIGS. 2A-2C and associated text, the conveyance is propelled forward. The drive lever is able to be moved backward for the next stroke without impediment.

In this embodiment, when the input drive shaft along with the Central Tooth Assembly 5501 is moved/slid outward, the "Reverse Teeth" of the Tooth Clutch are engaged. When the input drive lever is moved backward it propels the conveyance backward. The drive lever is able to be moved forward for the next stroke without impediment.

Some of the embodiments for the methodology for using the drive levers to slide the input drive shaft 302/5302 in and out, as the levers are moved sideways i.e. left and right as viewed from the seated position looking forward, are described in FIGS. 5 through 9.

There can be embodiments where there are multiples of tooth clutches and associated sprockets, along the length of the shafts, which provide for more than just forward, neutral and reverse, such as different gear ratios for forward and/or reverse gears.

Description of Tooth Clutch Figures and Functionality

Figure 33A:
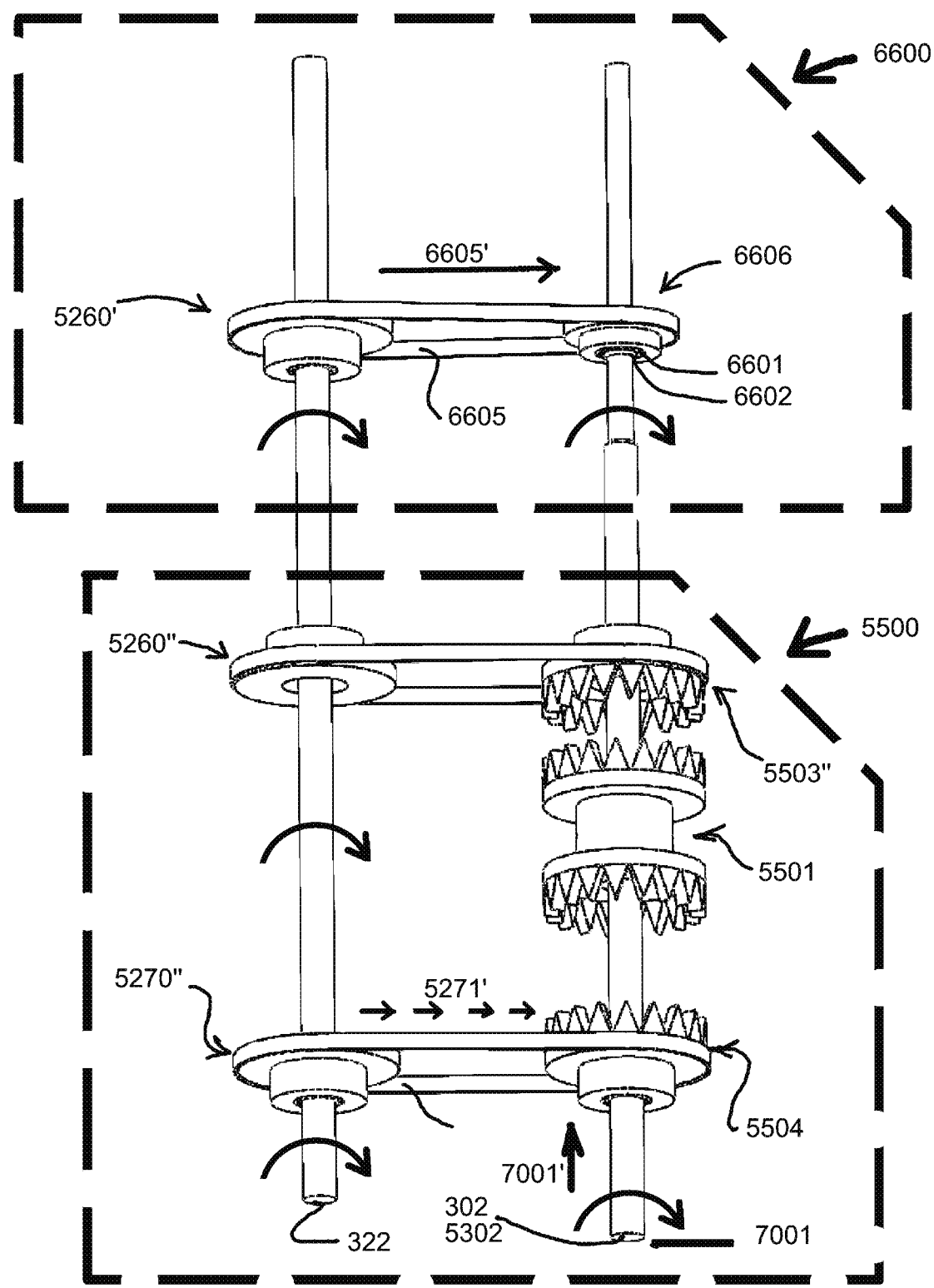
Figure 33B:
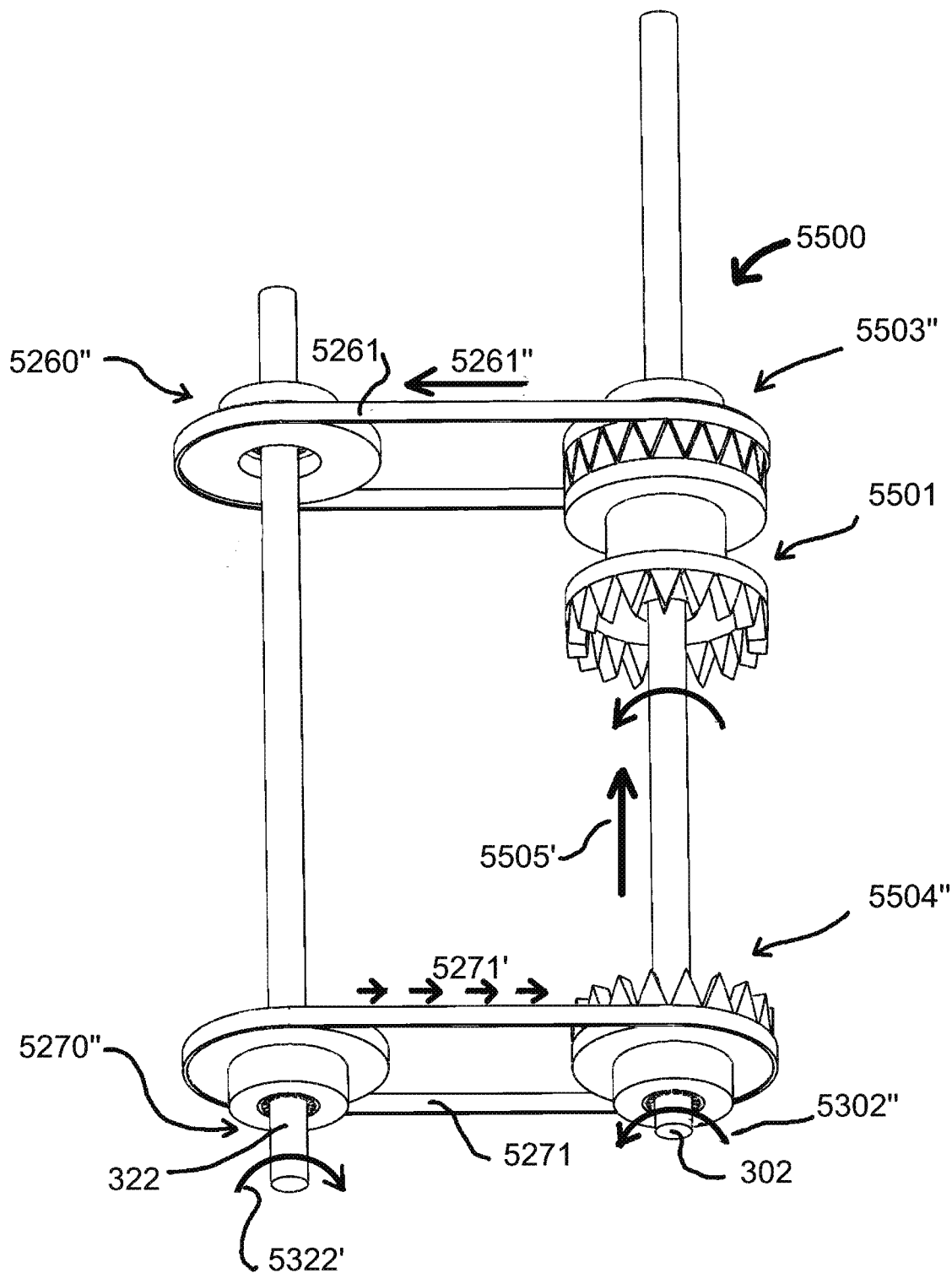

FIGS. 32 through 33B are not to scale and the teeth on the clutch faces are grossly exaggerated for clarity. Further, what is shown is just one embodiment of "tooth" geometry and clutch plate design and geometry.

For the configuration/embodiment shown in FIGS. 32 through 33B, The Central Tooth Assembly is double sided and is rigidly attached to the input drive shaft 302/5302 so that it moves with the input drive shaft as the shaft is rotated and moved/slid in and out of the conventional bearings shown as 5502 which reside in sprocket and clutch face assemblies 5503" and 5504".

There are one-way clutch bearings only on the sprocket assemblies on the output shaft 322. There are only conventional bearings within the sprocket assemblies on the input drive shaft 302.

FIG. 32 is an embodiment of a sectioned view of the Tooth Clutch Transmission. Collectively the items comprise large assembly 5500, which is depicted in each of FIGS. 32 through 33C. Further, the large assembly 5500 is depicted in its entirety within the dashed lines designated as assembly 5500 in FIGS. 33 through 33C.

As to assembly 5500:

Item 302 is the input drive shaft. This shaft is connected to a Drive Lever of the manual Lever Drive Wheelchair or other type conveyance and is able to slide in and out laterally, as depicted by arrow 5505, through sprockets 5503" and 5504".

Item 5501 is a representation of a double sided/double faced portion of a tooth clutch which is rigidly attached to input drive shaft 302 and thus moves laterally with it as well as rotates with it.

Assembly 5503" is a sprocket assembly which is comprised of the sprocket body and clutch face 5503 and conventional bearing 5502. In this configuration/embodiment it provides forward gear.

Assembly 5504" is a sprocket assembly which is comprised of the sprocket body and clutch face 5504 and conventional bearing 5502. In this configuration/embodiment it provides reverse gear.

Item 322 is the output shaft onto which a drive wheel is attached to propel the conveyance forward and reverse.

Item 5261 depicts a belt/chain used to couple the sprockets 5503" and 5260" which provide forward gear.

Item 5271 depicts a belt/chain used to couple the sprockets 5504" and 5270" which provide reverse gear.

Assembly 5260" is a sprocket assembly which is comprised of the sprocket body 5260' and one-way clutch bearing 5260 which grabs the output shaft 322 only when rotated clockwise about the shaft. In this configuration/embodiment it provides forward gear.

Assembly 5270" is a sprocket assembly which is comprised of the sprocket body 5270' and one-way clutch bearing 5270 which grabs the output shaft 322 only when rotated counterclockwise about the shaft. In this configuration/embodiment it provides for reverse gear.

FIG. 33: This figure is similar to FIG. 32 in that it describes generally the relationships of the components within the Transmission. In this configuration/embodiment the large assembly 5500 is in Neutral. The Central Tooth Assembly 5501 of the tooth clutch assembly is not engaged in either the Forward Sprocket and associated clutch face of Assembly 5503" or Reverse Sprocket and associated clutch face of assembly 5504" and the input and output shafts can spin freely in both directions as indicated by arrows 5302 and 5322. This configuration is similar to the neutral configuration of FIG. 12A.

FIG. 12A is used to show the similarity of the "logic" between itself and the Tooth Clutch Transmission logic, particularly with respect to the function of one-way clutch bearings 260 and 270 on the output shaft.

FIG. 33A: This depicts the Tooth Clutch Transmission in Forward Gear as the input shaft is rotated forward by the Lever of a Lever-drive wheelchair or other conveyance, being pushed/rotated forward.

The input shaft has been moved/slid inward as depicted by arrow 5505' and the Central Tooth Assembly 5501 has its clutch face engaged into the clutch face of the Forward Sprocket Assembly's 5503".

When the input shaft 302 rotates forward as depicted by arrow 5302' sprocket assembly 5503" rotates forward/clockwise because it is rotated forward by Central Tooth Assembly 5501. This pulls the belt/chain 5261 in the direction of arrow 5261' which in turn rotates Forward Sprocket Assembly 5260" forward/clockwise as well.

The output shaft 322 is rotated forward as depicted by arrow 5322' because sprocket assembly 5260" has within it a one-way clutch bearing which grabs the shaft 322.

Reverse Sprocket Assembly 5270" also gets turned forward/clockwise because the one-way clutch bearing within it grabs the shaft 322 as shaft 322 it is turned with it. This in turn drives Belt/chain 5271 forward as depicted by arrows 5271'.

Belt/chain 5271 drives Reverse Sprocket Assembly 5504" forward/clockwise as well. However, because the Reverse Sprocket Assembly 5504" has within it a conventional bearing, it just spins freely and the input shaft 302 is not affected.

This configuration is similar to the forward configuration of FIG. 12B.

FIG. 12B is used to show the similarity of the "logic" between itself and the Tooth Clutch Transmission logic, particularly with respect to the function of one-way clutch bearings 260 and 270 on the output shaft.

FIG. 33B: This also depicts the Tooth Clutch Transmission in forward gear. However, it depicts the drive shaft being rotated counterclockwise/backward as when the lever of a lever-drive wheelchair would be moved back/pulled back/returned to its starting position.

The Center Tooth Assembly 5501 and Forward Sprocket Assembly 5503" are rotated backward/counterclockwise as is belt/chain 5261, as indicated by arrow 5261' which then rotates Forward Sprocket Assembly 5160" backward/counterclockwise as well. However, due to the orientation of the one-way clutch bearing within Forward Sprocket Assembly 5260", it does not grab the output shaft and it just rotates backward and does not affect the movement of the output shaft 322 which can continue to roll/coast forward during this rearward return stroke of the lever and input shaft 302.

As to coasting/rolling forward, in this forward gear configuration/embodiment, depicted in FIGS. 33A and 33B, when in such forward gear, because of the sprocket configurations and the type of bearings within them, i.e. the "gear logic", the drive wheel is always able to coast/roll forward/clockwise unimpeded. This is because when coasting/rolling forward, output shaft 322 is grabbed by the one-way clutch bearing which rotates the Reverse Sprocket Assembly 5270" forward/clockwise. This moves the belt/chain 5271 in the direction of arrows 5271' which in turn drives Reverse Sprocket 5504" forward/clockwise as well. However, because there is a conventional bearing within Forward Sprocket 5504", input shaft 302 is not affected and thus output shaft 322 is free to coast/roll.

The configurations in FIGS. 533A and 33B are similar to the Forward configurations of FIGS. 12B and 12C and as described in the associated text. FIG. 12B is used to show the similarity of the "logic" between itself and the Tooth Clutch Transmission logic, particularly with respect to the function of one-way clutch bearings 260 and 270 on the output shaft.

For the configuration/embodiment depicted in FIGS. 32 through 33B, reverse gear is accomplished when Central Tooth Assembly 5501 is moved via the input drive shaft, in a direction opposite to arrow 5505' and the clutch face of Center Tooth Assembly 5501 is contacted and meshed with the clutch face of Reverse Sprocket Assembly 5504".

FIGS. 12D and 12E describe the "gear logic" for Reverse, which is also applicable to the Tooth Clutch. The differences in design which is previously described above, is the way in which the input drive shaft 302/5302 gets coupled to the sprockets to effectuate rotation i.e. via the two clutch faces of the clutch mechanism.

Figure 34:
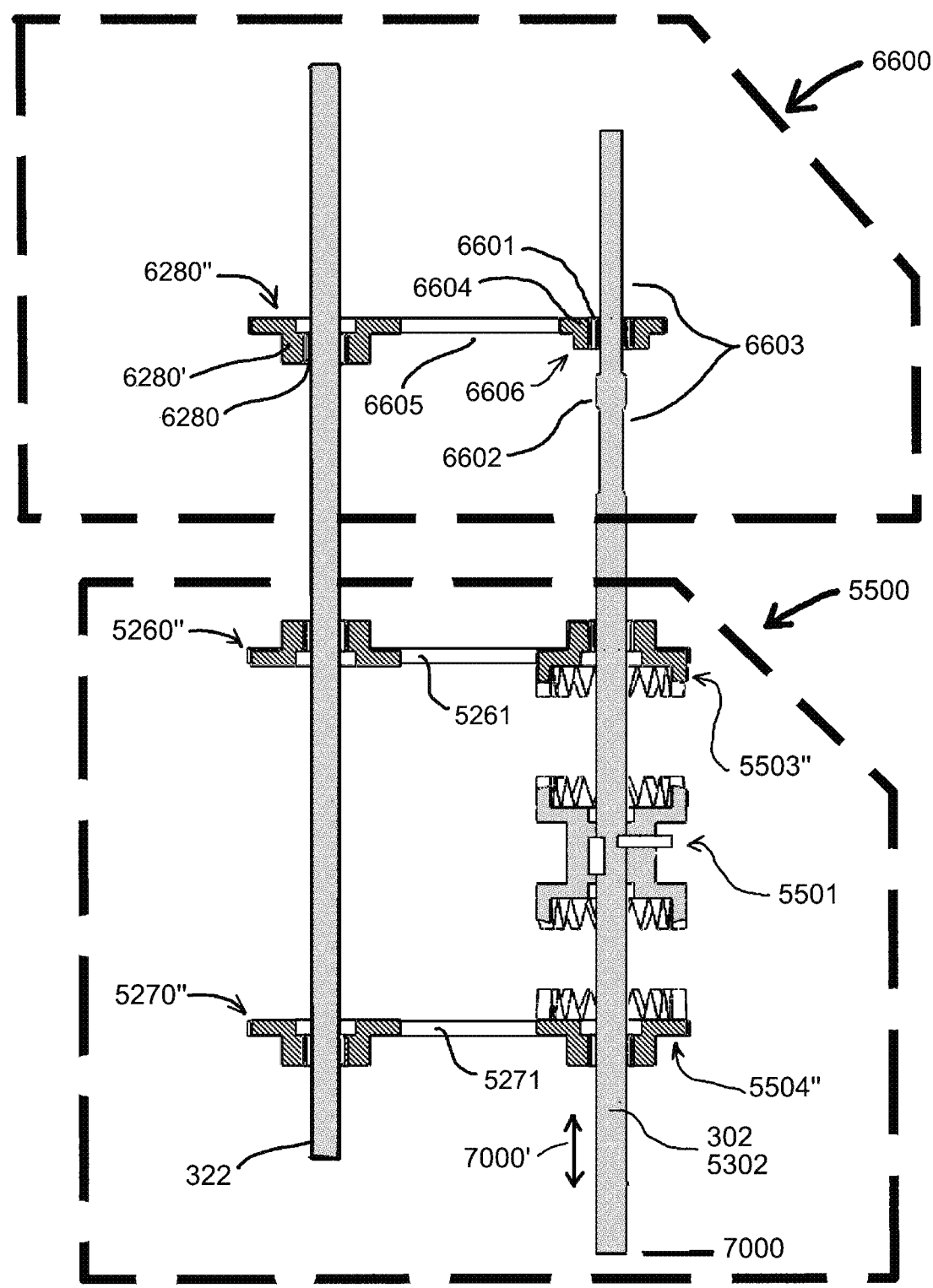
FIGS. 34, 34A, 34B, and 34C depict a hybrid clutch in various positions.
Figure 34A:
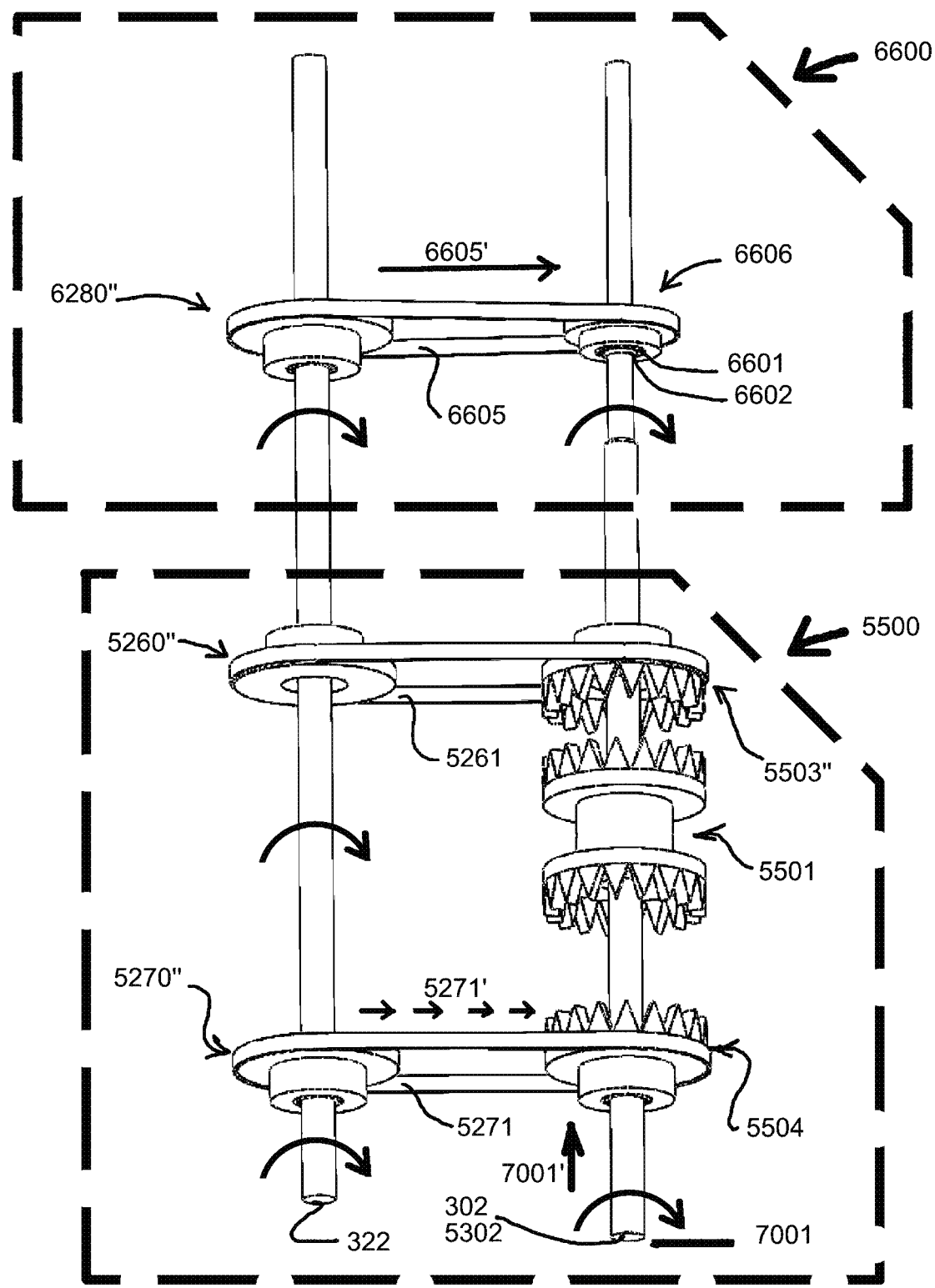
Figure 34B:
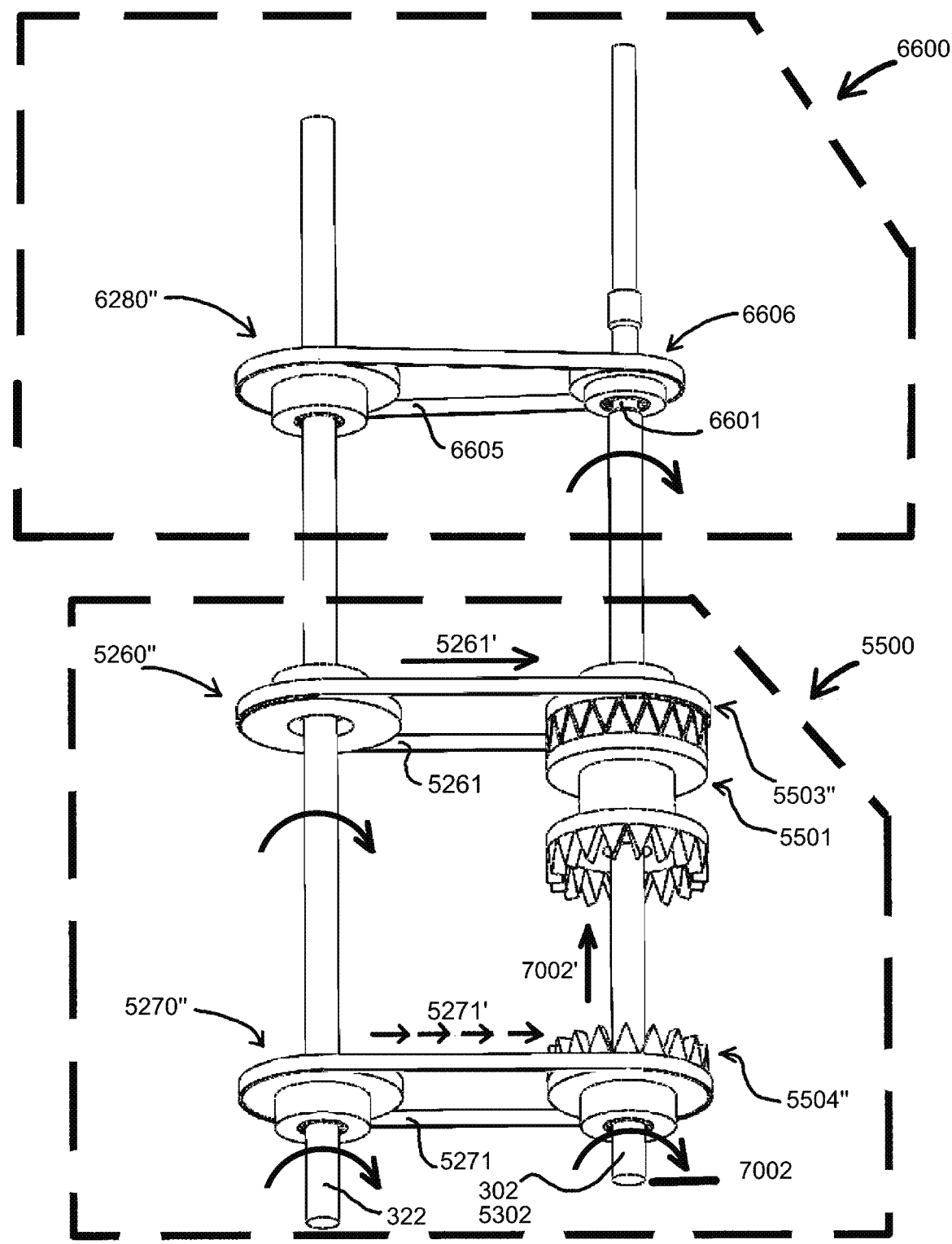
Figure 34C:
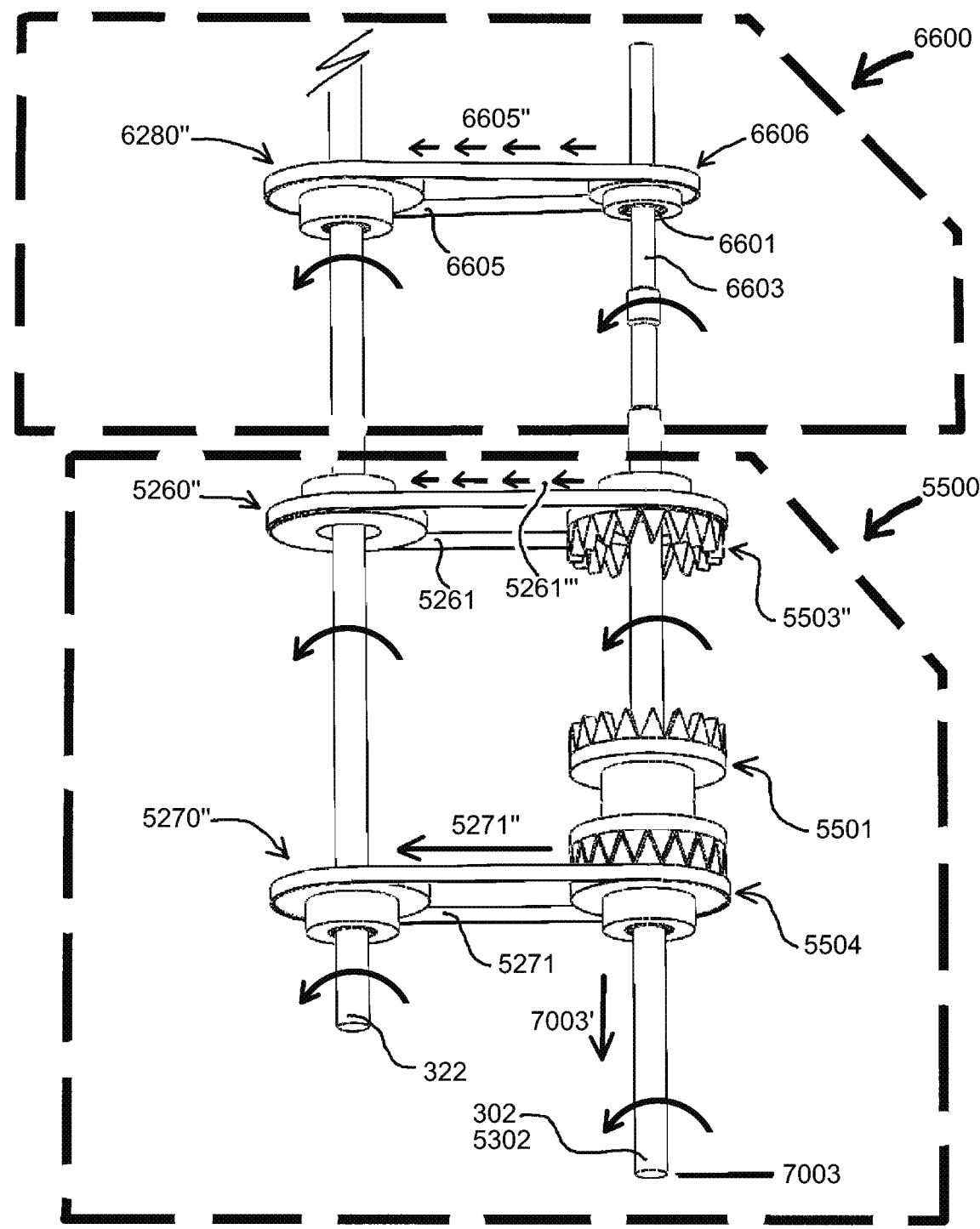

Further, the large assembly 5500 identified on FIGS. 32 through 33B is the same assembly identified in FIGS. 34 through 34C. Therefore, assembly 5500 functions in the same way in FIGS. 34 through 34C as it would in FIGS. 32 through 33B. So as to how reverse gear functions for assembly 5500, the text associated with FIG. 34C and assembly 5500 for reverse, also describes how the "gear logic" functions when the transmission depicted in in FIGS. 32 through 33B is in reverse gear. There is no need to repeat it here.

Hybrid Tooth Clutch Transmission Overview

FIGS. 34 through 34B are not to scale and the teeth on the clutch faces are grossly exaggerated for clarity. Further, what is shown is just one embodiment of "tooth" geometry and clutch plate design and geometry.

A further embodiment of the Tooth Clutch Transmission, is one for instance, depicted in FIGS. 34, 34A, 34B and 34C. Along the input shaft, is the use of both tooth clutches as well as a one-way clutch bearing. As to the one-way clutch bearing, the one-way clutch bearings along the input shaft cannot engage those areas along the portions of the input shaft where the diameter is reduced, because the one-way clutch bearing is unable to grab onto the shaft. This functionality is similar to that described in FIGS. 11A through 18 and associated text. Embodiments which use a combination of a tooth clutch and a clutch mechanism utilizing one-way clutch bearings, such as depicted in FIGS. 34, 34A, 34B and 34C, can provide enhanced capability such as allowing for multiple input to output gear ratios. The different gear ratios would be active depending on where the input shaft is moved/slid in and out relative to the transmission housing, i.e. how far the input shaft is pushed in or pulled out and therefore which sets of pulleys and/or sprockets and/or gears are engaged.

One representative embodiment is shown in FIGS. 34, 34A, 34B and 34C. This embodiment provides for two forward gears, which for instance, can be a low gear and a higher gear ratio. Assembly 5500 located within the dashed lines is functionally identical to assembly 5500 as depicted in FIGS. 32, 33, 33A and 33B as to both forward and reverse modes.

Assembly 6600 as depicted in FIGS. 34, 34A, 34B and 34C are an embodiment where it is in addition to assembly 5500 and adds the functionality of an additional gear ratio. There are numerous variations/embodiments of this basic design.

The use of various sizes of sprocket match ups can provide for different gear ratios. For additional embodiments additional sprocket pairs along the shafts can provide for increased numbers of different gear ratios with additional areas of full diameter shaft on the input shaft 302/5302, where the one-way clutch bearings on the input drive shaft can grab the shaft along with additional areas that are "ground down" or reduced diameter section of the input shaft where the one-way clutch bearings cannot grab the shaft.

As to the locations of the various sprockets in the Hybrid Tooth Clutch, there are various embodiments. That is, for instance, assembly 5501, depicted in FIGS. 34 through 34C does not have to be a two-sided tooth clutch. The clutch faces could be at other locations along the input drive shaft which would mesh with appropriate clutch faces attached to sprockets in other locations. The same applies to assembly 6606 and 6280" which can be at a different location. And, as mentioned, depending upon the functionality of the embodiment, there can be any number of such sprocket pairs placed along the input and output shafts.

Description of Hybrid Tooth Clutch Figures and Functionality

FIGS. 34 through 34C are not to scale and the teeth on the tooth clutch faces are grossly exaggerated for clarity. Further, what is shown is just one embodiment of "tooth" geometry and clutch plate design and geometry.

As to this Hybrid Transmission, only one embodiment is shown via the addition of one set of sprockets and a single instance of the geometry of the diameter changes in the input drive shaft 302/5302. However, there can be any number of such sprocket pairs placed along the input and output shafts.

FIG. 34 is a sectioned view of an embodiment of the hybrid tooth clutch. It is comprised of large assembly 5500 described elsewhere and large assembly 6600.

FIG. 34A depicts an embodiment of a forward "low gear".

FIG. 34B depicts an embodiment of a forward "higher gear".

FIG. 34C depicts an embodiment of a reverse gear.

As to assembly 6600 located within the dashed lines in FIGS. 34 through 34C:

Item 6601 represents a one-way clutch bearing which can grab the full diameter of the input drive shaft 302/5302 only when the shaft is rotated clockwise/forward.

Item 6604 represents a sprocket, pulley or gear within which is the one-way clutch bearing 6601 resides.

Item 6606 is the sprocket assembly comprised of 6601 and 6604.

Locations 6603 depict the "ground down" reduced diameter portions of the input drive shaft. When these portions are situated within the one-way clutch bearing 6601 of assembly 6606, the one-way clutch bearing cannot grab the shaft because the shaft diameter is too small.

Location 6602, in this embodiment, depicts the location along the input drive shaft 302/5302, where the shaft is at full diameter. When this full diameter is within the one-way clutch bearing of sprocket 6604 of assembly 6606 the input drive shaft 302/5302 can grab the shaft only when the shaft is turned forward/clockwise.

Item 6605 depicts, in this embodiment, the chain or belt which connects sprocket assembly 6606 to sprocket assembly 6280". This allows the rotation of the input drive shaft to be transmitted to the output shaft 322 and thus to the drive wheel.

Item 6280 depicts a one-way clutch bearing which grabs the output shaft and turns it, only when rotated forward/clockwise.

Item 6280' depicts the sprocket into which the one-way clutch bearing 6280 is situated.

Assembly 6280" is the sprocket assembly comprised of 6280 and 6280'.

FIG. 34C describes reverse gear which causes the conveyance to move backward when the lever of the conveyance is moved/rotated backwards.

FIGS. 34, 34A and 34B depict the hybrid tooth clutch transmission in three modes of operation. A neutral gear, a forward low gear and a forward higher gear: FIG. 34 Position 7001 is neutral, FIG. 34A position 7001 is low gear, FIG. 34B position 7002 is a higher gear As to FIG. 34, which is neutral: In this gear, the input drive shaft 302/5302 is in position 7000. Neither clutch faces of the Central Tooth Assembly 5501 are engaged at all. So, when the input drive shaft is rotated either clockwise or counterclockwise there is no effect on any of the sprockets in the dashed box shown as large assembly 5500. Further, because assembly 6606 is positioned over a "ground down" portion of the input drive shaft, it does not rotate as the one-way clutch bearing within it cannot grab the shaft.

As to FIG. 34A which is forward gear low gear: In this position of the input drive shaft 302/5302 is moved slightly inward, as represented by arrow 7001' to position 7001. Neither of the clutch faces of the Central Tooth Assembly 5501 are engaged at all. So, when the input drive shaft is rotated either clockwise or counterclockwise there is no effect on any of the sprockets in the dashed box shown as large assembly 5500.

However, the full diameter of the upper portion of the input drive shaft at 6602, which is the full diameter of the input drive shaft, is now situated under/within one-way clutch bearing 6601. So therefore, when the input driveshaft is rotated forward, one-way clutch bearing 6601 grabs the shaft and the sprocket assembly 6606 attached to it rotates forward with it. This pulls the belt/chain 6605 forward as indicated by arrow 6605' and rotates the sprocket 6280" clockwise/forward as well. The one-way clutch bearing 6280 within sprocket assembly 6280" then grabs the output shaft 322 and rotates it clockwise/forward as well, thus rotating the drive wheel.

Sprocket assembly 5270", (which is used for reverse), is also rotated forward/clockwise and pulls belt/chain 5271 in the direction of arrows 5271'. This rotates sprocket 5504" forward/clockwise as well. However, because sprocket assembly has only conventional bearings within it, merely spins freely on the input drive shaft 302/5302.

In this embodiment, sprocket assembly 6606 is a smaller diameter than sprocket assembly 6280". So, in essence this becomes lower gear ratio/lower gearing than the 5503" and 5260 sprocket match up embodiment depicted in FIG. 34B.

For FIG. 34A, when the input drive shaft 302/5302 is rotated backward, such as would be the case with a lever attached for a lever-drive wheelchair, the input drive shaft returns back freely, because the orientation of the one-way clutch bearing 6601 will not allow it to grab the input drive shaft when it moves in a counterclockwise direction. Further, sprocket assembly 5504 has conventional bearings and the backward rotation of the input drive shaft does not affect it, and the lever returns backward without impediment.

As to FIG. 34B, this is forward higher gear:

The input drive shaft 302/5302 is slightly moved inward of position 7001 as represented by arrow 7002' to position 7002 in assembly 5500. The teeth of the Central Tooth Assembly 5501 are now engaged with sprocket assembly 5503". So, when the input drive shaft is rotated clockwise by the lever moving forward, it pulls belt/chain 5261 along with it in the direction shown by arrow 5261'. This then turns sprocket assembly 5260" forward/clockwise.

The one-way clutch bearing within sprocket assembly 5260" grabs the output shaft 322 and rotates the output shaft forward/clockwise with it and thus rotating the drive wheel forward/clockwise.

As with the situation in FIG. 34A, sprocket assembly 5270", (which is used for reverse), is also rotated forward/clockwise and pulls belt/chain 5271 in direction 5271'. This rotates sprocket 5504" forward/clockwise as well. However, because sprocket assembly 5504" has only conventional bearings within it, merely spins freely on the input drive shaft 302/5302.

As to what is occurring in large assembly 6600 in this configuration with the input shaft 302/5302 in position 7002, the "ground down" smaller diameter of the upper portion of the input drive shaft 6603 is now situated under/within one-way clutch bearing 6601. So therefore, when the input driveshaft is rotated forward, one-way clutch bearing cannot grab the shaft and the sprocket assembly 6606 attached to it does not move. Therefor belt/chain 6605 does not move and sprocket assembly 6280" is not affected/turned.

In FIG. 34B, for this embodiment, sprocket assembly 5503 is a larger diameter than sprocket assembly 6606. If sprocket assemblies 6280" and 5260" are the same diameter, in essence, this configuration/embodiment becomes a higher gear ratio/lower gear than the 6606 and 6280" match up embodiment depicted in FIG. 34A.

When the input drive shaft 302/5302 is rotated backward, such as would be the case with a lever attached for a lever-drive wheelchair in return stroke, the input drive shaft returns back freely, because the sprocket assembly 6606 cannot grab the smaller diameter of the shaft. Sprocket assembly 5504" has conventional bearings and is not affected by the backward/counterclockwise rotation of the input drive shaft via the lever moving/rotation backward, and the lever returns backward without impediment.

As to each of the forward gear configurations/embodiments, when in such forward gears, because of the sprocket configurations and the type of bearings within them, i.e. the "gear logic", the drive wheel is able to coast/roll forward/clockwise unimpeded.

As to FIG. 34C, this is reverse gear:

In the configuration/embodiment depicted in FIG. 34C, the drive lever slides the input drive shaft 302/5302 in the direction of arrow 7003' moving the input drive shaft to position 7003.

In this position, Center Tooth Assembly 5501 engages with the tooth clutch assembly 5504.

When the drive lever is moved/rotated backward i.e. counterclockwise, it rotates the attached input drive shaft 302/5302 backward/counterclockwise along with it. Because the Center Tooth Assembly 5501 is engaged in sprocket assembly 5504, sprocket assembly 5504 rotates backward/counterclockwise as well.

This moves chain/belt 5271 in the direction of the arrow 5271" which rotates sprocket assembly 5270" backward/counterclockwise.

Sprocket 5270" has within it a one-way clutch bearing which grabs the output shaft 322 and rotates it backward/counterclockwise which moves the drive wheel of the conveyance backward/counterclockwise.

However, because the output drive shaft 322 is turning backward/counterclockwise the one-way clutch bearings in both sprocket assembly 5260" and 6280" both grab the output shaft 322.

Sprocket assembly 5260" pulls the belt/chain 5261 backward as shown with arrows 5261'''. This rotates sprocket assembly 5503" backward/counter-clockwise.

But because sprocket assembly 5503" has within it conventional bearings, it just spins on the input shaft 302/5302.

Sprocket assembly 6280" also has within it a one-way clutch bearing which grabs the output shaft 322. Therefore, the belt/chain 6605 is pulled in the direction of the arrows 6605". This rotates sprocket assembly 6606 backward/counterclockwise.

But because sprocket assembly 6606 also has within it conventional bearings, it also just spins on the input shaft 302/5302.

When the drive lever is returned moved forward at the end of the back stroke, it moves/rotates forward/clockwise unimpeded for reasons as follows: The input drive shaft 302/5302 does rotate along with the drive lever and rotates the Center Tooth Assembly and engaged sprocket 5504 forward/clockwise. This pulls the belt/chain 5271 in the direction opposite of the arrow 5271" i.e. forward and rotates sprocket assembly 5270" forward/clockwise. However, the one-way clutch bearings inside of sprocket 5270" can't grab the shaft when sprocket 5270" is rotated forward/clockwise. Further, because sprocket assembly 5503" has within it a conventional bearing and the one way clutch bearing inside sprocket assembly is over a "ground down" part of the input shaft 302/5302, neither sprocket assembly 5503" nor 6606 is caused to rotate. Thus, the lever can return forward unimpeded.

As to the reverse gear configurations/embodiments, when in such reverse gear, because of the sprocket configurations and the type of bearings within them, i.e. the "gear logic", the drive wheel is able to coast/roll backward/counterclockwise unimpeded.

Figure 35:
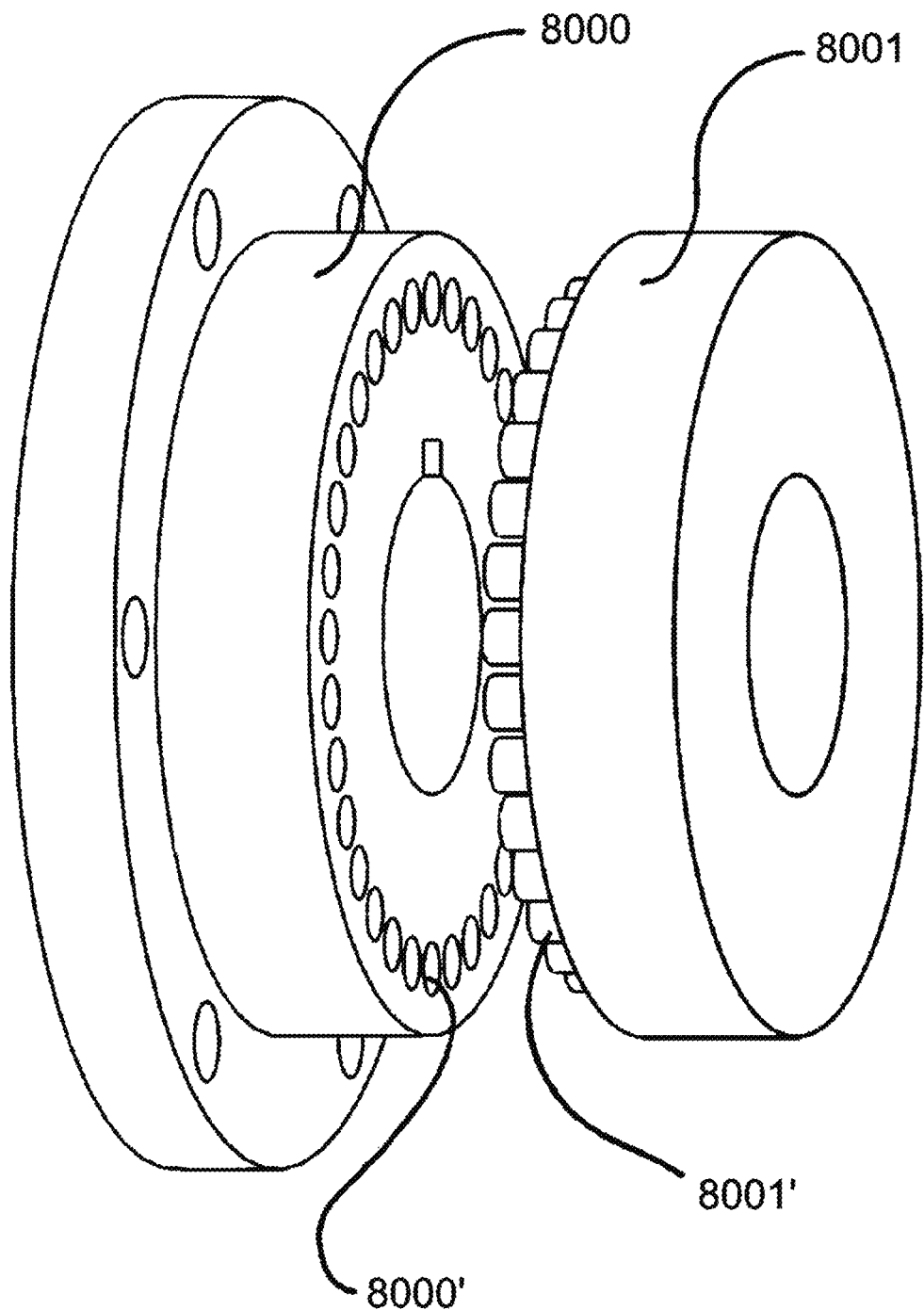
FIGS. 35 and 36 illustrate embodiments of a pin style clutch.

FIG. 35 describes an additional embodiment of a clutch faces pair for what can be described generically as a "tooth clutch". Item 8000 is a representative clutch face with items 8000' being holes/depressions. The holes/depressions of items 8000' accept the pins/protrusions 8001' of the mating clutch face 8001. There can be numerous embodiments with this type of design theme.

Figure 36:
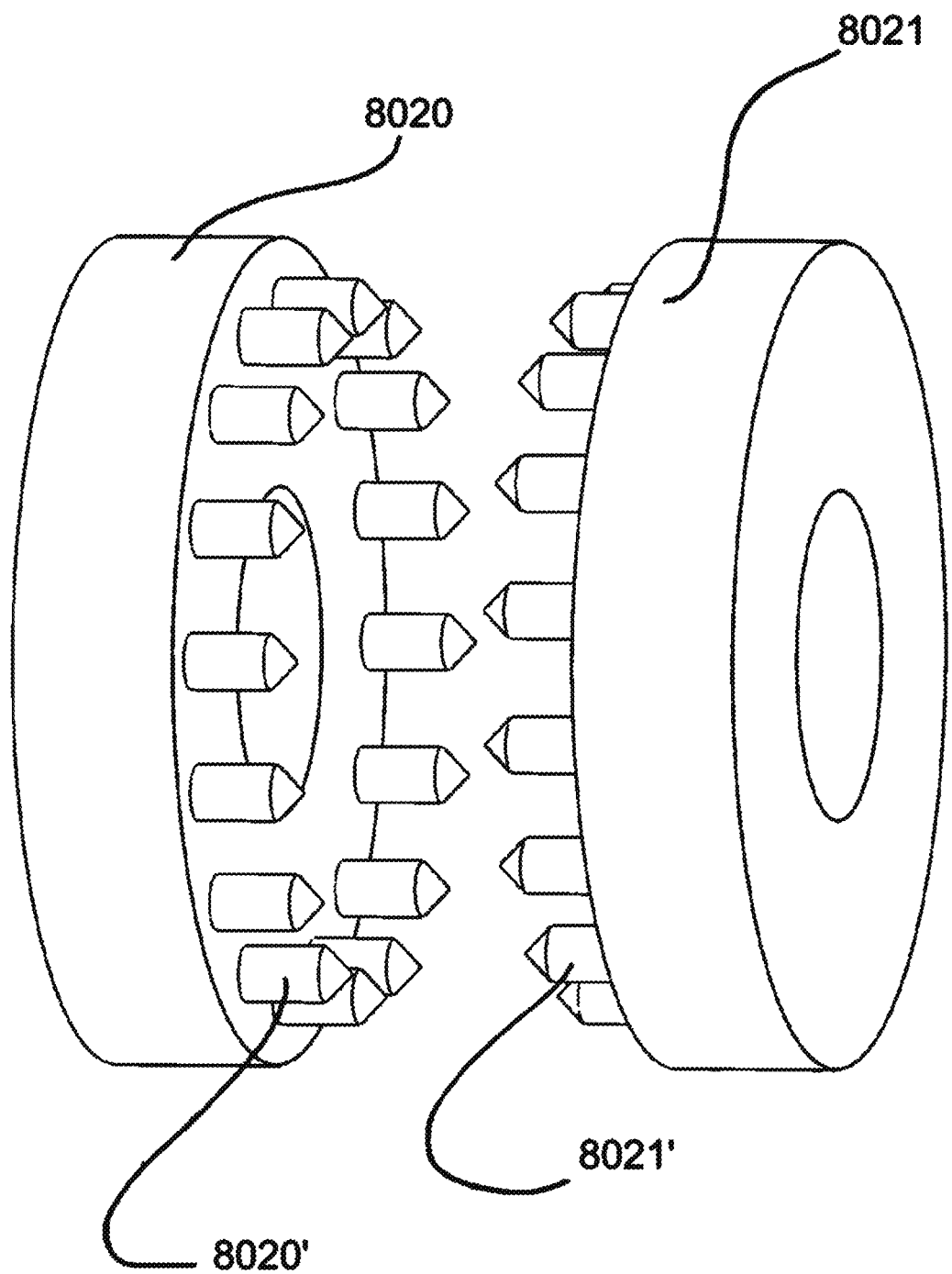

FIG. 36 describes an additional embodiment of a clutch faces pair for what can be described generically as a "tooth clutch". Items 8020 and 8021 are representative clutch faces with pins/protrusions 8020' and 8021'. The pins/protrusions of each clutch face mate with the void between the pins/protrusions on the other clutch face. There can be numerous embodiments with this type of design theme.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A human mobility device, comprising:
    a frame;
    a seat configured to support a human;
    a plurality of wheels connected to said frame;
    a transmission connected to said frame and at least one of said plurality of wheels; and,
    at least one lever connected to said frame and to said transmission, and further sized and configured for movement by a human in said seat;
    wherein said transmission comprises:
    an input drive shaft coupled to said lever and being axially movable; said input drive shaft having a first axis;
    an output drive shaft coupled to said plurality of wheels; and,
    a clutch mechanism having a first clutch face that remains facing a second clutch face in a direction aligned with said first axis and configured such that movement of said input drive shaft along said first axis to a first position moves the first clutch face against the second clutch face so as to operatively couple said input drive shaft to said output drive shaft, and axial movement of said input drive shaft along said first axis to a second position moves the first clutch face away from the second clutch face so as to operatively uncouple said input drive shaft from said output drive shaft.

2. The human mobility device of claim 1, wherein said second clutch face contains a bearing moveable in two directions and positioned concentrically over said input drive shaft so that said input drive shaft can rotate freely relative to said second clutch face as well as move axially through said bearings of said second clutch face.

3. The human mobility device of claim 1, further comprising a central clutch faced member that is fixed to said input drive shaft so as to rotate therewith; said central clutch faced member comprising said first clutch face configured to engage said second clutch face.

4. The human mobility device of claim 3, wherein said central clutch faced member has a third clutch face facing a direction aligned with said first axis and configured such that movement of said input drive shaft along said first axis moves the third clutch face into contact with a fourth clutch face facing a direction aligned with said first axis.

5. The human mobility device of claim 4, wherein said input drive shaft is axially movable so as to allow said first clutch face to engage said second clutch face, or to allow said third clutch face to engage said fourth clutch face.

6. The human mobility device of claim 5, wherein said first clutch face, said second clutch face, said third clutch face, and said fourth clutch face have teeth and wherein said clutch mechanism is a tooth clutch.

7. The human mobility device of claim 5, wherein said first clutch face and said second clutch face are connected to said output drive shaft via 1) a belt or chain or gears, and/or 2) via a sprocket, a gear, or a pulley.

8. The human mobility device of claim 7, wherein each of said belts or chains or gears are connected to said output drive shaft via a one-way bearing.

9. The human mobility device of claim 8, wherein said input drive shaft further comprises a reduced diameter region and full diameter region; and wherein axial movement of said input drive shaft moves said full diameter region into engagement with a one-way bearing disposed over said full diameter region of said input drive shaft.

10. The human mobility device of claim 9, further comprising a belt, chain, or gears connecting said one-way bearing disposed over said input drive shaft with a one-way bearing on said output drive shaft.

11. The human mobility device of claim 5, wherein said first clutch face, said second clutch face, said third clutch face, and said fourth clutch face each have at least one pin and/or at least one hole to engage each other.

12. A human mobility device, comprising:
    a frame;
    a seat configured to support a human;
    a plurality of wheels connected to said frame;
    a transmission connected to said frame and at least one of said plurality of wheels; and,
    at least one lever connected to said frame and to said transmission, and further sized and configured for movement by a human in said seat;
    wherein said transmission comprises:
    an input drive shaft coupled to said lever and being axially movable;
    an output drive shaft coupled to said plurality of wheels; and,
    a clutch mechanism comprising a first clutch face rotatably disposed on said input drive shaft and oriented in a first direction and a second clutch face rotatably disposed on said input drive shaft and oriented in a second direction opposite said first direction; and a central clutch member fixed on said input drive shaft between said first clutch face and said second clutch face and having a third clutch face and a fourth clutch face; wherein axial movement of said input drive shaft to a first position engages said first clutch face and said third clutch face; and wherein axial movement of said input drive shaft to a second position engages said second clutch face and said fourth clutch face.

13. The human mobility device of claim 12, wherein said first clutch face, said second clutch face, said third clutch face, and said fourth clutch face have teeth and wherein said clutch mechanism is a tooth clutch.

14. The human mobility device of claim 13, wherein axial movement of said input drive shaft to said first position operatively couples said input drive shaft to said output drive shaft to allow forward movement of said human mobility device, and axial movement of said input drive shaft to said second position operatively couples said input drive shaft to said output drive shaft to allow rearward movement of said human mobility device.

15. The human mobility device of claim 14, wherein said first clutch face is connected to a first engagement mechanism having a first bearing disposed on said input drive shaft and being moveable in two directions; and said second clutch face is connected to a second engagement mechanism having a second bearing disposed on said input drive shaft and being moveable in two directions; wherein said first engagement mechanism and said second engagement mechanism are operationally attached to a sprocket, a gear, and/or a pulley.

16. The human mobility device of claim 15, wherein said first clutch face and said second clutch face are connected to said output drive shaft via a belt or chain or gears; and wherein said first clutch face, said second clutch face, said third clutch face, and said fourth clutch face have pins and holes to engage each other.

17. The human mobility device of claim 16, wherein each of said belt or chain or gears are connected to said output drive shaft via a one-way bearing disposed on said output drive shaft.

18. The human mobility device of claim 17, wherein said input drive shaft further comprises a reduced diameter region and full diameter region; and wherein axial movement of said input drive shaft moves said full diameter region into engagement with a one-way bearing disposed over said input drive shaft.

19. The human mobility device of claim 17, further comprising a belt or chain or gears connecting said one-way bearing disposed over said input drive shaft with a one-way bearing on said output drive shaft.

20. The human mobility device of claim 5, wherein said input drive shaft is axially movable so as to prevent said first clutch face to engage said second clutch face, or to allow said third clutch face to engage said fourth clutch face.

* * * * *